(12) United States Patent
Shahar

(10) Patent No.: US 7,245,432 B2
(45) Date of Patent: Jul. 17, 2007

(54) DUAL DIFFRACTION-GRATING DEVICE

(75) Inventor: Arie Shahar, Rye Brook, NY (US)

(73) Assignee: Main Street Ventures, LLC, White Plains, NY (US)

( * ) Notice: Subject to any disclaimer, the term of this patent is extended or adjusted under 35 U.S.C. 154(b) by 0 days.

(21) Appl. No.: 10/472,239

(22) PCT Filed: Mar. 28, 2002

(86) PCT No.: PCT/US02/10051

§ 371 (c)(1),
(2), (4) Date: Sep. 22, 2003

(87) PCT Pub. No.: WO02/079836

PCT Pub. Date: Oct. 10, 2002

(65) Prior Publication Data

US 2004/0141688 A1    Jul. 22, 2004

Related U.S. Application Data

(63) Continuation-in-part of application No. 09/819,589, filed on Mar. 28, 2001, now Pat. No. 6,603,904.

(60) Provisional application No. 60/356,089, filed on Feb. 11, 2002.

(51) Int. Cl.
*G02B 5/18* (2006.01)
*G02B 27/00* (2006.01)
*G02B 1/00* (2006.01)
*G02B 6/34* (2006.01)

(52) U.S. Cl. .................. 359/576; 359/566; 359/569; 359/572; 359/574; 359/575; 359/580; 359/677; 359/583; 359/486; 359/494; 359/497; 385/37

(58) Field of Classification Search ................ 385/37; 359/566, 569, 572, 574, 575, 576, 577, 580, 359/583, 486, 494, 497

See application file for complete search history.

(56) References Cited

U.S. PATENT DOCUMENTS

| | | | | |
|---|---|---|---|---|
| 5,080,465 A | * | 1/1992 | Laude | 359/571 |
| 5,258,871 A | * | 11/1993 | Gupta | 359/485 |
| 5,481,384 A | | 1/1996 | Kramer et al. | |
| 6,343,170 B1 | * | 1/2002 | Sela | 385/37 |

* cited by examiner

*Primary Examiner*—David Nelms
*Assistant Examiner*—Hoan Nguyen
(74) *Attorney, Agent, or Firm*—Eitan Law Group

(57) ABSTRACT

A diffraction grating device (100) has both reflecting (108) and transmitting (106) gratings inter leaved to allow both transmission diffraction patterns and reflection diffraction patterns to be formed by means of the same device (102). This makes it possible, for example, to produce a diffraction pattern of one older with a beam (134) directed to be diffracted by the reflecting diffraction grating or with a beam (132) directed to be diffracted by the transmitting diffraction grating when either beam is incident alone. It also makes it possible to generate a diffraction pattern of a different order when both beams are incident simultaneously, which reduces effective order of the grating.

16 Claims, 58 Drawing Sheets

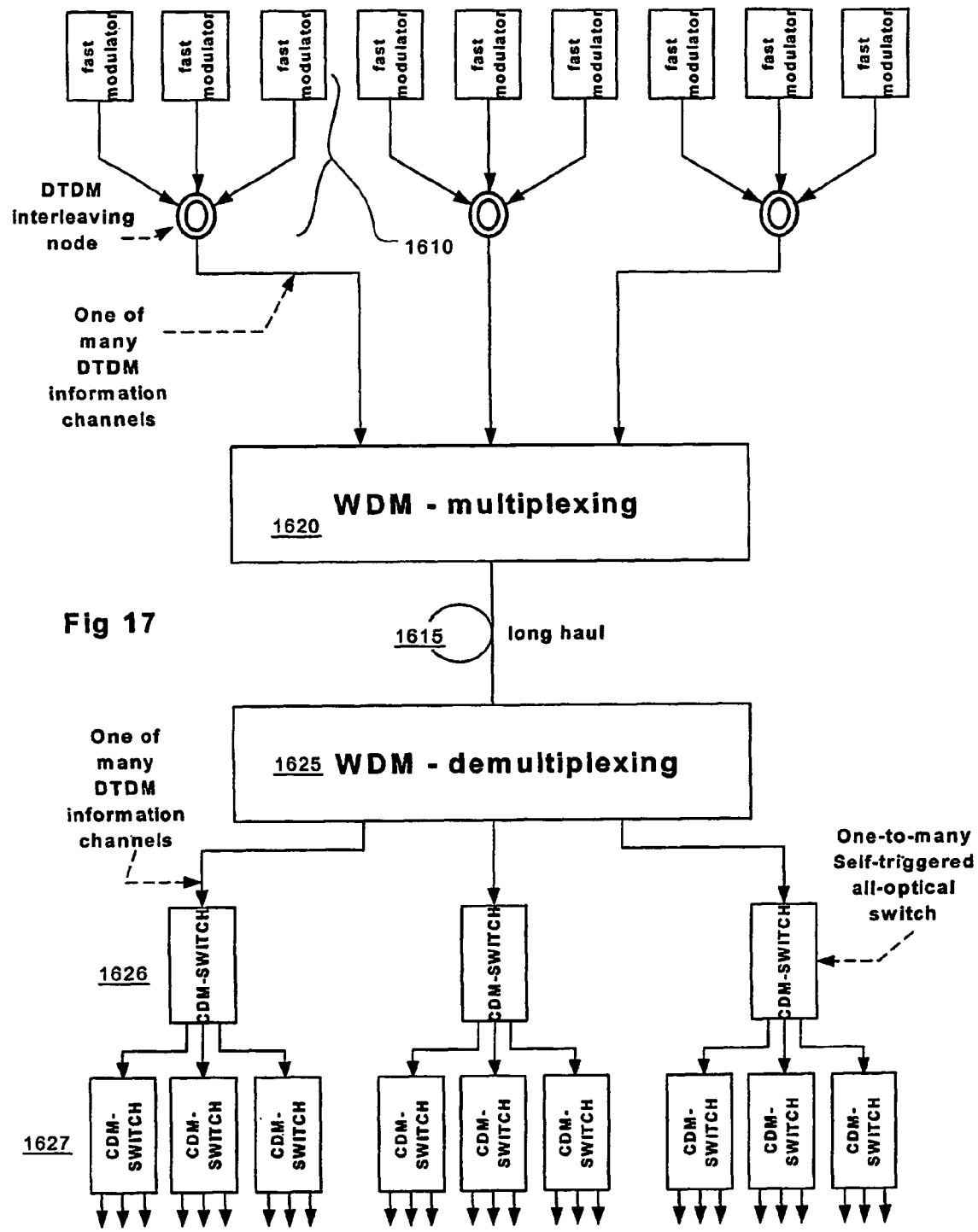

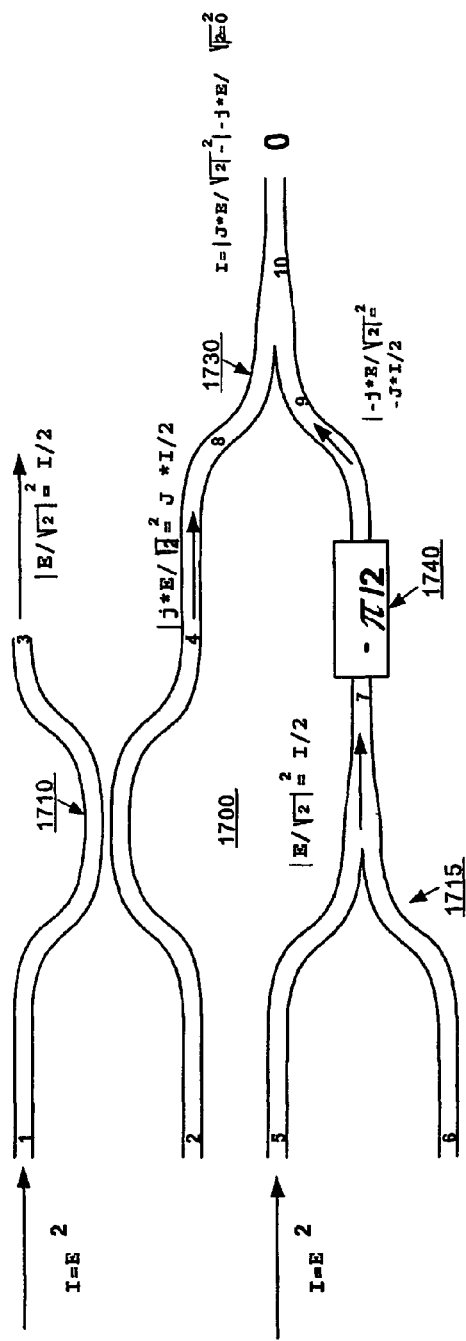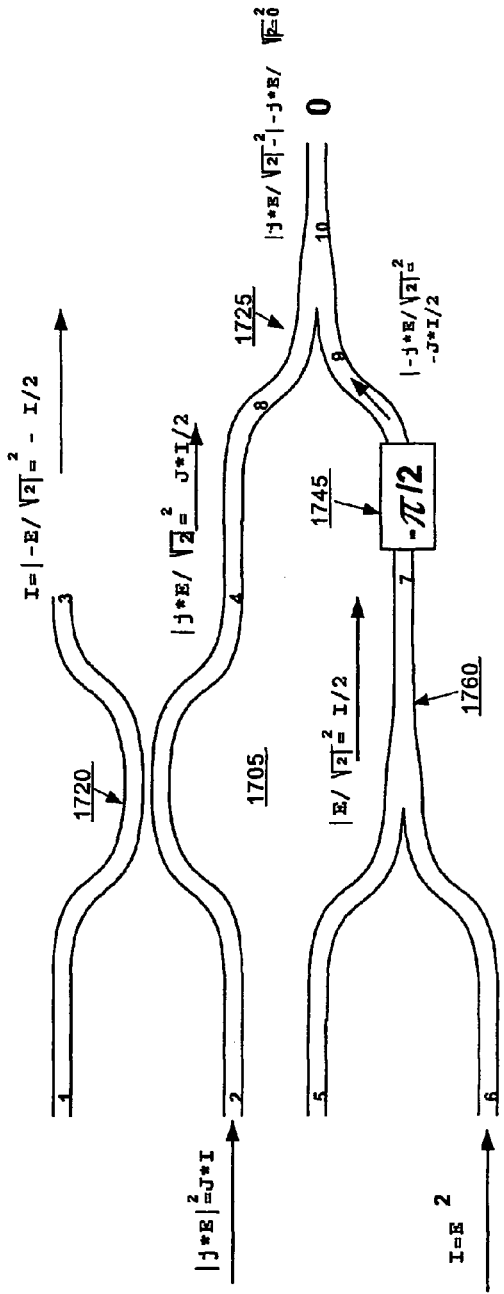
FIG 20

A design for optical fibers.
The system is in a coincidence state

A design for optical fibers.
The system is NOT in a coincidence state.

(The radiations in the arms without the delayers get into the couplers junctions while the radiations in the arm with the delayers did not get into the couplers junctions yet)

Fig 24   A design for optical fibers.
The system is NOT in a coincidence state (The radiations in the arms without the delayers already exit the couplers and the radiation in the arm with the delayers just get into the couplers junctions)

An alternative design that may be used with optical fibers, for example.

A design that may be implemented with optical waveguide technogy, for example.

The device is in coincidence state.
(The delayer is produced in a shape suitable for integrated optics. The Y-junctions of Fig 22-24 that split the energy in the input are replaced by directional couplers to reduce loss)

An alternative design for optical waveguides.
The device is in coincidence state.

Field combiner
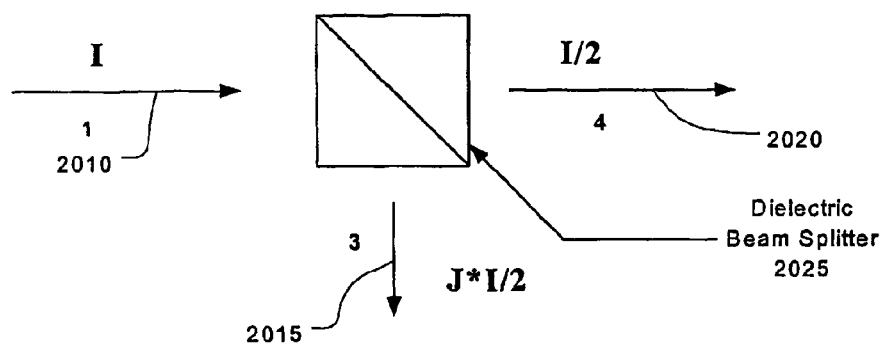
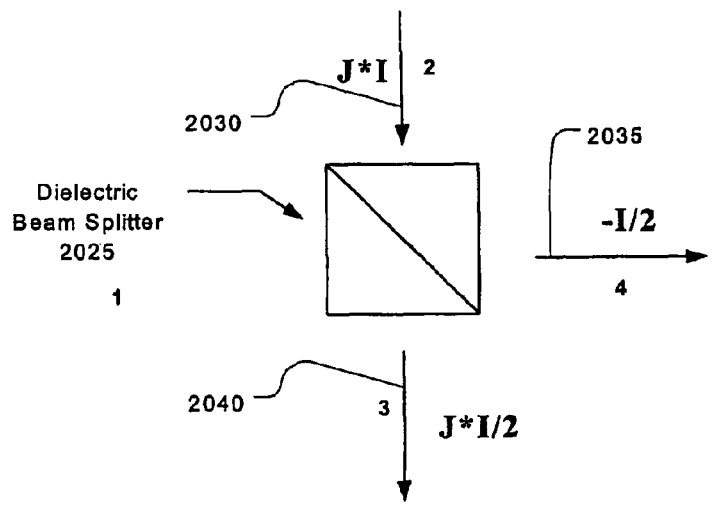
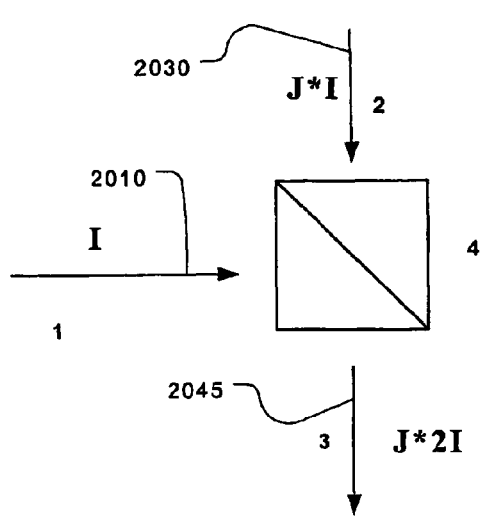
Fig 28
In a Noncoincidence state used output 3 has Intensity of I/2. In a coincidence state this output (3) has an intensity of 2I

Field combiner
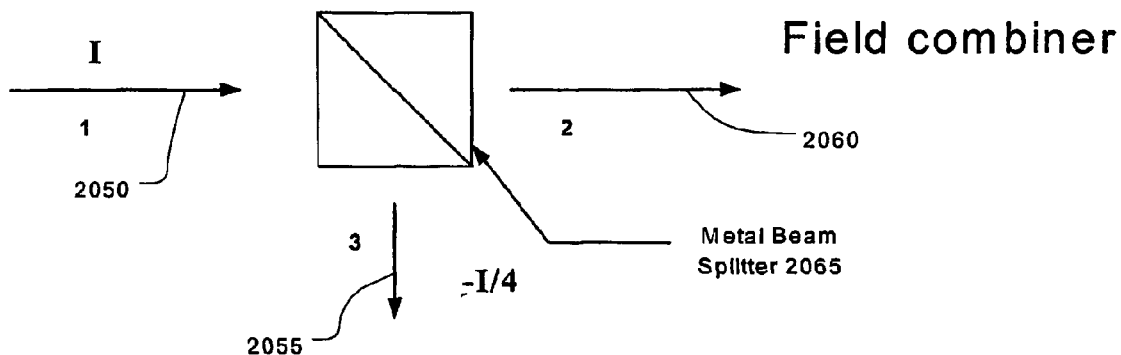
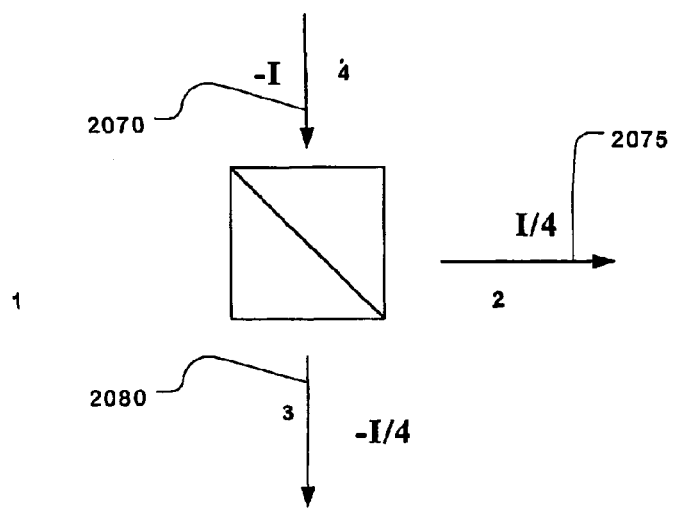
approx values
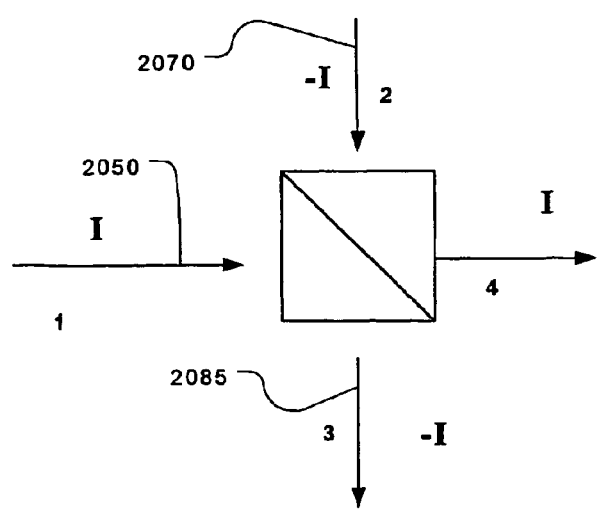
Fig 29
In a Noncoincidence state used output (3) and (4) has intensity of less than I/2. In a coincidence state there is no loss in the metal film and outputs (3) and (4) have an intensity of I

Field combiner
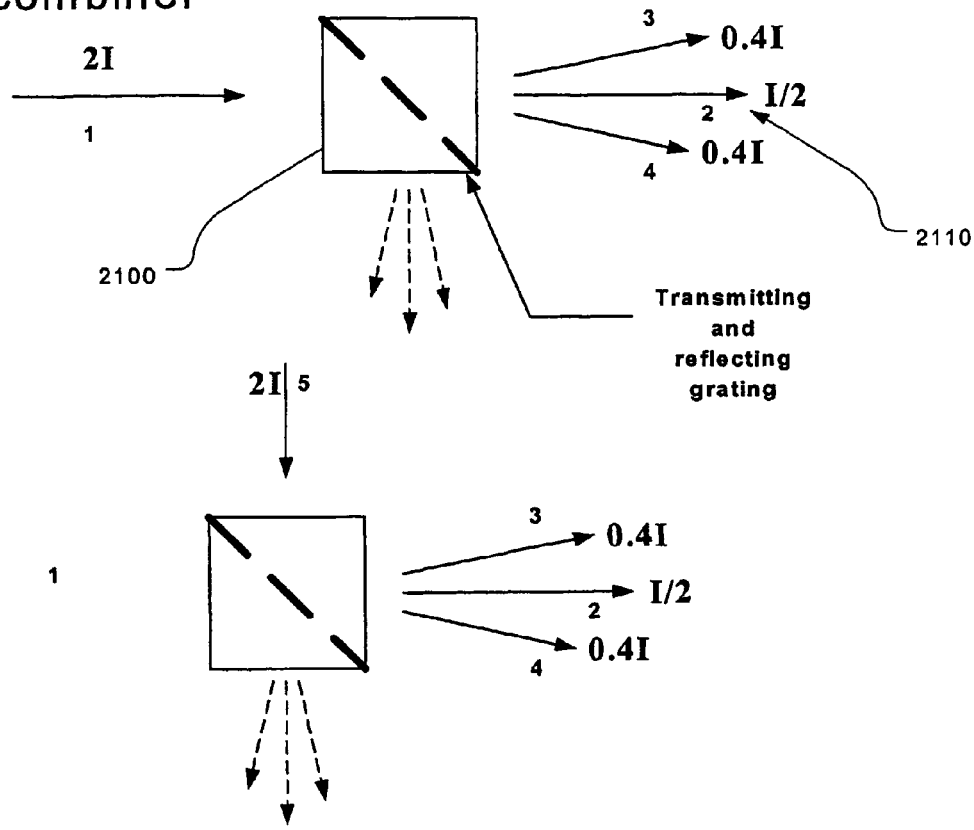
Fig 30
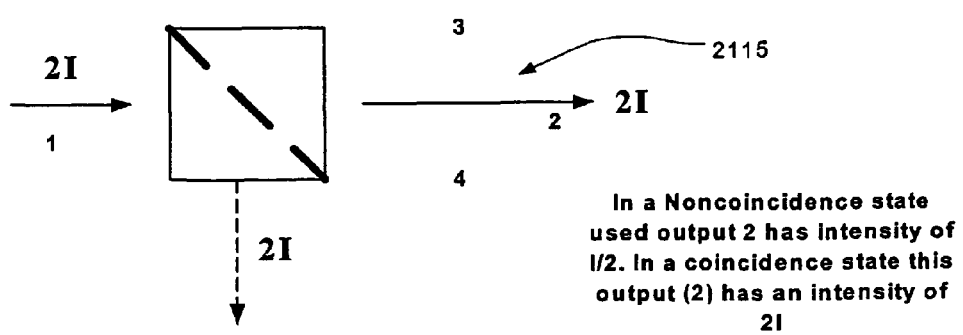
In a Noncoincidence state used output 2 has intensity of I/2. In a coincidence state this output (2) has an intensity of 2I

Power combiner
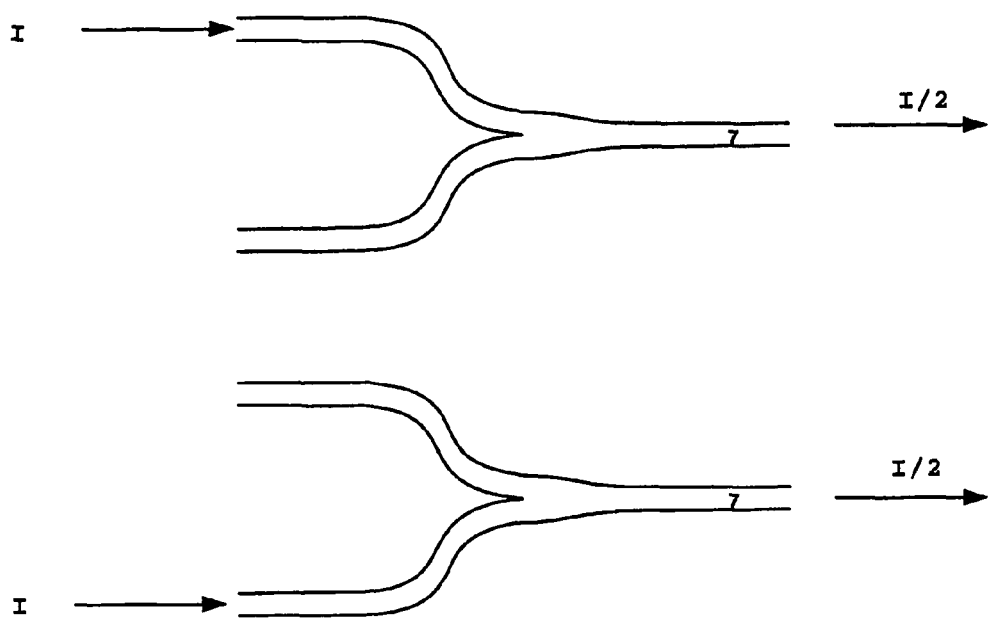
In a Noncoincidence state used output (7) has intensity that is equal to I/2. In a coincidence state output (7) combines the energies in the inputs to be equal to I
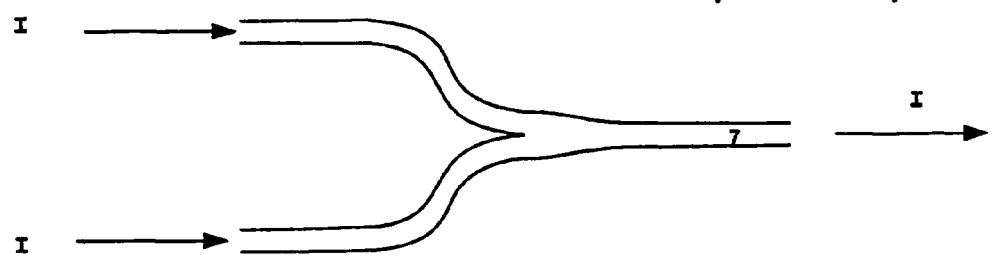
Fig 31

Power combiner

In a Noncoincidence state used output (7) has intensity that is proportional to I/2. In a coincidence state output (7) combines the energies in the inputs to be proportional to the sum of the energies in the inputs

Noncoincidence state

Noncoincidence state

Noncoincidence state

Coincidence state

Noncoincidence state

Noncoincidence state

Coincidence state

DUAL DIFFRACTION-GRATING DEVICE

CROSS REFERENCE TO RELATED APPLICATIONS

This application is a National Phase Application of PCT International Application No. PCT/US02/10051, International Filing Date Mar. 28, 2002, which is a continuation-in-part application of U.S. application Ser. No. 09/819,589 filed Mar. 28, 2001, now U.S. Pat. No. 6,603,904, and also claims the benefit U.S. Provisional Patent Application, 60/356,089, filed Feb. 11, 2002.

FIELD OF THE INVENTION

The invention relates to optical communications and more particularly to the modulation and switching of data on optical channels using physical effects involving the combination of energy in light beams in various ways.

BACKGROUND

In the field of optical communication, there is a pressing need to improve the capacity of optical networks and the speed of switching at reasonable cost. These are attended by the related problems of efficient retrofit to existing infrastructure, ease of maintenance, reliability, etc. The physical media of optical fibers used in current generation optical networks have a tremendous as yet untapped reserve capacity. The reasons for this involve various bottlenecks, chief among them, the slow speed of switches for optical data. To switch optical data, either the data on an optically-modulated signal must be converted to electrical modulation and switched by electrical switches or slow mechanical switches must be used. Even the latter involves the slow conversion of optical modulation into electrical signals for control of the mechanical switches. To compensate for the slowness of the conversion and switching processes, substantial parallelism must be introduced into the design of switches resulting in high cost. In either case, currently, there is no analog to the network switches used in electrical networks, where switching introduces minimal delay in the propagation of network signals.

In addition to the switching process per se, the process of generating optical signals—the modulation itself—is slow because of the rise and fall times of current optical modulators. As a result, symbols are much longer than need be, thereby limiting the bandwidth to a level substantially below the potential of the optical media.

A technique called Wavelength Division Multiplexing (WDM) and a refinement called, Dense Wavelength Division Multiplexing (DWDM) are currently used to increase the capacity of optical media using current modulation technology. WDM or DWDM methods increase the transmission rate by creating parallel information channels, each channel being defined by a different light frequency. Another method, Time Division Multiplexing (TDM) exists in which multiple data sequences are interleaved in time-division fashion on a common medium.

WDM or DWDM methods increase the transmission rate by using parallel information channels. The information in each optical channel is carried by a different light frequency. The light frequencies of the channels are combined together and are inserted into the input of a single optical fiber. The combined light frequencies at the output of the fiber are separated into different parallel channels, one for each specific light frequency. Although DWM and DWDM has the ability increase the capacity of a fiber, the number of channels that may be defined has a practical upper limit because of the limited bandwidth of the fiber (optical properties are attuned to a narrow range of frequencies) and because of the ability of the laser sources to contain their energy in very narrow frequency bands.

In TDM, the bits of several parallel channels at the same light frequency are interleaved in a predetermined periodic order to create a single serial data stream. This method is very effective when using a buffer, which accumulates and compresses the data of several channels into a dense serial data stream of a single channel by reorganizing this data with suitable delays. However the data rate permitted by this method as well as others is still limited by the data rate and duty cycle of the light sources (DFB and DBR lasers) themselves. That is, in direct modulation, the power to the laser is switched on and off. The rate at which this can occur has a physical upper limit due to the relatively long recovery time of the lasers and it produces chromatic dispersions due to broadening of the emitted spectral line of the modulated lasers. This is caused by spontaneous emission, jittering, and shifting of the gain curve of the lasers during the current injection. Where modulation is performed in an indirect manner, the lasers are operated in a Continuous Wave (CW) mode and separate modulators perform the modulation of the beam. The modulators are usually made from interference devices such as Mach-Zender's, directional couplers and active half wave-plates combined with polarizers and analyzers. However, an electro-optical must be activated to modulate the beam; to produce phase shifts and polarization changes. Such changes involve the creation and removal of space charges, which change the density of the charge carriers within these electro-optic materials. The formation rate of the space charges is mainly dependent upon the speed and the magnitude of the applied voltage and can be on the order of sub nanoseconds. The charge removal is usually slower and is mainly dependent upon the relaxation time of these materials (lifetime of charge carriers) and can be relatively long. Accordingly, the width of the pulses and the duty cycle of the modulation are dependent limited by the long off-time of the modulators.

These same rise and fall time limitations impose similar limits on the abilities of switches to direct light along alternative pathways according to routing commands and data. At present, there are two major classes of optical switches. In one class, optical signals are converted to electrical signals, routed conventionally, and optical signals generated anew at the output. As discussed above, the process of conversion is slow and involves many parallel channels making such switches costly as well. This class of switches goes by the identifier OEO, which stands for optical-electrical-optical. A second class of switches goes by the identifier OO, which stands for optical-optical. In these switches, no conversion of optical signals to electrical signals takes place. Instead, the optical energy is routed by means of some sort of light diversion process such as a switchable mirror. In one system, micromechanical actuators or so-called MEMS motors are used to move mirrors in response to electrical routing signals. The speed of such switches is again limited by the need to process electrical signals and the slow response of energy conversion in the MEMS motors. The result is a need for multiple channels to be provided and great expense as well as delay in the speed of the signals along the selectable data routes.

At present, the highest bit rate that can be achieved is about 10 G bits per channel, which is limited by the modulation rate of the modulators, the pulse width that they produce, and the switching time of the electronic switches.

As a result of the foregoing limitations of the prior art, there is a need for reliable mechanisms for exploiting the physical potential of fiber optic media in terms of data rate, switching, and cost.

SUMMARY OF THE INVENTION

An all-optical system for modulating, switching, multiplexing, demultiplexing, and routing optical data employs control units that direct light energy according to a coincident control signal which is also in the form of light. In an embodiment, a control unit directs a substantial fraction of the energy (and included symbols) in a data signal to a first output when a light control signal is simultaneously present at a control input of the control unit and to a second output when the light signal to the control input is absent. That is, when the control signal and the data signal are coincident at the respective inputs of the control unit, most of the data signal energy is directed to one output and when the control signal is noncoincident with the data signal, most of the data signal energy is directed to another output. According to an embodiment, this "coincidence-gate" behavior is brought about by the interference of the control and data signals. Note that the calling one signal a control signal and the other signal a data signal is, at least in many embodiments, purely an arbitrary choice and is used in the present specification heuristically to facilitate the description of the invention.

In an embodiment, the interference of light in the control and data signals is the result of applying one signal to a first diffraction grating that generates a first interference order diffraction pattern and the other signal to a diffraction pattern adjacent or interleaved with the first such that a different interference order is generated when both signals coincide on both gratings. In an example, the first grating may be a transmission grating with (broken) reflective surfaces between the transmission apertures defining a reflection grating. With such a device, one signal may reflect off of the reflective grating and the other signal may pass through the transmission grating. The reflection and transmission diffraction patterns of either signal produces first order diffracted radiation when only one signal falls on the device at given instant of time. But when both fall on the device at the same time, so that the effective pitch of the diffraction grating includes both the transmission and reflection grating, a lower order diffracted radiation results. In the case of the first order pattern, the lobes have different directions and/or intensities from that of the lower order diffraction pattern. With suitably spatially-located receivers, the energy may be directed in different directions from this type of interference device depending on whether the two signals are coincident or noncoincident. The coincidence gate may thus have a coincidence output to which energy is sent when the both inputs receive energy at the same time and a noncoincidence output to which energy is sent when the inputs receive energy at different times. Note, as should be clear to a person of ordinary skill, for the above interference type of coincidence gate to work properly, the phases of the inputs should be properly aligned to insure the energy from the gratings falls on the respective receivers.

Preferably the first and lower order diffraction patterns are first and zero order diffraction patterns to minimize the number of energy pickups. That is, the effective number of lobes increases with the ratio of the pitch to the wavelength. This makes it necessary to provide more pickups to collect most of the energy in the lobes as the order increases. To achieve this in the case of a grating, the wavelength of the light should be in appropriate ratios to the pitches of the transmission/reflection and combined gratings, as may be determined by relationships well-known in the art. Generally, this will be achieved by choosing a low order grating.

Using such an interference device as described above, by suitable construction of an optical device, incident energy is directed along different paths depending on whether the data and control beams are coincident on the inputs to the interference device or noncoincident. The result is a basic component, mentioned above, called the coincidence gate. This gate may be used to control the path of a data signal. For example, by articulating a single data signal so that it contains pairs of pulses separated by a predefined spacing, and splitting this signal, sending one to one input of the coincidence gate and sending a delayed version to the other input of the coincidence gate, the signal will be transmit a pulse at one output of the coincidence gate when the pulse spacing matches the delay and through another output when the pulse spacing is different from the delay. By sending such a pulse to a number of different coincidence gates, each with a different delay, the articulated signal will only produce a pulse at a selected output in the gate provided with the delay matching the spacing of the pulses in the signal. Thus, the optical signal carries a symbol (the pulse spacing) that selects which coincidence gate-device its energy will be sent through. This effect amounts to a basic switching function. Note that the switching function can be layered by providing each output to another set of different gates each with another different delay. To articulate the signal for successive layers, each pulse pair must be defined by a pulse pair. This signal construction must be repeated, in fractal-fashion, for every switch layer involved because each pulse pair only produces a single pulse at the output. The details of this process are described in the Detailed Description section along with supporting illustrations.

The coincidence device may also be used to create a modulator for signal transmission because of its rapid on-off response. That is, if two broad pulses are applied to the control and data inputs of a coincidence device with different time delays, the width of the pulse emerging from the coincidence output will be determined by the period during which both input pulses fall on the grating at the same time.

The coincidence effect can be used to generate pulses that are very narrow. By combining multiple ones of such pulse-shaving devices feeding into a common optical channel, very dense streams of narrow pulses may be generated thereby increasing the bandwidth of an optical signal. A mirror-image process can then be used to generate data streams with larger pulse spacing along multiple channels at a receiver. Thus, the above description embodies a multiplexer/demultiplexer combination.

The above-described diffraction grating device is only one of a number of alternative interference devices that may be used to create a coincidence device. A very similar type of device formed from waveguides may be used to produce diffraction patterns from control and data inputs with spatially-separated receivers. In addition, Y-junctions, directional couplers, fast-pitch diffraction gratings, beam splitters, for example, may be used as the bases of non-diffraction interference devices to produce a similar coincidence function. Examples of such devices are described in the Detailed Description section below along with supporting illustrations.

Also, in addition to the modulation and self-switching functions described above, the coincidence gate may be used as the basis for a switch controlled by an external control signal. Thus, a data signal from one source can be directed to an appropriate output of a layer of coincidence gates by sending an appropriately-timed control pulse to all of the gates. Alternatively, a single selected coincidence gate can have one of its outputs selected by an external control signal by transmitting a control signal to only the selected coincidence gate.

An additional layer of symbology may be added to an optical signal which may be used for switching purposes in coincidence gates employing the diffraction phenomenon. The propagation directions of the various diffraction orders may be varied by imposing different phase relationships between the data and control signals. By placing receivers in different locations, each set with different outputs, the coincidence gate may be configured to provide selectable outputs depending on the phase relationship between the pulses.

The invention will be described in connection with certain preferred embodiments, with reference to the following illustrative figures so that it may be more fully understood. With reference to the figures, it is stressed that the particulars shown are by way of example and for purposes of illustrative discussion of the preferred embodiments of the present invention only, and are presented in the cause of providing what is believed to be the most useful and readily understood description of the principles and conceptual aspects of the invention. In this regard, no attempt is made to show structural details of the invention in more detail than is necessary for a fundamental understanding of the invention, the description taken with the drawings making apparent to those skilled in the art how the several forms of the invention may be embodied in practice.

BRIEF DESCRIPTION OF THE DRAWINGS

FIG. 17 illustrates a system in which a combination of WDM and a form of symbology provided by an invention disclosed, in which the symbology is used for CDM.

FIGS. 20 and 21 illustrate basic operation of a component of a coincidence device based on direction couplers according to embodiments of inventions disclosed.

FIG. 28 illustrates principles involved with dielectric beam splitters for purposes of discussing alternative embodiments of inventions disclosed.

FIG. 29 illustrates principles involved with metallic beam splitters for purposes of discussing alternative embodiments of inventions disclosed.

FIG. 30 illustrates energy routing in a transmission/reflection grating of certain embodiments of inventions disclosed.

FIGS. 31 and 32 illustrate energy routing in two types of Y-junction used in certain embodiments of inventions disclosed.

DETAILED DESCRIPTION OF THE PREFERRED EMBODIMENTS

Figure 1A:
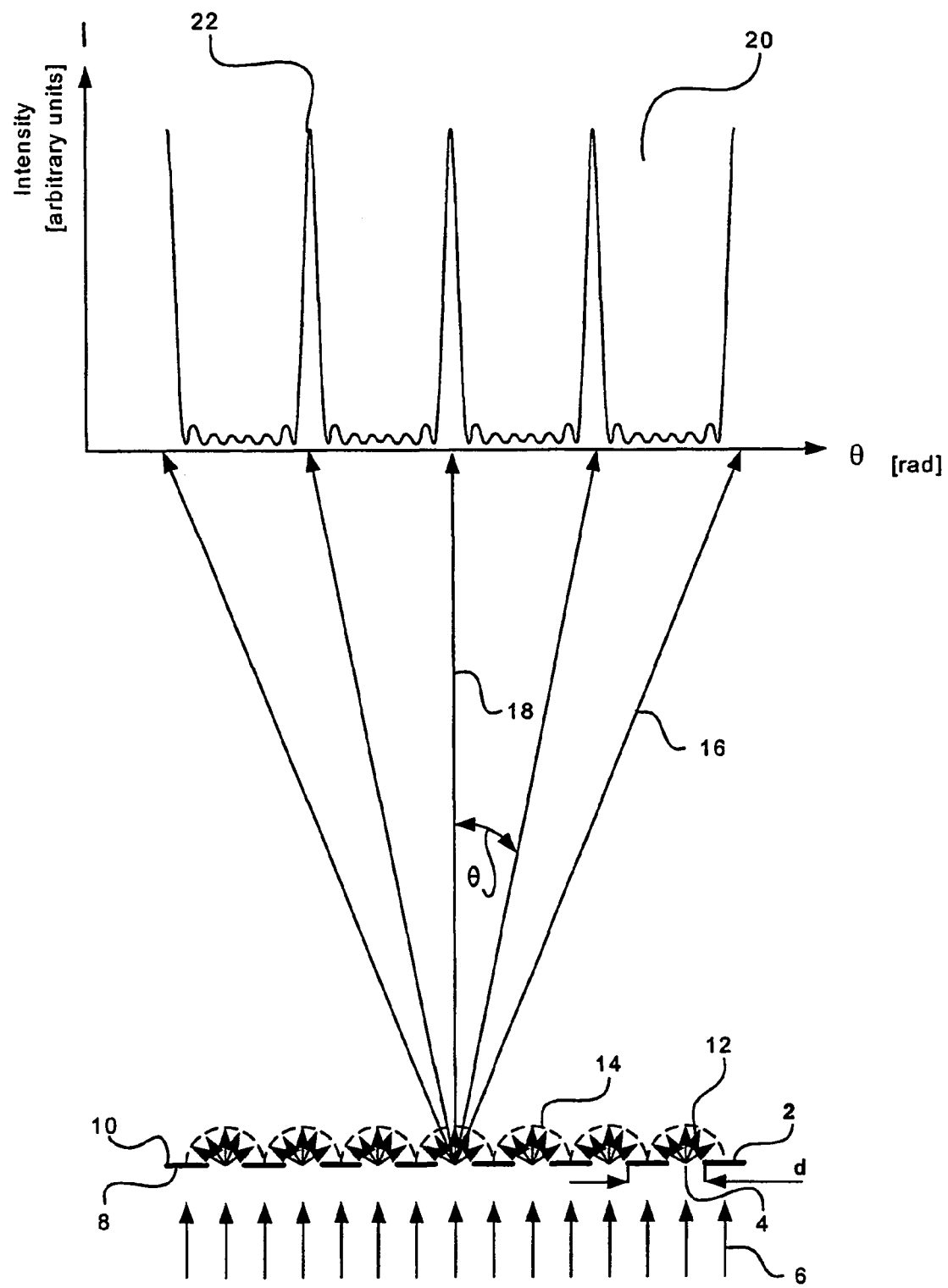
FIGS. 1a and 1b are illustrations of certain principles of optics involved in the operation of a diffraction grating-based embodiment of the inventions disclosed.
Figure 1B:
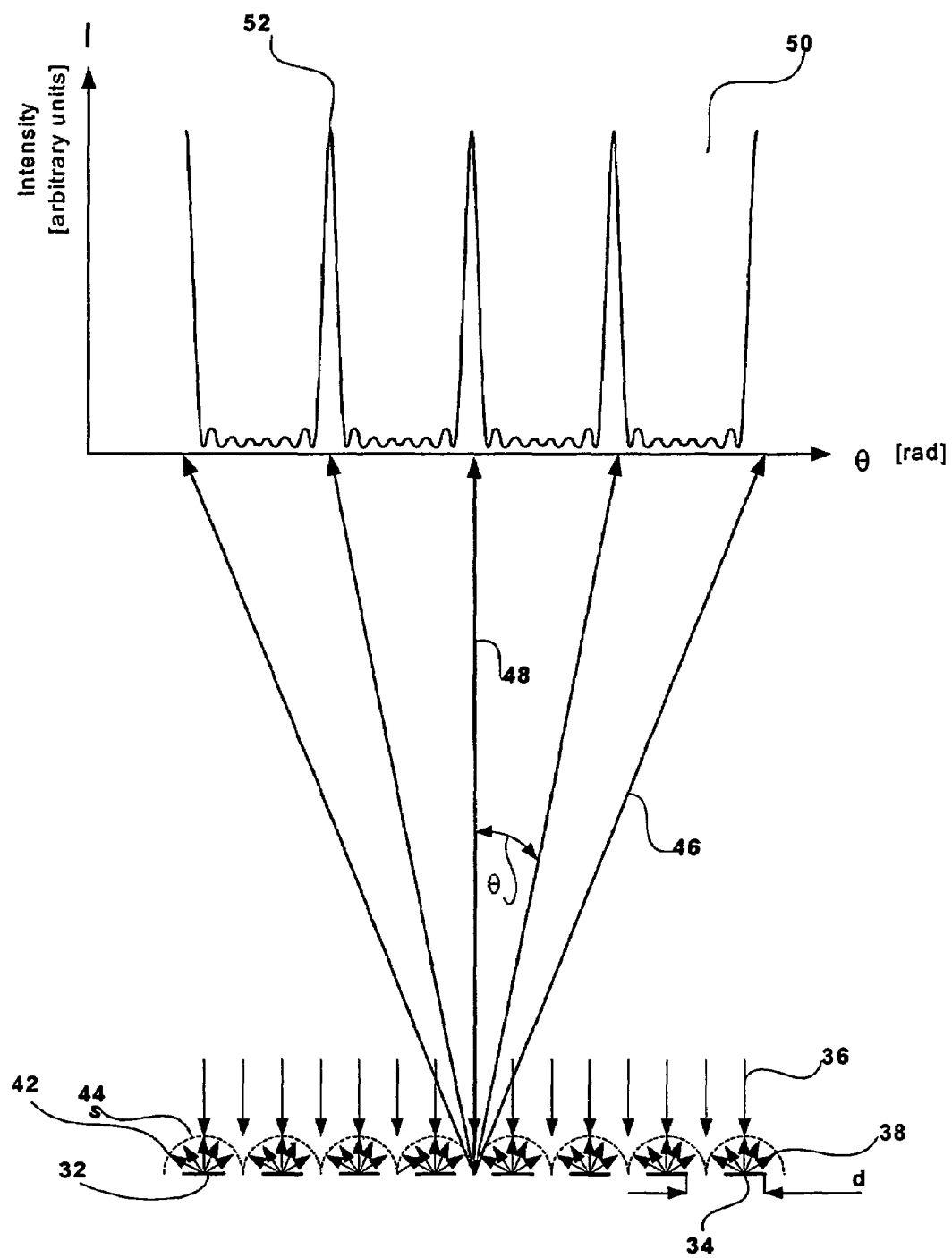

FIGS. 1a and 1b illustrate the optical operational principle of known transmitting and reflecting gratings, respectively. FIGS. 1a and 1b may assist in understanding the present invention. FIG. 1a shows a transmitting grating 2 with openings 4 with pitch d. Grating 2 receives planar radiation waves 6 on its side 8. Only part of the radiation of the impinging waves 6 is transmitted, by openings 4, to the other side 10 of grating 2. Beam 12 exits from openings 4 and has a cylindrical wavefront (diffraction effect) and its intensity is distributed isotropically over half cylinders 14 along which it propagates.

The radiation of propagating fronts 14 (in the shape of cylinders) interfere with each other to create constructive and destructive interference. Arrows 16 schematically illustrate the directions along which the constructive interference exist. The directions of arrows 16 are indicated by angles θ, measured in radians, with respect to the axis of symmetry 18 of grating 2. Arrows 16 actually indicate the antinodes along which beam 6 is concentrated, due to grating 2, and thus point to the values of intensity peaks at the various angles θ, on the coordinate relative to the normal 18. The latter is a part of plot 20, which illustrates the spatial distribution of the radiation intensity I of beam 6 versus angle θ. Arrows 16 point to the angle values θ in which the intensity I of beam 6 reaches local maxima 22.

The mathematical relationships between intensity I of beam 6, transmitted by grating 2, and propagation angle θ of this radiation are given by equation (1):

$$I \propto [\sin(n \cdot \beta \cdot d \cdot \sin(\theta)/2)/\sin(\beta \cdot d \cdot \sin(\theta)/2)]^2 \qquad \text{Eq. (1)}$$

In this equation n is the number of openings 4 and β is the wave vector of beam 6 that is equal to $2 \cdot \pi/\lambda$ and λ is the wavelength of beam 6.

The intensity I according to Eq. (1) reaches a local maximum value when:

$$(\beta \cdot d \cdot \sin(\theta)/2) = i \cdot \pi \qquad \text{Eq. (2)}$$

This occurs when I is an integral number, known as the order of the diffraction.

When substituting β for $2 \cdot \pi/\lambda$ in Eq. (2), it takes the form:

$$\sin(\theta) = i\lambda/d \qquad \text{Eq.(3)}$$

FIG. 1b shows transmitting grating 32 with mask stripes 34 arranged with pitch d. Grating 32 receives radiation planar waves 36 on its side 38. Only part of the radiation of waves 36 is reflected back by mask stripes 34 and out from grating 32. Stripes 34 have diffusive reflecting surfaces and are very narrow (diffraction effect). Thus they reflect the radiation with equal intensity in any direction. Beam 42 reflected from stripes 34 have a cylindrical wavefront and its intensity is distributed isotropically over half cylinders 44, defined by the locus of directions of propagation. The beams from propagating cylinders 44 interfere with each other to create constructive and destructive interference. Arrows 46 schematically illustrate the directions along which there is constructive interference. The directions of arrows 46 are indicated by angles θ, measured in radians, with respect to the normal 48 of grating 32 surface. Arrows 46 actually indicate the orientations along which beam 36 is concentrated by grating 32. The values of angles θ are indicated on the θ axis. This axis is a part of graph 50, which illustrates the spatial distribution of the radiation intensity I of beam 36 versus angle θ. Accordingly it is clear that arrows 46 point out the angle values θ at which the intensity I of beam 36 reaches local maximum values 52.

The mathematical relationships between intensity I of beam 36, reflected by grating 32, and propagation angle θ of this radiation are given by equation (4) below:

$$I \propto [\sin(n \cdot \beta \cdot d \cdot \sin(\theta)/2)/\sin(\beta \cdot d \cdot \sin(\theta)/2)]^2 \quad \text{Eq. (4)}$$

In this equation n is the number of stripes 34, d is the spacing between lines 34 and β is the wave vector of beam 36 that is equal to $2 \cdot \pi/\lambda$ and λ is the wavelength of beam 36.

The intensity I according to Eq. (4) reaches a maximum value when:

$$(\beta \cdot d \cdot \sin(\theta)/2)) = i \cdot \pi \quad \text{Eq.(5)}$$

This occurs when I is an integral number known as the order of the reflection.

When substituting $2 \cdot \pi/\lambda$ for β in Eq. (5) it takes the form:

$$\sin(\theta) = i \cdot \lambda/d \quad \text{Eq.(6)}$$

For both types of the gratings, the diffraction (transmitting—FIG. 1a) grating and the reflecting grating (FIG. 1b), the mathematical formulas are the same.

The angles θi in which the intensity of the radiation that comes from the gratings is maximal are known as the diffraction orders i of the gratings. Accordingly, the angles θi of the transmission and reflecting orders are given by Eq.(7).

$$\sin(\theta i) = i \cdot \lambda/d \quad \text{Eq.(7)}$$

This occurs when i is an integral number and can get the values +/−0, 1, 2, . . .

The incident angle ϕ of the incoming radiation is measured relative to a normal to the grating. When the incident angle ϕ, of the radiation that hits diffracting and reflecting gratings is off the normal to the grating, i.e., it differs from an incident angle equal to zero, then Eq.(7) becomes:

$$\sin(\theta i) + \sin(\phi) = i \cdot \lambda/d \quad \text{Eq.(8)}$$

This means that the whole pattern of interference is rotated by an angle ϕ. For a diffracting grating it means that the zero order of the grating is located on a line along which the incident radiation propagates toward the grating. For a reflecting grating it means that the zero order of the grating is located on a line that is symmetric with respect to the normal of the grating. I.e., it forms an angle that is equal in magnitude on the opposite side of the normal of the grating surface.

Figure 2A:
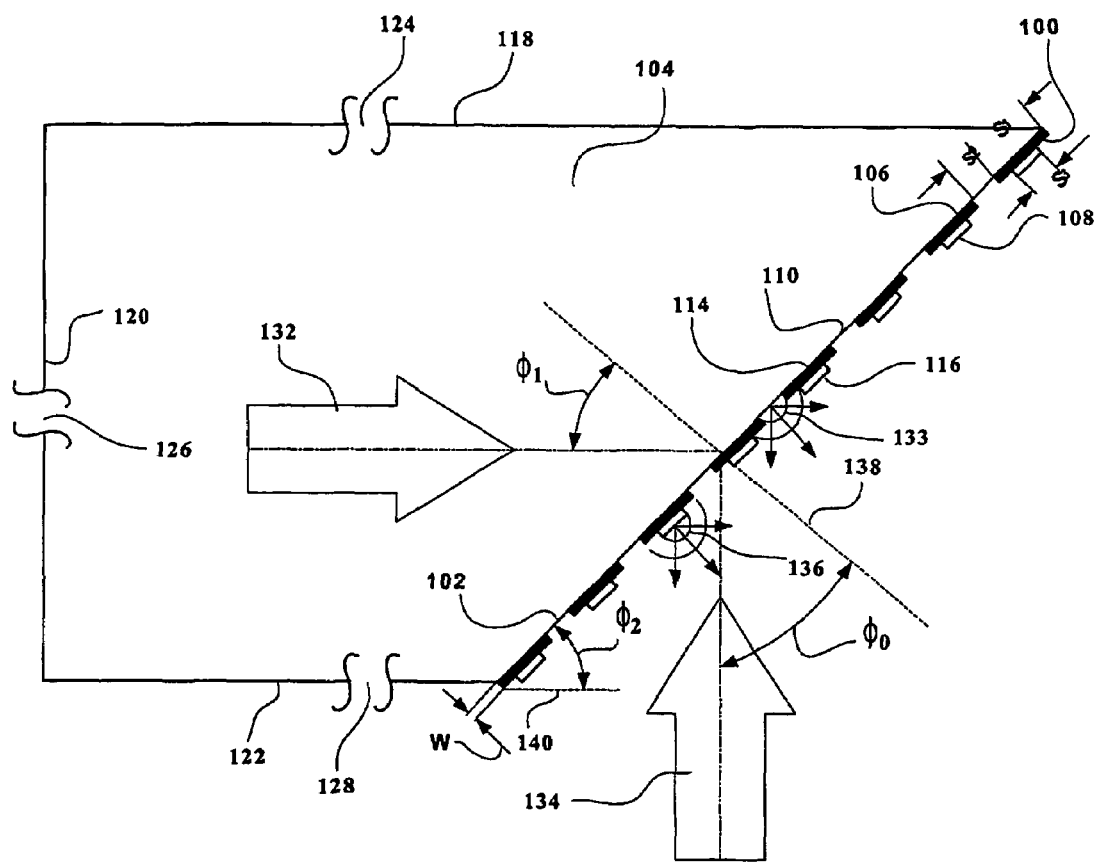
FIGS. 2a and 2b are illustrations of certain principles of optics involved in the operation of transmitting and reflecting gratings combined together, in accordance with an embodiment of the inventions disclosed.

FIG. 2a is a side view and schematic illustration according to a combination 100 of transmitting and reflecting gratings formed on a common surface 102 of transparent block 104 according to embodiments of inventions disclosed. Block 104 can be made, for example, of semiconductors such as Si, GaAr, InGaAr, quartz, glass, silica, fused silica or plastic. A block is not essential as may be observed by inspection, but provides a convenient mechanism for manufacture and support of the grating. Alternatively a clear planar piece of material may be used to support the gratings.

Combined grating 100 includes two layers of gratings 106 and 108. Grating layer 106, on surface 102, is made of high-absorption material that is not transparent and has a surface with a very low reflection. For example, grating layer 106 can be made of silver oxide, which is widely used in the field of projection masks for photolithography.

Grating layer 108 is made of a material having a surface with a very high-reflectivity. For example, grating layer 108 can be made of indium oxide in a similar way to that used to fabricate reflectors and mirrors.

Grating layers 106 and 108 can be produced by standard techniques used to produce gratings. For example layer 106 is formed continuously over surface 102 and coated by a photoresist material. The photoresist is exposed with Ultra Violet (UV) radiation by known holographic techniques. (Holography involves the interference of two beams having a predetermined angle between them which produce an interference pattern.) Also exposure can be made through a projection mask.

The photoresist is backed in an oven after its exposure and is dipped (or soaked) in a developer to create openings in the photoresist, above layer 106, in the areas that were exposed. Dipping (or soaking) the photoresist is done in a selective etching acid, such as acetic acid, which does not attack the photo resist and surface 102. This creates, by selective etching, openings 110 in layer 106 through the openings in the photoresist. After removing the photoresist with acetone, layer 106 on surface 102 of block 104 takes the form of grating layer 106 having multiple lines 114 and multiple openings 110.

For example, the following process, known as lift-off, can produce grating layer 108:

1. Cover grating layer 106 with a layer of photoresist.
2. Create centered openings in the photoresist above lines 114 of grating 106, by the exposing and developing techniques described above.
3. Deposit or evaporate a continuous layer 108 on top of the patterned photoresist.

Dip layer 108 in acetone vibrated at an ultrasonic frequency (lift-off technique)

The liftoff technique removes all the areas that were on top of the photoresist material and leaves only lines 116 of reflecting grating-layer 108; these are centered on lines 114 of grating layer 106.

The formation of grating layer 108 centered on top of grating layer 106 completes the fabrication of combined grating 100.

Lines 118, 120, and 122 of block 104 have cuts 124, 126, and 128, respectively. Cuts 124, 126, and 128 indicate that the drawing of FIG. 2a is not scaled. Especially, the dimensions of combined grid 100 are not scaled. In reality the dimensions of combined grating 100 are very small relative to the dimensions of block 104 and they are enlarged in FIG. 2a for clarity.

For example, the widths S1, S2, and S3 of openings 110, lines 114, and lines 116 of grating layers 106 and 108, respectively, are of the same order of magnitude as the wavelength λ of the radiation used in optical communications (about 1.3 μm and 1.5 μm). The total thickness W of grating layers 106 and 108 together can be less than 0.1 μm and is negligible with respect to the radiation wavelength λ.

When planar-wave beam 132 is directed toward combined grating 100, part of it passes through openings 110 and is diffracted isotropically with a cylindrical wavefront 133 to create an interference pattern based upon grating layer 106. The other part of beam 132 is absorbed by lines 114 and is lost.

When planar-wave beam 134 is directed toward combined grating 100, part of it passes through openings 110 and is lost. Lines 116 of grating layer 108 reflect the other part of beam 134.

Reflecting lines 116 of grating layer 108 may be deposited or evaporated at a high-rate to create a grainy surface, which produces a diffuse-reflecting surface. The diffuse-reflecting surface of lines 116 reflects beam 134 isotropically as beam 136 having a cylindrical wavefront to create an interference pattern based upon grating layer 108.

When planar-waves 132 and 134 are applied simultaneously, combined grating 100 acts simultaneously as the combination of grating layers 106 and 108. When the beam to be transmitted 132 is in phase with the beam to be reflected 134 and both have equal intensities, the interference pattern of combined grating 100 is like gratings 106 or 108. However in this case grating 100 has half the pitch (double periodicity or double the density in terms of numbers of lines per unit length).

Accordingly, when only beam 132 or 134 is directed toward combined grating 100, then the grating 100 produces an interference pattern that is about the same for both situations corresponding to the interference pattern of gratings 106 or 108, respectively. When both beams 132 and 134 are directed toward combined grating 100, then grating 100 produces an interference pattern that is a combination of the interference patterns corresponding to the interference pattern of gratings 106 and 108. It is equivalent to an interference pattern of a grating having half of the pitch of gratings 106 or 108. The latter is of lower order than either of the former patterns.

One important condition that is preferably maintained is the phase-matching between beam 133 diffracted from openings 110 of grating layer 106 and beam 136 reflected from lines 116 of grating layer 108. This phase-matching preferably should be maintained over and along surface 102. Assuming that beams 132 and 134 have the same wavelength λ, then the phase-matching depends on angles φ0, φ1, and φ2. Angles φ0 and φ1 are the impinging incident angles of beams 132 and 134 on combined grating 100, respectively, and are measured relative to line 138 that is normal to grating 100 and surface 102. Angle φ2 is the angle between line 140 (parallel to line 122) and surface 102 when line 140 is normal to the direction in which beam 134 propagates.

Phase-matching along surface 102 is achieved when the following mathematical condition is fulfilled:

$$\beta 1 \cdot \sin(\phi 1) = \beta 0 \sin(\phi 0) \qquad \text{Eq. (9)}$$

Here $\beta 1 = 2\pi \cdot N1/\lambda$ and $\beta 0 = \beta 1 = 2\pi \cdot N0/\lambda$ and N1 is the refractive-index of the material of block 104. No is the refractive-index of the air and is equal to 1. When substituting the expression for β in Eq. (9) and reorganizing its form, Eq. (9) takes the form of the optical law known as Snell's law:

$$N1 \cdot \sin(\phi 1) = N0 \cdot \sin(\phi 0) \qquad \text{Eq. (10)}$$

The mathematical relationships between φ0, φ1, and φ2 are:

$$\phi 0 = 90° - \phi 2 \text{ and } \phi 0 = \phi 2 \qquad \text{Eq. (11)}$$

By substituting Eq. (11) in Eq. (10) and reorganizing Eq. (10) we get:

$$\phi 2 = \text{arc tang}(N1/N0) = \text{arc tang}(N1). \qquad \text{Eq. (12)}$$

For example, if $N1=1.5$ then $\phi 2=56.3°$.

Figure 2B:
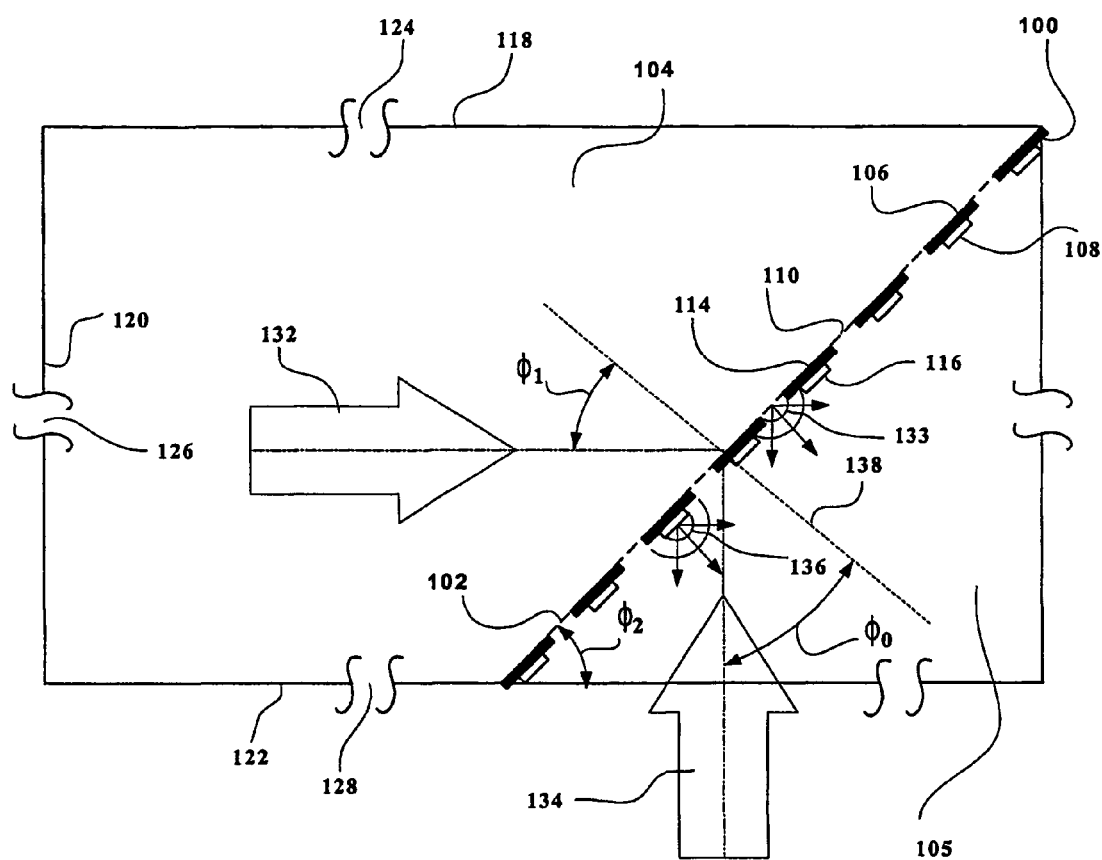

FIG. 2b shows an additional design for a combined transmitting and reflecting grating designed according to embodiments of inventions disclosed. This design is similar to that of FIG. 2a and thus the same numerals are used to indicate similar parts. The design of combined grating 100 is achieved by bonding block 105 to block 104 of FIG. 2a. Thus, the parts of the design in FIG. 2b that are similar to those of FIG. 2a are not explained again here.

Block 105 may be made of the same material as block 104 and thus may have the same index of refraction. Block 105 may be bonded to block 104 by index-matching glue having the same refractive index as the blocks. Such glue is commonly used in optical components. Such glue does not cause any reflection of the radiation that passes between blocks. The absence of such reflection hides surface 102; therefore it is illustrated by a broken line. Avoiding reflection between blocks allows complete transmission of beam 132 through openings 110. Because of this, the refractive index on both sides of combined grating 100 is the same and is equal to N1.

By substituting index N0 with index N1 in Eqs. (11). &(12) we get:

$$\phi 0 = \phi 1 = \phi 2 = 45°.$$

Figure 3:
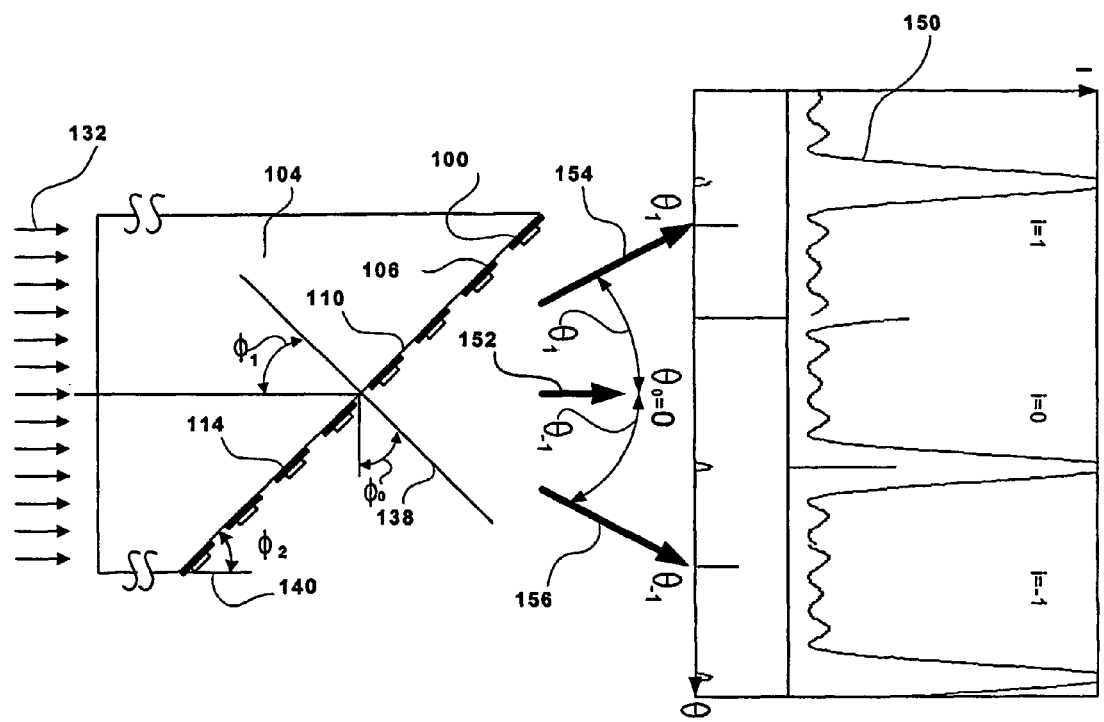
FIG. 3 illustrates an interference pattern of a combined grating utilized in certain embodiments of the inventions disclosed.

FIG. 3 schematically illustrates the interference pattern of combined grating 100. Grating 100 is illustrated according to its version shown in FIG. 2a but it can be designed without any limitation according to the design shown in FIG. 2b. Beam 132 enters to transparent block 104 without direction change and impinges on combined grating 100 at incident angle φ1 relative to the normal 138 of grating 100. Angles φ0, φ1, and φ2 are adjusted according to Eqs (11) and (12), with angle φ2 measured relative to line 140. Beam 132 impinges on grating 100 on the side that includes grating layer 106. Part of the radiation that passes through openings 110 is diffracted and interferes to produce an interference pattern. The interference pattern has three orders in which constructive interference exists. These project in the directions of θ0, θ1, and θ−1 indicated by beams 152, 154, and 156, respectively, and correspond to the interference indices i=0, 1, and −1.

Graph 150 illustrates a curve of the intensity I of (shown in relative units) versus the interference angle θ (measured in radians). The interference orders of graph 150 are indicated by their indices (i=0, 1, and −1). The axis of graph 150, along which interference angle θ is measured, is scaled to mach between angles θ0, θ1, and θ−1, at which orders 0, 1, and −1 exist on this axis, and angles θ0, θ1, and θ−1 along which beams 152, 154, and 156 propagate, respectively.

According to Eq. (8) the maximum value that the index of the orders i can get is the value that satisfies the relation: $\sin(\theta i) + \sin(\phi 1) = i \cdot \lambda/d$. The maximum absolute value of sin (θi) is 1. The zero order on axis θ of graph 150 was chosen to be at the origin. This means that for the presentation of graph 150, $\sin(\phi 1)$ is chosen to be zero. Thus $i \cdot \lambda/d$ should be less than 1 for positive values of i and more than (−1) for negative values of i. The fact that graph 150 has only three orders means, according to Eq. (8), that the index i can only have the values of 0 and ±1 which means that the absolute value of index is less than 2 (i<2). Accordingly the pitch spacing d of grating layer 106 must satisfy d<2λ.

Figure 4:
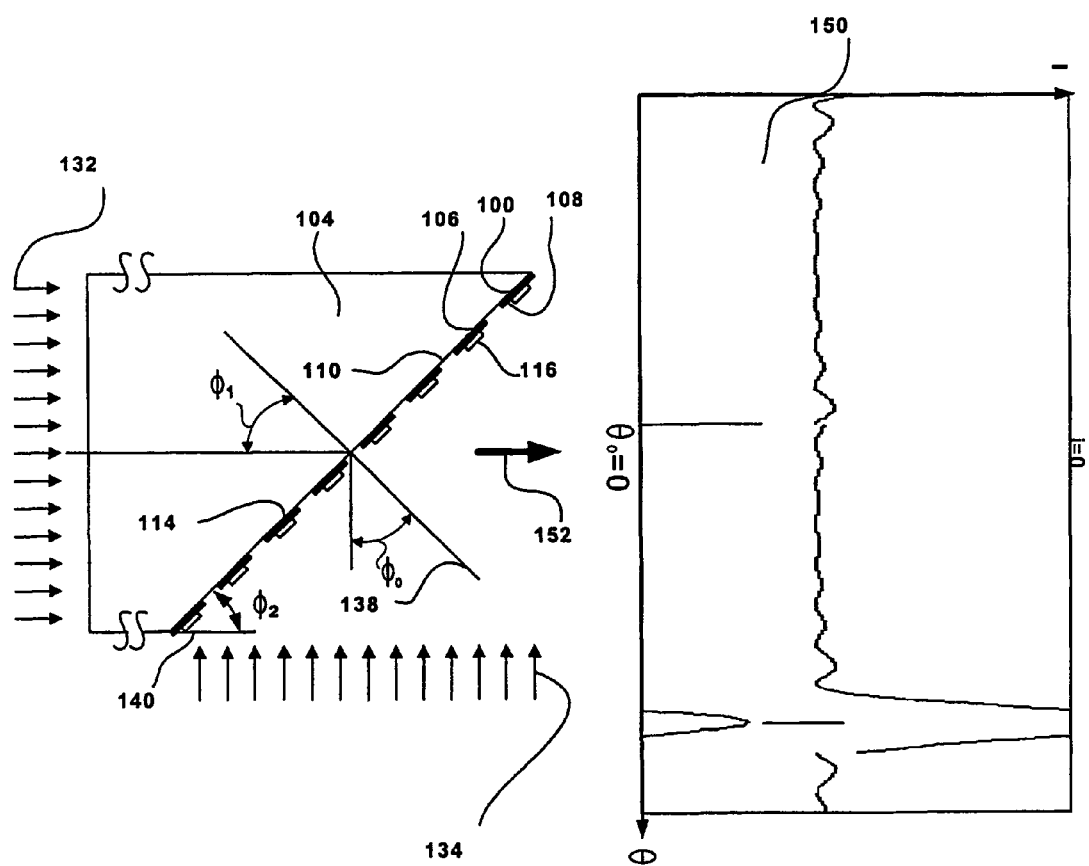
FIG. 4 is an illustration of an interference pattern of a combined grating irradiated from two directions for purposes of explaining certain embodiments of the inventions disclosed.

FIG. 4 schematically illustrates the interference pattern of combined grating 100 irradiated from two directions. Grating 100 is consistent with the nomenclature and description provided with reference to FIG. 2a, but can also be designed, without any limitations, according to the design shown in FIG. 2b or others. Beam 132 enters transparent block 104 without direction change and impinges on combined grating 100 at incident angle $\phi 1$ relative to line 138 that is normal to grating 100. Angles $\phi 0$, $\phi 1$, and $\phi 2$ are adjusted according to Eqs (11) and (12) for maintaining phase-matching between beams 133 and 136, transmitted and reflected, respectively, by grating 100. Angles $\phi 0$, $\phi 1$, and $\phi 2$ are calculated by taking into account the value of the refractive index N1 of the material of block 104. Angle $\phi 2$ is measured relative to line 140.

Beam 132 impinges on grating 100 on the side with grating layer 106. Part of beam 132 is absorbed by lines 114 and is lost. The other part of beam 132 passes through openings 110 and is diffracted out from grating 100, as beam 133.

Beam 134 impinges on grating 100 on its other side that includes grating layer 108. Part of beam 134 passes through openings 110 and is lost. The other part of beam 134 is reflected isotropically from lines 116 of grating layer 108 of combined grating 100, as beam 136.

Beams 132 and 134 impinge on grating 100 simultaneously. Lines 116 are centered between openings 110 and thus the pitch for both grating layers 106 and 108 is the same. Beam 133, diffracted out from openings 110, and beam 136, reflected from lines 116, interferes to produce an interference pattern. The pitch of combined grating 100 is the space between lines 116 and openings 110 and thus is equal to half of the pitch of grating layer 106 or grating layer 108. The interference pattern of grating 100 has one order (zero order) in which constructive interference exists in the directions of $\theta 0$ indicated by beam 152 and corresponds to the interference index i=0.

Graph 150 illustrates a curve of the intensity I of the interfered radiation (shown in relative units) versus the interference angle $\theta$ (measured in radians). The interference order of graph 150 is indicated by its index (i=0). The axis of graph 150 along which interference angle $\theta$ is measured is scaled to match angle $\theta 0$ at which order 0 exists on this axis, and angle $\theta 0$ along which beam 152 propagates.

According to Eq. (8) the maximum value that the index of the orders i can have is the value that still maintains $\sin(\theta i)+\sin(\phi 1)=i\cdot\lambda/d$. The maximum absolute value that $\sin(\theta i)$ can have is 1. The zero order on axis $\theta$ of graph 150 was chosen to be at the origin. This means that for the presentation of graph 150, $\sin(\phi 1)$ is chosen to be zero. Thus $i\cdot\lambda/d$ should be less than 1 for positives values of i and more than (−1) for negative values of i. The fact that graph 150 has only one order means, according to Eq. (8), that index i can have only the values of 0. This means that the absolute value of index i<1. Accordingly the pitch spacing d of combined grating 100 must satisfy d<λ and it is half of the pitch d of grating layers 106 or 108, as derived above from Eq. (8) as explained in connection with FIG. 3.

The above result is in agreement with the pitch relationships between grating layers 106 and 108 and combined grating 100.

While grating layers 106 and 108 have pitch d between openings 110 or between lines 116, respectively, combined grating 100 has pitch d/2 between openings 110 and lines 116. On the other hand the conditions for producing the interference patterns of graph 150 in FIG. 3 (three orders of interference produced by grating layer 106) and of graph 150 in FIG. 4 (one interference order produced by combined grating 100) are d<2λ and d<λ, respectively. These conditions are identical to the relationships between the pitches of grating 106 (or 108) and grating 100 in which grating 100 has half of the pitch of grating 106 (or 108).

Beam 134 is symmetric to beam 132 with respect to grating 100 in terms of phase-matching. Grating layers 106 and 108, on both sides of grating 100, have the same pitch. Accordingly, it is clear that when only beam 134 impinges on grating 100, it will produce an interference pattern similar to that shown in graph 150 of FIG. 3 created when only beam 132 impinges on grating 100.

Figure 5:
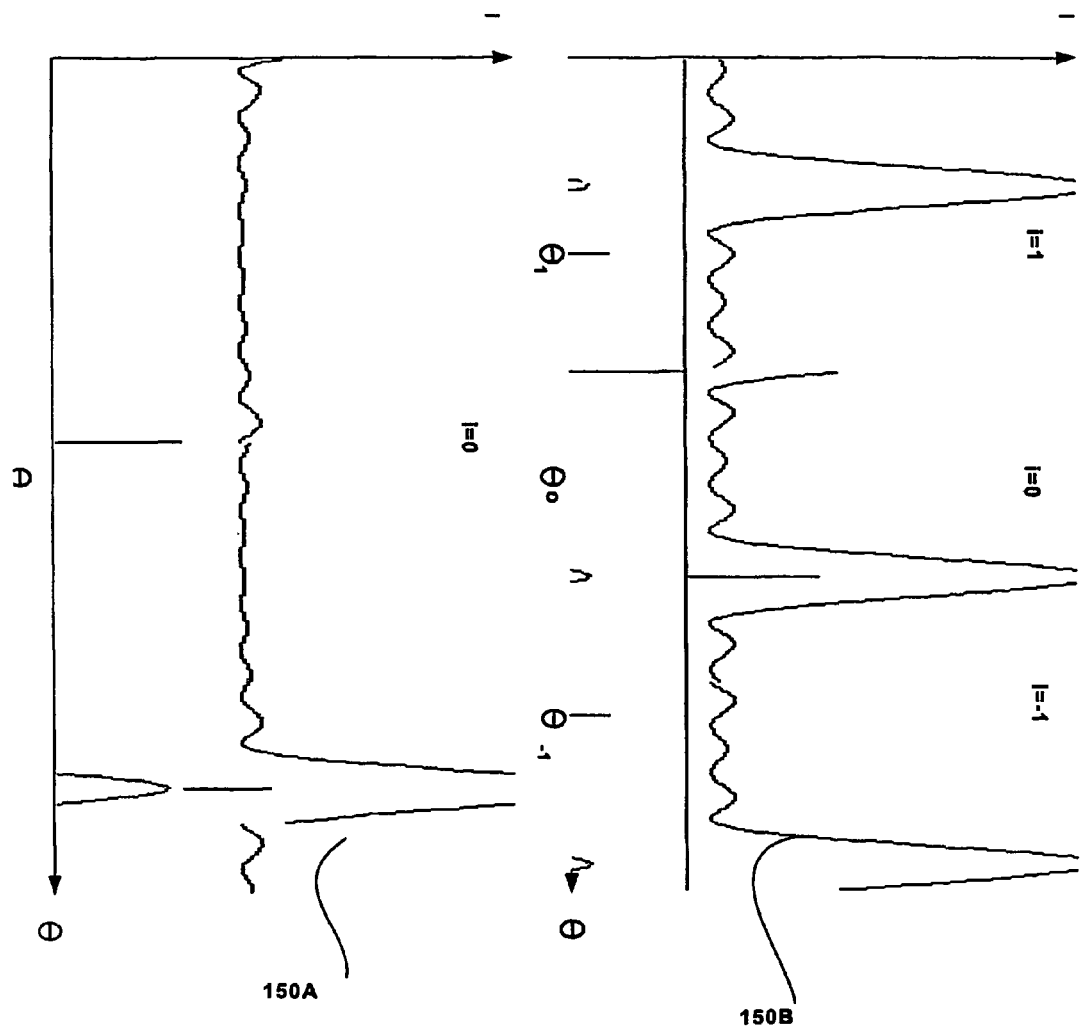
FIG. 5 shows interference patterns of the combined grating with different illuminations for purposes of describing certain principles of optics involved in the operation of certain embodiments of the inventions disclosed.

FIG. 5 illustrates two graphs 150A and 150B showing two curves of the interference intensity I versus the interference angle. The intensity I is shown in relative units and the angle $\theta$ is measured in radians.

Graph 150B is related to the situation illustrated by graph 150 of FIG. 3, which is produced by irradiating combined grating 100 from one direction, either by beam 132 or by beam 134. The interference pattern of graph 150B has three orders 0, 1, and −1 at angles $\theta_0$, $\theta_1$, and $\theta_{-1}$, respectively.

Graph 150A illustrates the situation of FIG. 4, which is produced by irradiating combined grating 100 from two directions and simultaneously by beams 132 and 134. The interference pattern of graph 150A has one zero order at angle $\theta_0$.

The fact that each of the three interference orders 0, 1, and −1 appears at different angles $\theta_0$, $\theta_1$, and $\theta_{-1}$, respectively, allows the separate collection of the radiation of each order. Accordingly orders 0, 1, and −1 of the interference pattern shown in graph 150B can be collected by only three ports $P_0$, $P_1$, and $P_{-1}$, respectively.

Figure 6A:
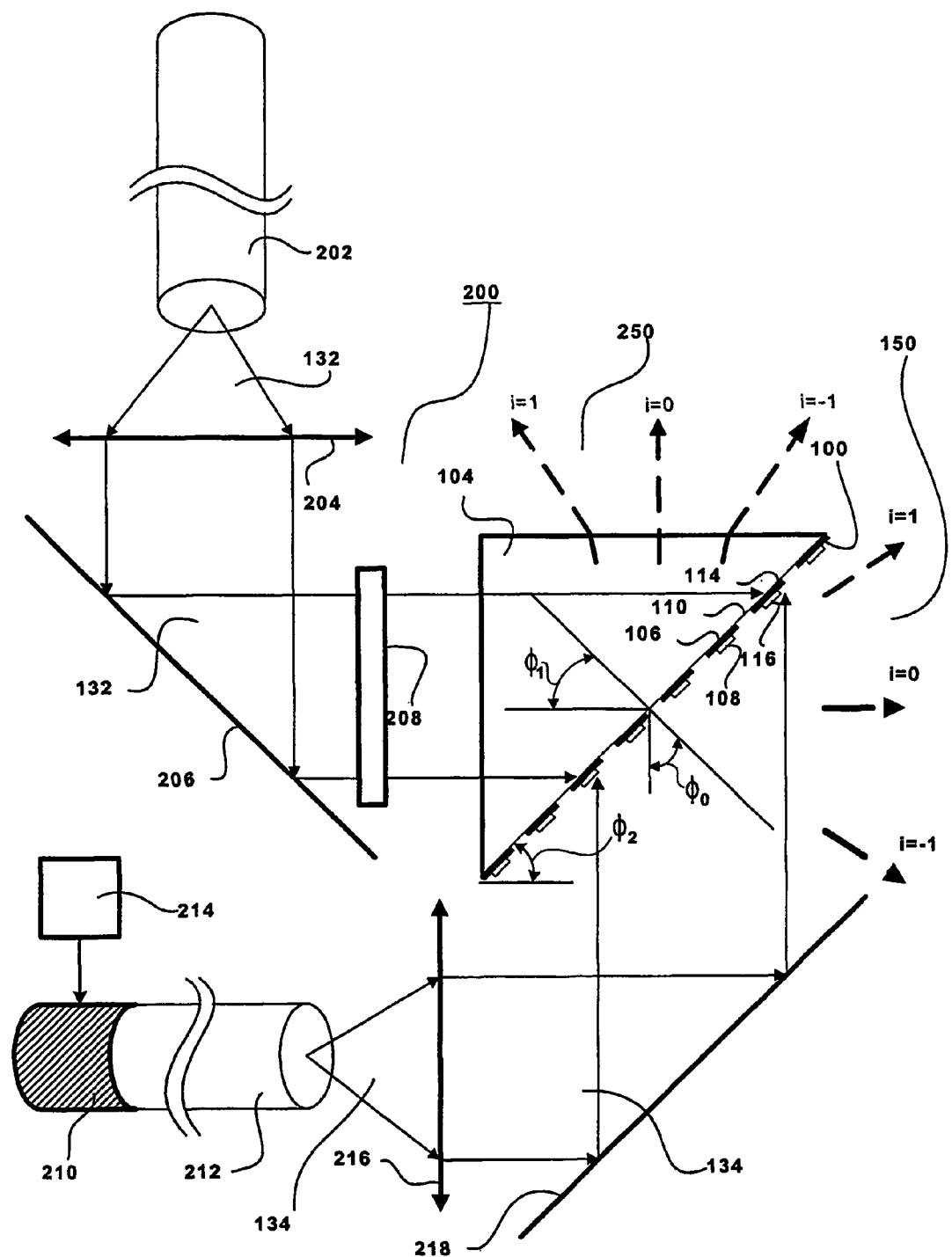
FIG. 6a illustrates the controlling of the interference patterns of a combined grating for purposes of explaining certain principles of optics involved in the operation of embodiment of inventions disclosed.
Figure 6B:
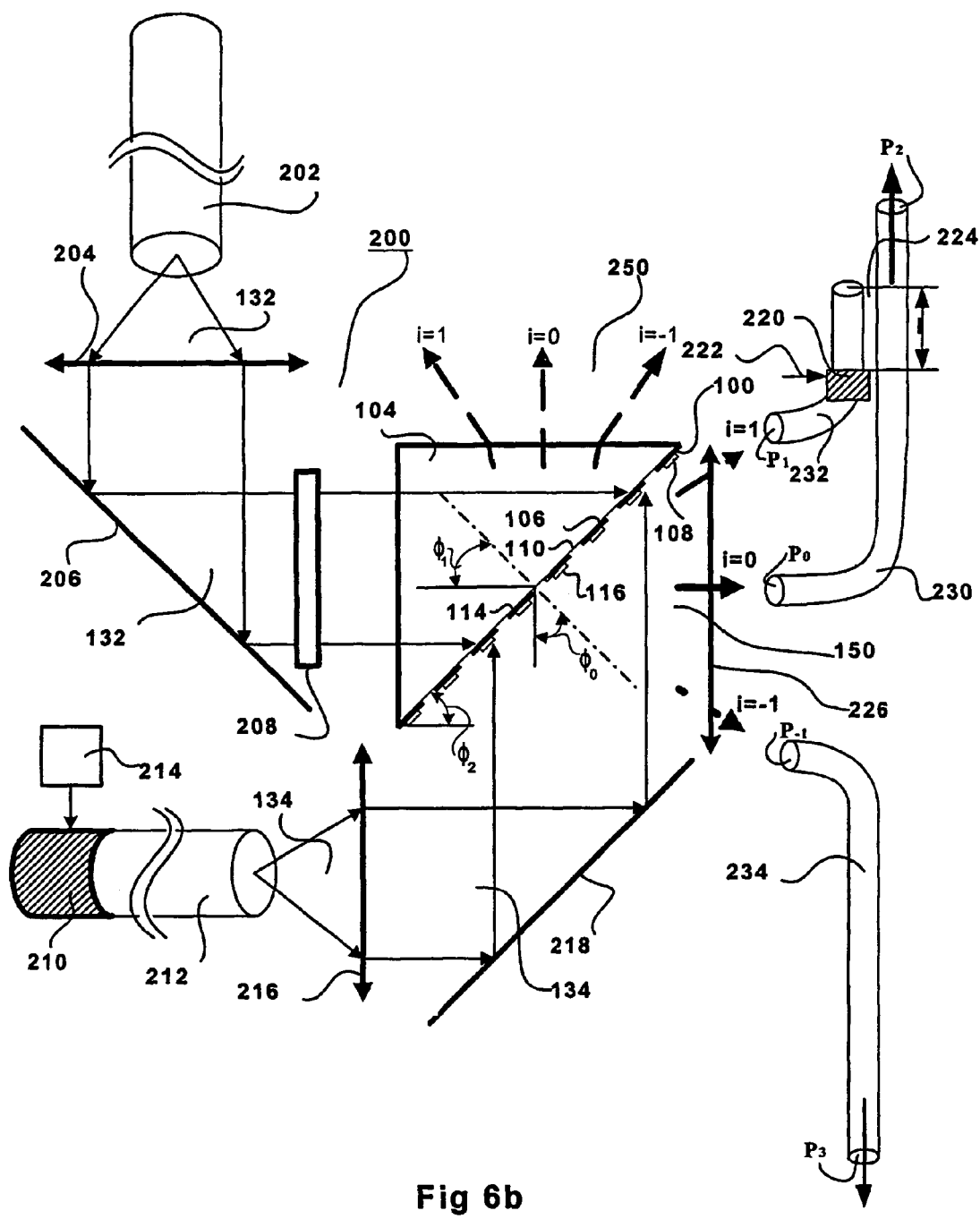
FIG. 6b is an illustration of all-optical switching of an information carrier-beam between ports using a control beam according to certain embodiments of inventions disclosed.

As illustrated in FIG. 6b (discussed in detail below) ports $P_0$ and $P_{-1}$ can be joined together into one port $P_2$ in such a way that the beams they collect and transfer to port $P_2$ cancel each other under the conditions illustrated in graph 150B. In this configuration, illustrated in graph 150B, the output at port $P_2$ is zero (the difference between the intensities of order 0 and −1) and the output at port $P_1$ contains the intensity of order 1.

For the same configuration and for the situation illustrated in graph 150A, the output, at port $P_0$, contains the intensity of order 0 that is the only existing order. Order −1 has zero intensity and thus the difference between the intensities of orders 0 and −1, which appears in port $P_2$, equal the intensity of order 0. In this case, the output at port $P_1$, which equals the intensity of order 1, is equal to zero.

Accordingly, for the configuration of ports $P_0$, $P_1$, $P_{-1}$, and $P_2$, described above, the output of port $P_2$ is zero for the situation shown in graph 150B. This is related to the case when grating 100 is irradiated only from one side, either by beam 132 or by beam 134. On the other hand, for the situation shown by graph 150A, which is related to the case where combined grating 100 is irradiated simultaneously on both of its sides by beams 132 and 134, port $P_2$ contains the intensity of the only existing order, order 0.

Similarly, for the configuration of ports $P_0$, $P_1$, $P_{-1}$, and $P_2$, described above, the output of port $P_1$ contains the intensity of order 1 for the situation shown in graph 150B. this is related to the case when combined grating 100 is irradiated simultaneously on both of its sides by beams 132 and 134. On the other hand, for the situation shown by graph 150A, related to the case when grating 100 is irradiated only from one side either by beam 132 or by beam 134, port $P_1$ contains the intensity of order 1, which is zero.

Thus we have moved from irradiating grating 100 simultaneously on both of its sides by beams 132 and 134 to irradiating grating 100 only on one of its sides by either beam 132 or beam 134. This move switches the radiation intensity from port $P_2$ to port $P_3$ and vice-versa.

FIG. 6a—Controlling Interference Patterns Of Combined Grating

FIG. 6a illustrates optical system 200, which controls interference pattern 150 (not shown) of combined grating 100, by controlling different illuminations of beams 132 and 134 on grating 100. Optical fiber 202 guides and emits beam 132 toward lens 204 that converts beam 132 to parallel beam 132. Beam 132 is the information carrier beam used in optical communication. Reflector 206 receives beam 132 and reflects beam 132 toward attenuator 208, which transmits beam 132 toward transparent block 104. Beam 132 enters block 104 without direction change and propagates in block 104 toward grating layer 106 of combined grating 100.

Laser 210 is optically coupled to optical fiber 212 and is controlled by control unit 214. Fiber 212 guides and emits beam 134, produced by laser 210, toward lens 216 that converts beam 134 into parallel beam 134. Beams 132 and 134 have the same wavelength $\lambda$ and lenses 204 and 216 can be, for example, of the type of Graded Index (GRIN) lens commonly used to expand the beams emitted from optical fibers. Lens 216 direct parallel beam 134 toward reflector 218 that reflect beam 134 toward grating layer 108 of combined grating 100.

Incident angles $\phi 1$ and $\phi 0$ of parallel beams 132 and 134, respectively, and angle $\phi 2$ dictate the orientation of combined grating 100. These angles are adjusted to maintain phase-matching between beam 132, transmitted by grating 100 and beam 134, reflected by grating 100. Attenuator 208 is adjusted to assure that the intensity of beam 132, transmitted by grating 100, is equal to the intensity of beam 134, reflected by grating 100.

Wen control unit 210 turns off laser 210, beam 134 does not exist. In this case only beam 132 impinges on combined grating 100 on the side that includes grating layer 106. The latter has a pitch spacing d that satisfies, for example d<2$\lambda$. Grating layer 106 of combined grating 100 acts as a diffraction grating on beam 132 and produces interference pattern 150 of three beams corresponding to interference orders having indices i=0, 1, and −1. In this case the interference pattern 150 produced by beam 132 and grating layer 106 of grating 100 is similar to the interference pattern illustrated by graph 150B of FIG. 5.

When control unit 214 turns on laser 210, beams 134 and 132 hit the combined grating 100 on both of its sides, including grating layers 106 and 108. Beam 132 impinges on combined grating 100 on its side that includes grating layer 106 and beam 134 impinges on combined grating 100 on its other side that includes grating layer 108. Reflecting lines 116 of grating layer 108 that reflect beam 143 are centered between openings 110 of grating layer 106, which transmits beam 132. Thus grating layers 106 and 108 have the same pitch d. Thus, combined grating 100 has a pitch d that is half the pitch d of gratings 106 and 108. Accordingly, pitch d of combined grating 100 satisfies the relationship d<$\lambda$. Combined grating 100 acts on beams 132 and 134, impinging on both of its sides simultaneously, and produces interference pattern 150 of one beam corresponding to interference order having only the index i=0. In this case interference pattern 150 produced by beams 132, 134 and combined grating 100 is similar to the interference pattern illustrated by the curve of graph 150A of FIG. 5.

Each time control unit 214 turns off control beam 134, interference pattern 150 includes three beams (interference orders 0, 1 and −1). In the complementary cases when control unit 214 turns on control beam 134, the interference pattern 150 includes only one beam (interference orders 0) and orders 1 and −1 disappear. In these cases, grating layer 106 and beam 134 produce interference pattern 250, which has three beams (interference orders 0, 1, −1), which change their orientation according to Snell's law while exiting block 104. Interference pattern 250 exists every time that beam 134 is on, even when beam 132 is off.

FIG. 6b illustrates the optical system 200 of FIG. 6a, described above, with receivers or ports $P_0$, $P_1$, $P_{-1}$, and output ports $P_2$, and $P_3$ arranged to receive and convey energy from the interference pattern 150 via a coupling lens 226. When control beam 134 is off, interference pattern 150 includes three beams. These beams correspond to interference orders having the indices i=0, 1, −1 and are optically coupled by coupling lens 226 into ports $P_0$, $P_1$, and $P_{-1}$, respectively.

Ports $P_0$, $P_1$, and $P_{-1}$ may be the inputs of optical fibers 230, 232, and 234, respectively. Fiber 230, 232, and 234 guide the radiation from their inputs to their outputs (ports $P_2$ and $P_3$), respectively. Accordingly fiber 234 guides the radiation of interference order −1 to its output $P_3$. Instead of optical fibers, the ports may be termini of other types of optical channel mechanism such as a waveguide, light pipe, mirrors, optical network, etc. depending on the downstream processes to be used. In the current device, further processing is provided to direct most of the energy toward a signal at port $P_2$ for a non-interference condition and one at port $P_3$ for a coincidence condition.

Directional coupler 224, whose coupling length 1 is adjusted to produce a 3 dB directional coupler, couples fibers 230 and 232. In coupler 224, half of the intensity in fiber 230 is transferred to fiber 232 with a phase shift of j where j is a complex number equal to $(-1)^{1/2}$. Similarly, half of the intensity in fiber 232 is transferred to fiber 230 with a phase shift of j that is equivalent to phase shift of $\pi/2$ radians.

Phase shifter 220 shifts the phase of the radiation in fiber 232 by $\pi/2$ radians prior to the propagation of the radiation into the coupling region of directional coupler 224. Accordingly the radiation transferred from fiber 232 to fiber 230 has a phase shift of $\pi/2+\pi/2=\pi$ radians relative to the radiation that propagates in fiber 230.

The initial radiation intensities of the beams in ports $P_0$ and $P_1$ are the same and equal to I. The intensity of the radiation in fiber 230 after directional coupler 224 is the sum of half of the initial radiation I in fiber 230 and half of the initial radiation I in fiber 232, which has a relative phase difference of $\pi$ radians. Thus the total radiation intensity in fiber 230 at port $P_2$ is I/2−I/2=0. This means that when control beam 134 is off, the intensity at port $P_3$ is I and the intensity at port $P_2$ is zero.

Alternatively when control beam 134 is on, interference pattern 150 includes only one beam corresponding to interference index i=0. The latter is coupled, by lens 226, into the input of fiber 230 through port $P_0$. Interference orders i=1 and −1 disappear and no radiation is coupled by lens 226, into fibers 232 and 234 through ports $P_1$ and $P-1$. Thus the intensity at port $P_3$ is zero. Half of the radiation coupled into fiber 230 at port $P_0$ is lost at directional coupler 224 and the remaining half propagates along fiber 230 to port $P_2$. This means that when beam 134 in on, the intensity at port $P_3$ is zero and the intensity at port $P_2$ is half of the initial intensity at port $P_0$. Accordingly, by turning control beam 134 on and off, the intensity of beam 132 can be switched from port $P_3$ to port $P_2$, and vice-versa.

The above description for the switching capability of the system of FIG. 6b is true for both operation modes of information carrier beam 132—the Continuous Wave (CW) mode and the pulse mode.

Phase shifter 220 can be of the type that applies pressure, by use of a piezoelectric crystal, on optical fiber 232 to change its refractive index and thus to change the phase of the radiation that propagates in fiber 232. Phase shifter 220 can be of the type that thermally changes the refractive index of fiber 232 to change the phase of the radiation that propagates in this fiber.

Alternatively, shifter 220 can be made of semiconductor material fabricated by thin film techniques that change its refractive index due to injection of charge carriers into its guiding media. This change in the refractive index shifts the phase of the radiation propagating in the media of shifter 220. In this case the shifter is a separate device and is not an integral part of fiber 232 and thus should have two ports for coupling fiber 232 into and from device 220. In all the above types of phase shifter 220, applying voltage to shifter 220 through electrode 222 activates shifter 220. Adjustment of the phase shift of shifter 220 is achieved by adjusting the applied voltage on electrode 222.

Phase matching can be obtained by use of a suitable calibration by closed-loop control. A calibration signal my be passed through the inputs of the devices of any of the foregoing embodiments and the phase adjusted by means of device such as a phase shifter 220 to provide the proper phase matching. As should be clear from the foregoing discussion, when the phases of the input signals match, the $p_2$ output, for example, should provide a peak. Due to temperature change, the properties of various optical components may drift, requiring the correction of the phase match. But this correction need only be done at fairly long intervals relative to the rate of data throughput through such devices and therefore does not present a significant obstacle. Suitable control systems for performing calibration are well within the state of the art and can be embodied in many different forms. The subject is therefore not crucial to the inventions disclosed and is therefore not discussed in greater detail herein.

Figure 7A:
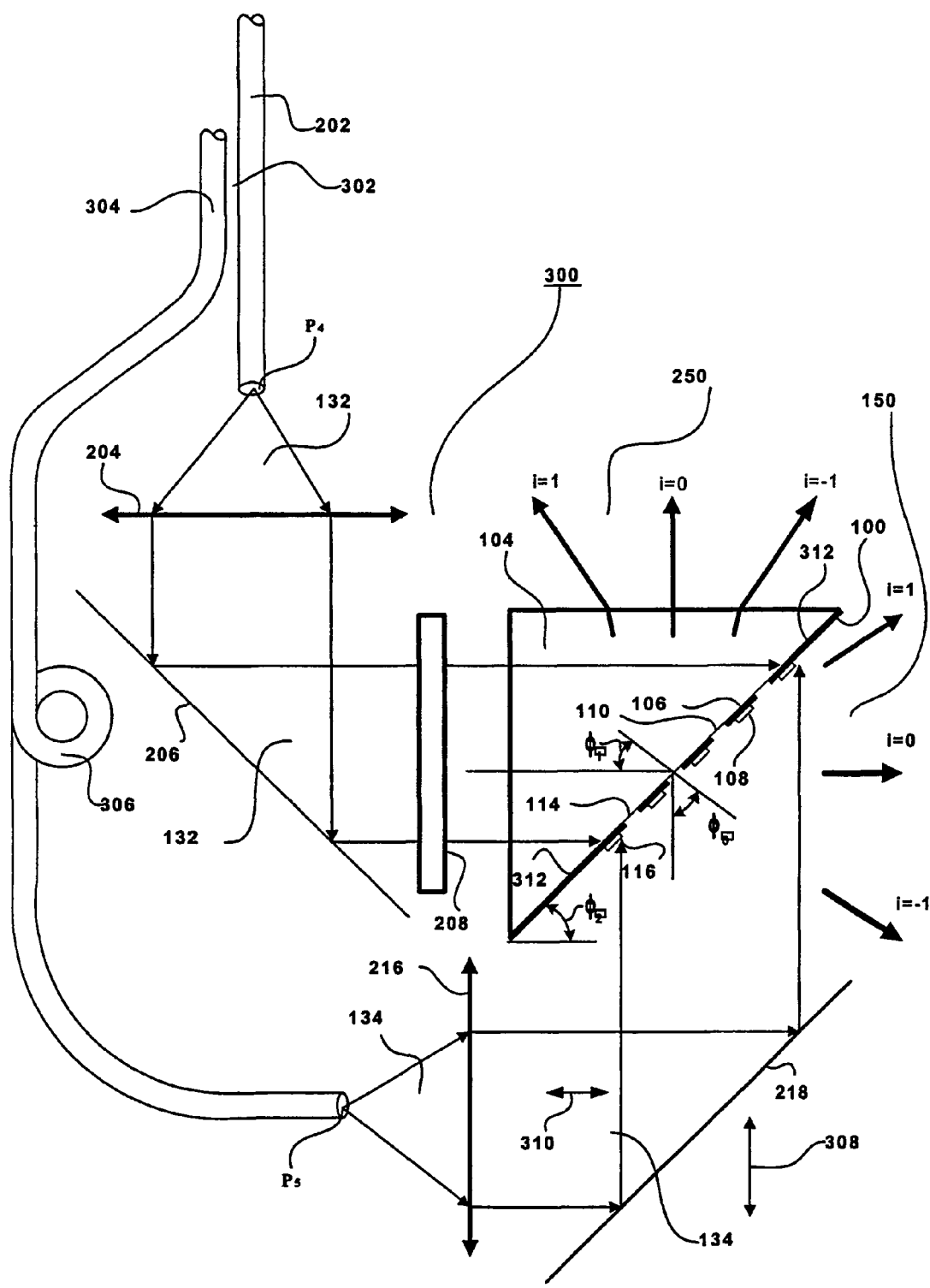
FIG. 7a shows additional all-optical design for controlling the interference patterns of a combined grating employed in certain embodiments of inventions disclosed.

FIG. 7a schematically illustrates an optical system 300 that is similar to optical system 200 of FIG. 6a. System 300 of FIG. 7a differs from system 200 of FIG. 6a only in the manner of where the control beam 134 comes from. Whereas in system 200 laser 210, controlled by unit 214, produces control beam 134, such control beam 134, in system 300, is produced by coupling part of the radiation of information-carrier beam 132 from optical fiber 202, into optical fiber 304. Directional-coupler 302 is a 3 dB directional coupler. Thus coupler 302 couples half of the energy of carrier beam 132 from fiber 202, in which beam 132 propagates, into fiber 304. The other half of the energy of beam 132 continues propagating along fiber 202 and is emitted out from port $P_4$ at the output of fiber 202. The radiation energy that is coupled into optical fiber 304 propagates and is guided along this fiber through delay-fiber 306 and is emitted, as control beam 134, from fiber 304 at its output through port $P_5$. Beams 132 and 134 are converted, by lenses 204 and 216, into wide beams 132 and 134, respectively, in the same way that this conversion is performed in system 200 of FIG. 6a.

The rest of the optical paths of beams 132 and 134, started from lenses 204 and 216 in system 300, respectively, are similar to the optical paths of beams 132 and 134, beginning from lenses 204 and 216 in system 200, respectively, as illustrated by FIG. 6a. The corresponding discussion is therefore omitted here.

Similarly, interference patterns 150 and 250 are produced, by beams 132 and 134, in a similar way, in both systems, system 200 and system 300 as illustrated in FIGS. 6a and 7a and explained above in the explanation of FIG. 6a. Thus the explanations given above for FIG. 6a will not be repeated here.

Reflector 218 is arranged to move along arrows 308 to gently adjust the length of the optical path between reflector 218 and combined grating 100 to assure phase-matching between beam 132 passing through grating 100 and beam 134 reflected from grating 100. While reflector 218 moves along arrows 308 it also causes undesired shifting of the beam 134 direction (indicated by arrows 310). To avoid any irradiation change of grating 100 by the movement of beam 134 along arrows 310, a non-reflecting, non-transmitting frame with high absorbency may be formed in the surrounding of grating 100. Frame 312 is narrower than the width of beam 134 and thus when bean 134 moves along arrows 310, the whole area of grating 100 remains irradiated.

Delay-fiber 306 produces a time delay $\Delta t$ between control beam 134 and carrier beam 132. An explanation of how the amount of delay $\Delta t$ affects interference patterns 150 and 250 is given below in the explanations for FIG. 7c.

Figure 7B:
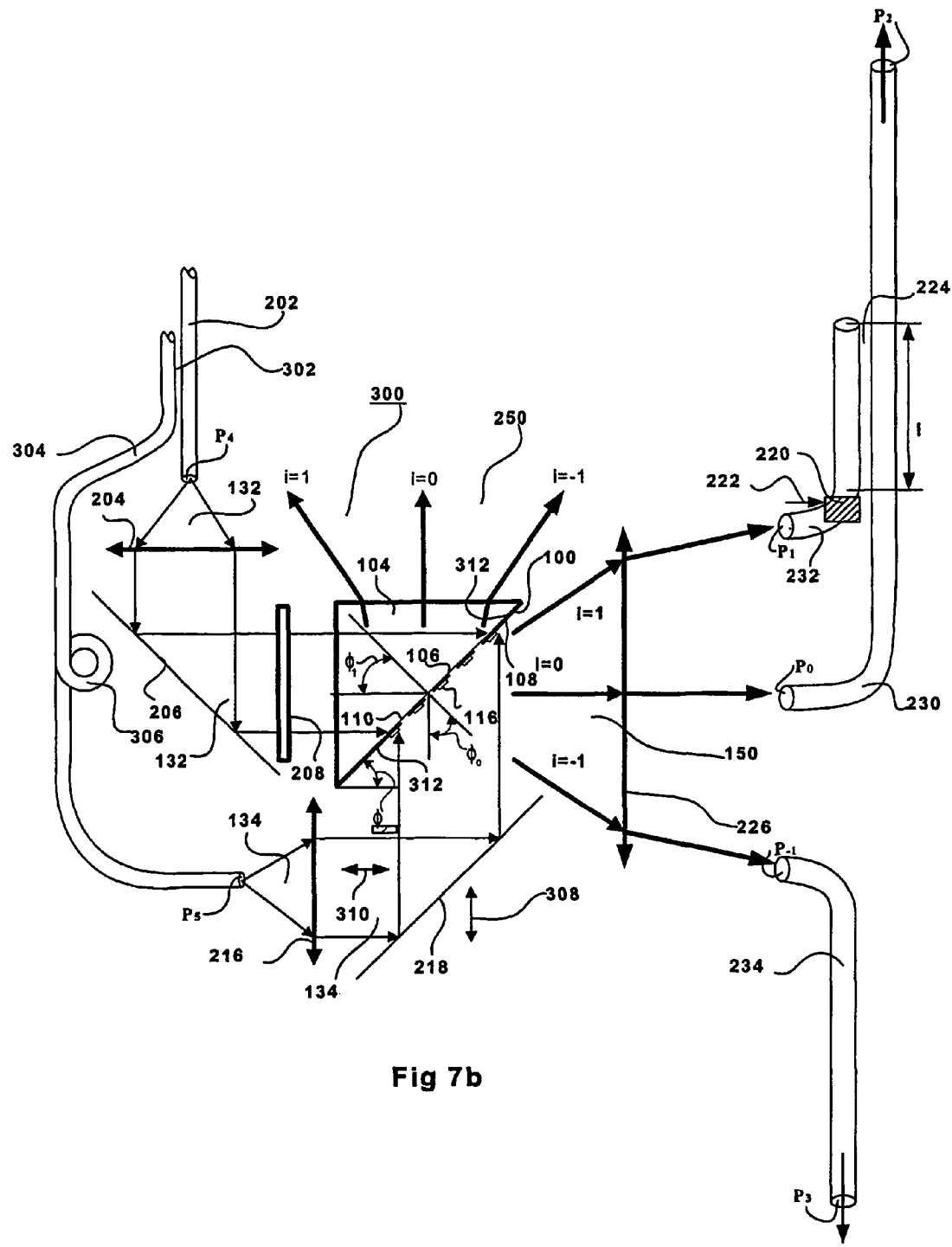
FIG. 7b is an illustration of an additional design for all-optical switching of an information carrier-beam between ports using a control beam according to certain embodiments of inventions disclosed.

FIG. 7b illustrates the same optical system 300 of FIG. 7a, described above, with additional ports $P_0$, $P_1$, $P_1$, $P_2$, and $P_3$ arranged to receive interference pattern 150 from coupling lens 226. Switching the emission of the radiation of information carrier-beam 132 between ports $P_2$ and $P_3$ of optical fibers 230 and 234 is achieved by changing interference pattern 150, having three beams (three interference orders i=0, 1, and −1) to only one beam (interference order i=0). The interference pattern 150 dictates which of ports, $P_2$ or $P_3$, is the one that emits carrier beam 132 in accord with the description attending FIG. 6b provided above.

Delay-fiber 306 produces a time delay $\Delta t$ between what might be termed a control beam 134 and data beam 132. The amount of delay $\Delta t$ affects interference patterns 150 and 250 and thus dictates the switching state between port $P_2$ and $P_3$. An explanation of how the amount of delay $\Delta t$ affects interference patterns 150 and 250 and thus the switching position between ports $P_2$ and $P_3$ is given below in the explanations for FIG. 7c.

Figure 7C:
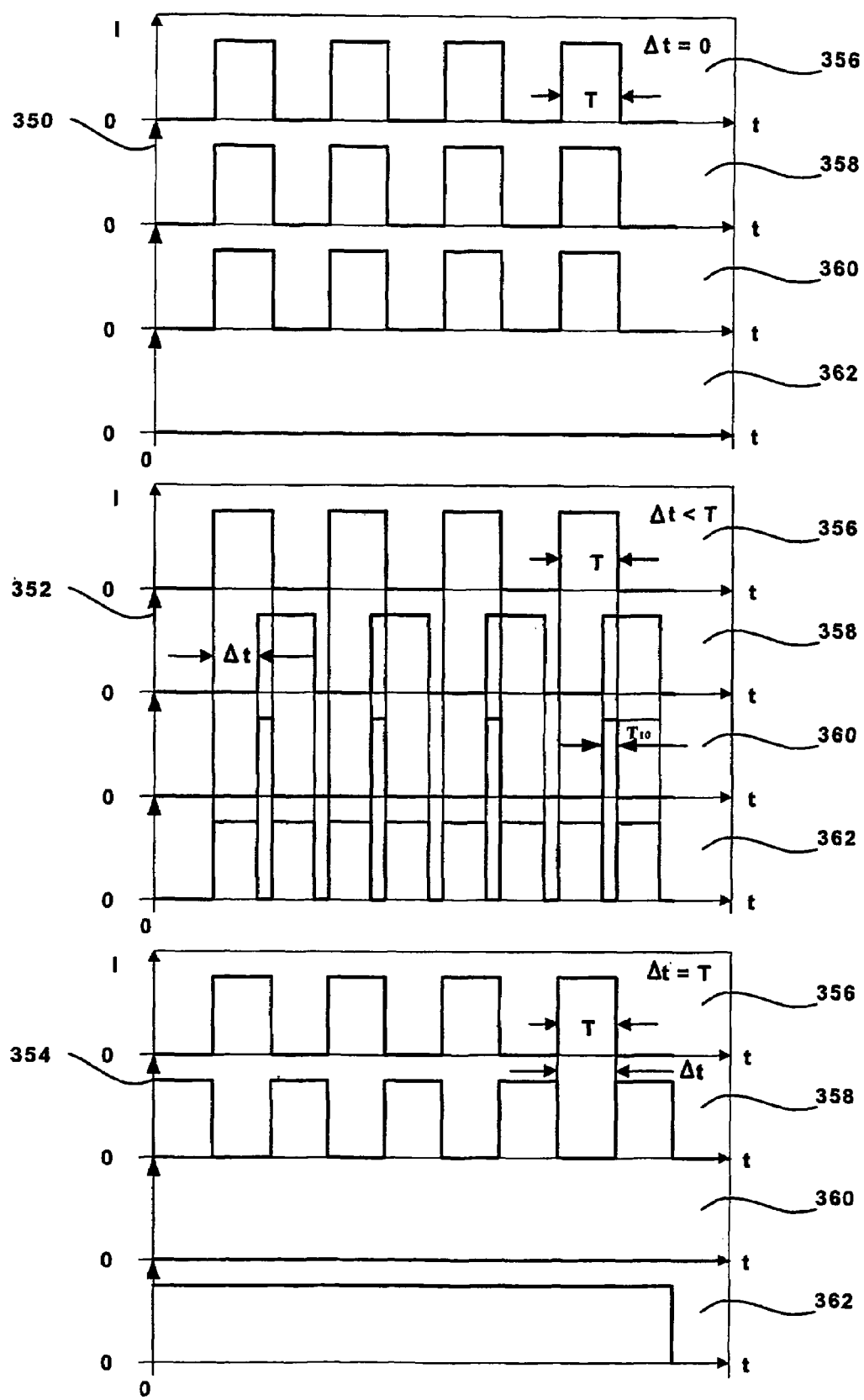
FIG. 7c are graphs showing all-optical switching of an information carrier-beam between the ports using different pulse width and time delays between the carrier and control beams according to certain embodiments of inventions disclosed.

FIG. 7c shows graphs 356, 358, 360, and 362 of the radiation intensity I versus time t for information-carrier beam 132, control beam 134, the radiation emitted from port $P_2$, and the radiation emitted from port $P_3$, respectively. $P_2$ and $P_3$ are the ports illustrated by FIGS. 6b and 7b and all the pulses in the above graphs have width T. Intensity I in graphs 356–362 is shown in arbitrary units and there is no proportion between the intensity I of different graphs 356–362.

Graphs 356–362 are gathered in several groups classified according to the time delay $\Delta t$ between information carrier beam 132 and control beam 134. Graph 356–362 of groups 350, 352, and 354 are related to time delays $\Delta t=0$, $\Delta t<T$, and $\Delta t=T$, respectively.

Time-delays $\Delta t$ between information carrier beam 132 and control beam 134 can be produced, for example, by control unit 214 of laser 210 as shown in system 200 of FIG. 6b or by delay-fiber 306, as illustrated in system 300 FIG. 7b.

For graphs 356–362 of group 350, Δt=0, which means that the pulses of information carrier beam 132, shown in graph 356, and the pulses of control beam 134, shown in graph 358, are in phase without any delay between them. In this case combined grating 100, in optical systems 200 and 300 of FIGS. 6b and 7b, respectively, is irradiated on both of its sides simultaneously and acts as a grating having pitch d<λ. Accordingly, grating 100 produces interference pattern 150 having only one beam (interference order i=0) that is similar to the interference pattern illustrated by graph 150A of FIG. 5. In such a situation and as explained above in the description attending FIG. 6b, the radiation intensities of carrier beam 132 and control beam 134 are emitted only through port $P_2$, as shown by graph 360 resulting in a combined output of zero, as illustrated by graph 362. Also, it is obvious that when the radiation intensity of both of beams 132 and 134 is zero, then the radiation intensities at ports $P_2$ and $P_3$ is also zero, as shown by graphs 360 and 362, respectively.

For graphs 356–362 of group 352 Δt<T, which means that the pulses of information carrier beam 132, shown in graph 356, and the pulses of control beam 134, shown in graph 358, have a time-overlap T10 between them. Time overlapping T10=T−Δt. In this case, for the time period equal to T10, combined grating 100 in optical systems 200 and 300 of FIGS. 6b and 7b, respectively, is irradiated on both of its sides simultaneously and acts as a grating having pitch d<λ. Accordingly, grating 100 produces an interference pattern 150 having only one beam (interference order i=0) that is similar to the interference pattern illustrated by graph 150A of FIG. 5. For the time period of time-overlapping T10, and as explained above with reference to FIG. 6b, the radiation intensities of carrier beam 132 and control beam 134 are emitted and together from port $P_2$, as shown by graph 360. The radiation intensity in port P3 is zero, as illustrated by graph 362.

For the time periods that differ from overlapping interval T10, there are three situations:

(1) Carrier beam 132 is on and control beam 134 is off. (2) Carrier beam 132 is off and control beam is on. (3) Beams, 132 and 134 are off.

For the first situation, grating 100, of FIGS. 6b and 7b is irradiated solely, by beam 132, only on the side that includes grating layer 106 and thus behaves as a grating having pitch λ<d<2λ. This produces interference pattern 150, which is similar to interference pattern 150B of FIG. 5. As explained in the description to FIG. 6b, intensity I emitted from port $P_2$ is zero, as shown by graph 360. Part of the radiation intensity of carrier beam 132 is emitted from port $P_3$ as illustrated by graph 362.

For the second situation, grating 100 of FIGS. 6b and 7b is irradiated, solely by beam 134, only on the side that includes grating layer 108. Thus it behaves as a grating having pitch λd<2λ, which produces interference pattern 150 which is similar to interference pattern 150B of FIG. 5. As explained in the description to FIG. 6b, the intensity I emitted from port $P_2$ is zero, as shown by graph 360. Part of the radiation intensity of carrier beam 134 is emitted from port $P_3$ as illustrated by graph 362.

For the third situation, it is obvious that when the radiation intensity of both beams 132 and 134 is zero, in that case, the radiation at ports $P_2$ and $P_3$ is also zero as shown by graphs 360 and 362, respectively. For graphs 356–362 of group 354 Δt=T. This means that the pulses of information carrier beam 132, shown in graph 356, and the pulses of control beam 134, shown in graph 358, have a time-overlap of T10 between them equal to zero. Grating 100 is irradiated alternately either by beam 132 on the side that contains grating layer 106 when beam 134 is off or by beam 134 on the side that contains grating layer 108 when beam 132 is off. This case is equivalent to switching alternately between the first situation and the second situation described above for group 352 of graphs 356–362. The switching between the first and the second situations is done immediately. As described above for the first and the second situations, the intensity emitted from port $P_2$ is zero for both of the situations. This is shown by graph 360, and part of the radiation intensities of beam 132 or beam 134 is emitted alternately from port $P_3$ in the first or the second situation, respectively. Accordingly, the radiation intensity emitted from port $P_2$, shown by graph 360, is always zero and the intensity emitted from port $P_3$ is always constant, as shown by graph 362.

As discussed above, optical systems 200 and 300 of FIGS. 6b and 7b can be operated as optical switches for switching the emitted radiation between ports $P_2$ and $P_3$ by changing Δt from zero to Δt=T and vice-versa.

In addition, optical systems 200 and 300 of FIGS. 6b and 7b can be operated as optical modulators for producing very narrow pulses. For example, the width of the pulses emitted from port $P_2$, illustrated by graph 360 of group 352 is T10 when T10=T−Δt. The pulse width T of carrier beam 132 or control beam 134 is the shortest that can be achieved with the technologies known today. When using Δt≈T, then width T10 of the pulses emitted from port $P_2$ of systems 200 and 300 of FIGS. 6b and 7b, respectively, approaches zero. This means that the pulses at port $P_2$ are much shorter than the shortest pulses than can be achieved with present technologies. The frequency of the short radiation pulses at port $P_2$ is equals to the frequency of the original longer pulses of beams 132 or 134.

Optical systems 200 and 300 of FIGS. 6b and 7b, respectively, can be operated as optical modulators that act like optical differentiator systems. When optical systems 200 and 300 operate as a differentiator, their operation is similar to electrical differentiator circuits in the sense that in both types of differentiators, optical and the electrical, the short pulses are derived from wider pulses while maintaining the original frequency.

Interference pattern 250 of FIGS. 6a–7b is produced when control beam 134 passes through grating layer 106 when its pitch d satisfies λ<d<2λ. Accordingly interference pattern 250 includes three beams corresponding to interference pattern orders i=0, 1, and −1. The beams of interference pattern 250 exist only when control beam 134 is on and thus they are illustrated in FIGS. 6a–7b, by broken lines, having the interference indices i=0, 1, and −1. Similarly, the beams of interference pattern 150 have indices of interference orders i=1 and i=−1. They exist only when one of beams 132 or 134 is on and the other beam (134 or 132, respectively) is off and thus are also illustrated in FIGS. 6a–7b by broken lines. Thus, arbitrarily narrow pulses may be formed by feeding suitably-timed pulses into the inputs of the foregoing devices.

Figure 8A:
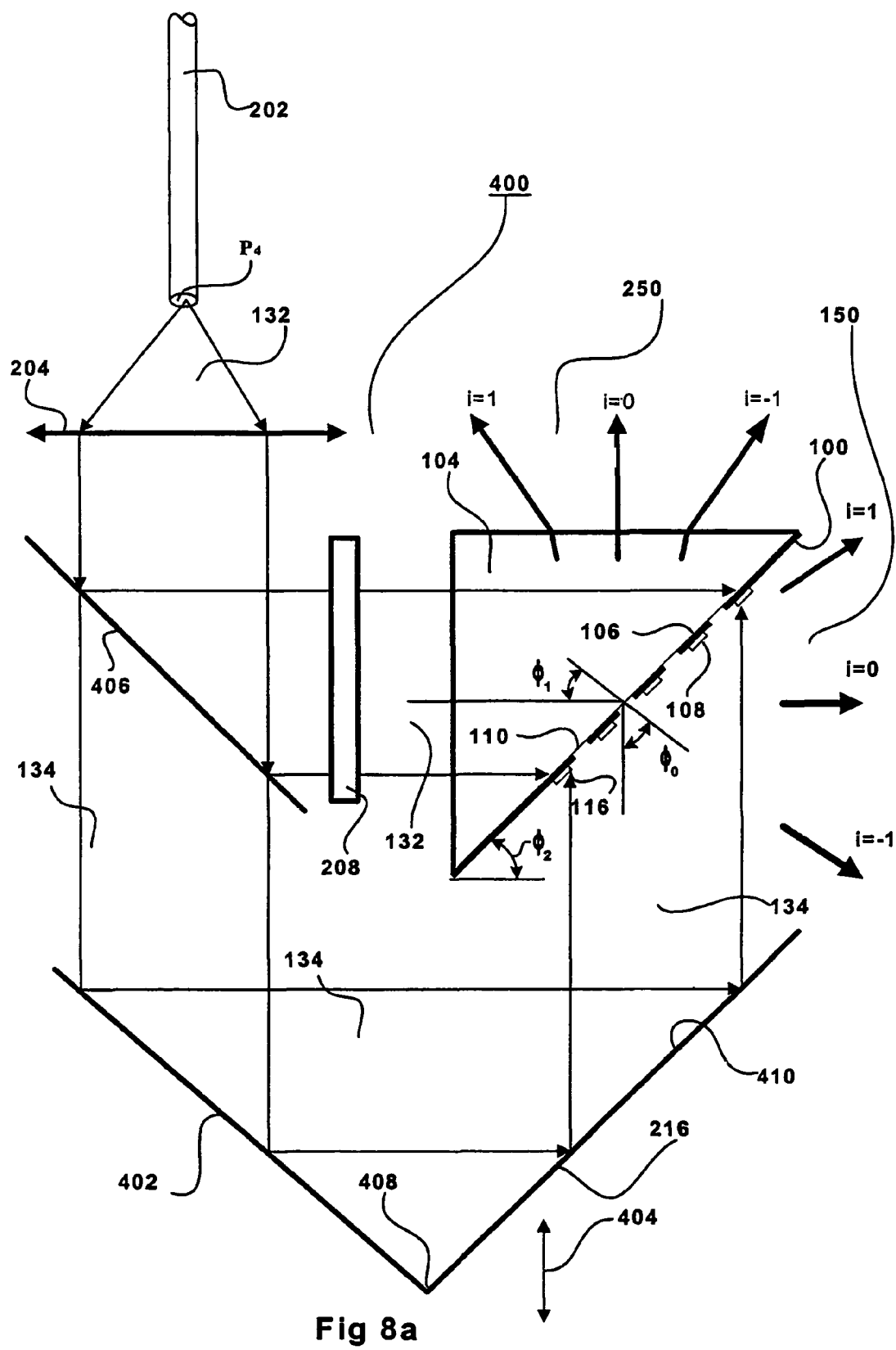
FIG. 8a shows another all-optical design for controlling the interference patterns of a combined grating according to certain embodiments of inventions disclosed.

FIG. 8a schematically illustrates an optical system 400 that is similar to optical systems 200 and 300 of FIGS. 6a and 7a, respectively. System 400 of FIG. 8a is differing from systems 200 and 300 of FIGS. 6a and 7a, respectively, only in the way that control beam 134 is produced. In system 200, laser 210 is controlled by control unit 214 to produce control beam 134. Beam 134 in system 300 is produced by a coupling part of the radiation of information-carrier beam 132 from optical fiber 202 into optical fiber 304. The radiation that is coupled into optical fiber 304 propagates and is guided along this fiber through delay-fiber 306 and is emitted, as control beam 134, from fiber 304 at its output through port $P_5$.

In optical system 400 of FIG. 8a beam 132 emitted from the output of optical fiber 202 at port $P_4$ is converted, by lens 204, into wide beam 132. Beam 132 propagates from lens 204 toward beam-splitter 406. Part of beam 132 is directed toward attenuator 208 and passes through this attenuator. Beam 132 continues to propagate from attenuator 208 and enters block 104 to impinge on combined grating 100 on its side that includes grating layer 106. The other part of beam 132 is transmitted by beam-splitter 406 as wide control beam 134 directed toward reflector 402. Reflector 402 receives control beam 134 and reflects this beam toward reflector 216 that reflects and directs beam 134 toward combined grating 100. Control beam 134 impinges on grating 100 on its side that includes grating layer 108. The rest of the optical paths of beams 132 and 134, starting from combined grating 100 in system 400 of FIG. 8a, are similar to the optical paths of beams 132 and 134, starting from grating 100 in systems 200 and 300, as illustrated in FIGS. 6a and 7a and described with reference thereto.

Interference patterns 150 and 250 are produced by beams 132 and 134, in a similar way, in all of the systems, systems 200, 300 and 400 as illustrated in FIGS. 6a, 7a and 8a and explained above in the accompanied explanation to FIGS. 6a and 7a. Thus the explanations given above for similar features are not be repeated here.

Reflectors 402 and 216 may be connected at a point 408, and may be oriented at a right angle to each other to form a retro-reflector 410. Reflector 410 is arranged to move, along arrows 404, to adjust gently the length of the optical path between reflector 216 and combined grating 100 to provide phase-matching between beam 132, passing through grating 100, and beam 134 reflected from grating 100. The adjustment may be made automatically or manually. In a functioning system, as discussed above, a calibration process may be periodically followed to insure the phase matching is optimal and consistent. Note that in addition to regular calibration, adjustment may be made based on peak signal detected using normal data throughput so that the system is continuously adjusted. Alternatively, an error condition may invoke a calibration process. The error condition may be determined based on average energy or peak energy of an output (e.g., from $P_3$)

Intensity equalization of the radiation intensities of beam 132, which passes through grating 100, and beam 143, which is reflected from grating 100, may be achieved by adjusting the attenuation factor of attenuator 208.

While retro-reflector 410 moves along arrows 404 it does not cause any undesired lateral shifting of beam 134 as occurs in system 300, in which moving reflector 218 along arrows 308 causes movement of beam 134 along arrows 310.

Large movements of retro-reflector 410 along any desired distance, oriented in the direction of arrows 404, changes the length of the optical path between reflector 410 and grating 100 and thus produces a time delay Δt between control beam 134 and carrier beam 132. An explanation of how the amount of delay Δt affects interference patterns 150 and 250 is given above with reference to FIG. 7c.

Figure 8B:
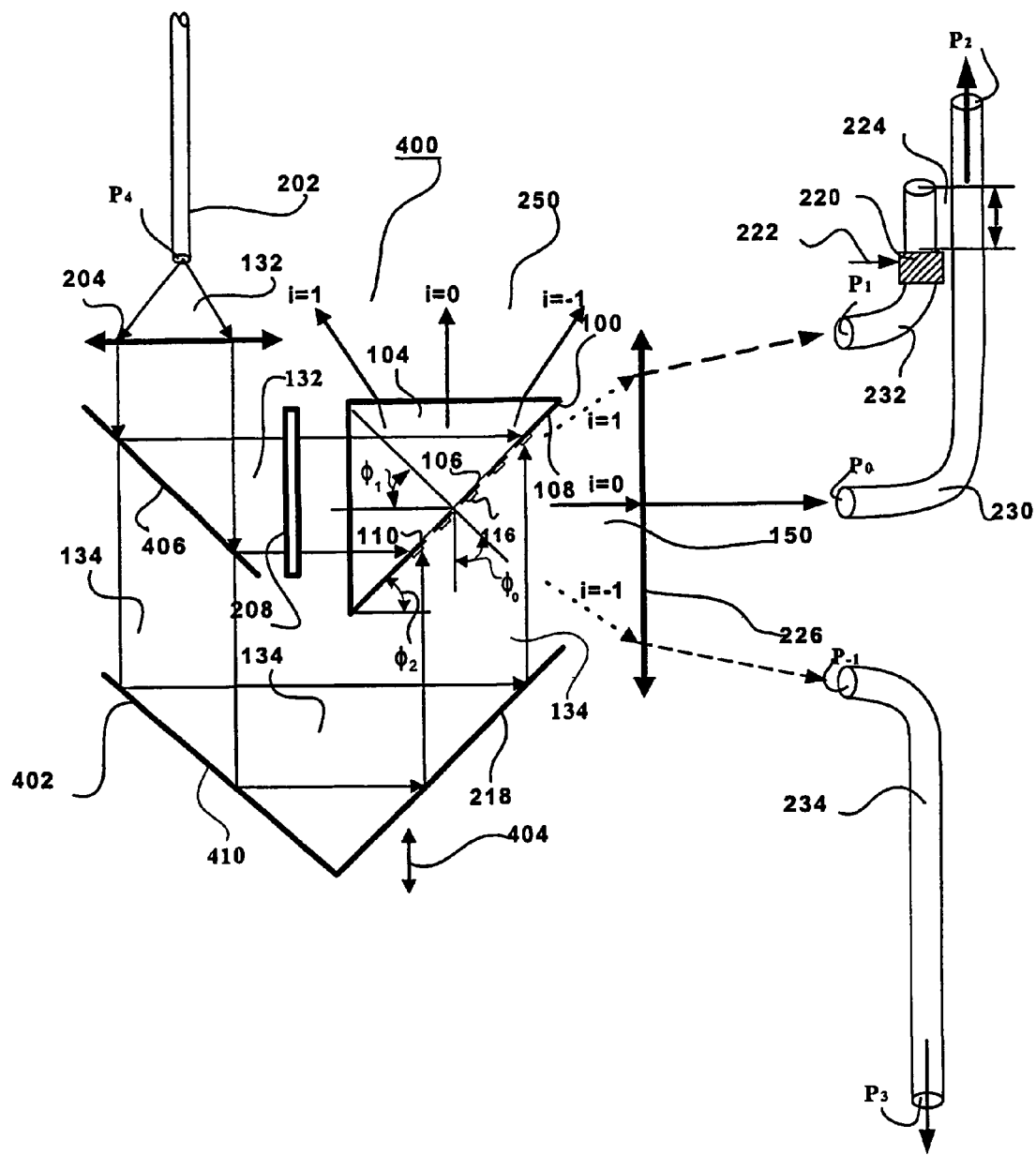
FIG. 8b illustrates additional an all-optical switching device for switching the information carrier beam between ports using the control beam according to certain embodiments of inventions disclosed.

FIG. 8b illustrates same optical system 400 of FIG. 8a, described above, with additional ports $P_0$, $P_1$, $P_{-1}$, $P_2$, and $P_3$ arranged to receive interference pattern 150 from coupling lens 226. Switching the emission of the radiation of information carrier-beam 132 between ports $P_2$ and $P_3$ of optical fibers 230 and 234 is achieved by changing interference pattern 150 from three beams (three interference orders i=0, 1, and −1) to only one beam (interference orders i=0). The way in which the change of interference pattern 150 dictates which of ports, $P_2$ and $P_3$, is the one that emits carrier beam 132 is similar to the way that is illustrated by FIGS. 6b and 7b and the attending discussion.

Retro reflector 410 produces a time delay Δt between control beam 134 and carrier beam 132. The length of the delay Δt affects interference patterns 150 and 250 and thus dictates the switching state and therefore whether the output is from port $P_2$ or $P_3$ (or neither). An explanation of how the delay Δt affects interference patterns 150 and 250 and thus the switching between ports $P_2$ and $P_3$ is given above in the description of FIG. 7c and elsewhere.

Figure 9:
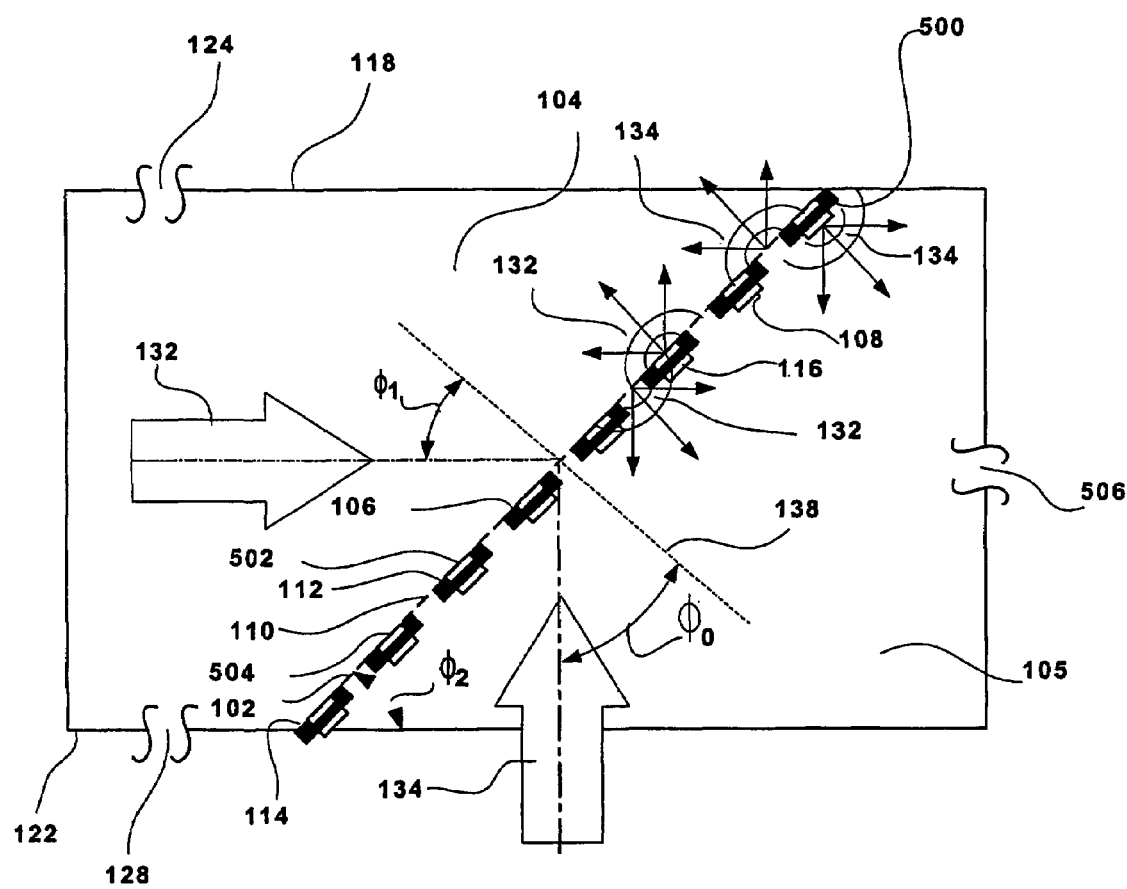
FIG. 9 is an illustration of various alternative design features for a combination transmitting and reflecting grating according to certain embodiments of inventions disclosed.

FIG. 9 is another alternative design for a combination of a transmitting and reflecting grating 500 designed according to the invention. The design is achieved by bonding block 105 to block 104. Blocks 105 and 104 and their glue may have the same index of refraction, as explained above. Avoiding reflection of the radiation passes from block 104 to 105 (and vice-versa) allows a complete transmitting of beams 132 and 134 through openings 110. Lines 118, 122, and 123 have breaks 128, 124, and 506 to indicate that the dimensions of combined grating 500 and are not proportional to the dimensions of blocks 104 and 105. In reality the dimensions of grating 500 may be much smaller than suggested by the illustration of FIG. 9.

When blocks 104 and 105 have the same refractive index and are bonded with index matching glue, the refractive index on both sides of combined grating 100 is the same and equal to N1. Accordingly, by substituting refractive index N0 with refractive index N1 in Eqs. (11) and (12) we get the condition for maintaining phase-matching between beams 132 and 134 all over the planes of grating 500:

$$\phi 0 = \phi 1 = \phi 2 = 45°.$$

The same holographic and photolithographic techniques that produce combined grating 100 produce also combined grating 500. Grating 500 contains grating layers 502, 106, and 108. Reflecting lines 504 and 116 of grating layers 502 and 108 are centered along lines 114 of grating layer 106.

The above condition for angles φ0, φ1, and φ2 assures that there will be phase-matching between the radiation reflected from grating 500 and the radiation that passes through grating 500. This phase-matching is maintained all over both sides of combined grating 500 that includes grating layers 502 and 108.

Beam 132 passes through openings 110 of grating layer 106 of combined grating 500 and is reflected from mask stripes 504 of grating layer 502 of combined grating 500. Similarly, beam 134 passes through openings 110 of grating layer 106 of combined grating 500 and is reflected from lines 116 of grating layer 108 of combined grating 500.

When only beam 132 is incident, part of it passes through grating layer 106 of combined grating 500 to produce an interference pattern similar to interference pattern 150 of FIGS. 6a–8b. The other part of beam 132 is reflected by grating layer 502 of combined grating 500 to produce an interference pattern similar to interference pattern 250 of FIGS. 6a–6b. When only beam 134 is incident, part of it passes through grating layer 106 of combined grating 500 to produce an interference pattern similar to interference pattern 250 of FIGS. 6a–8b. The other part of beam 134 is reflected by grating layer 108 of combined grating 500 to produce an interference pattern similar to interference pattern 150 of FIGS. 6a–8b.

Grating layers 502, 106, and 108 all have pitch d that satisfies λ<d<2%. Accordingly, when only one beam 132 or 134 is incident and the other beam (134 or 132, respectively) is not, the resulting interference patterns, such as 150 and 250 shown in FIGS. 6a–8b, and pattern 150B shown in FIG. 5 result. Interference Pattern 150B has three exiting lobes corresponding to interference orders i=0, 1, and –1.

When both beams 132 and 134 are simultaneously incident, the part of the radiation of beam 134 reflected from grating layer 108 and the part of the radiation of beam 132 that passes through grating layer 106 produce an interference pattern, such as interference 150 of FIGS. 6a∝8b. The combination of grating layers 106 and 108 of grating 500 produces grating with a pitch d that satisfies d<λ. Accordingly, in this case, the interference pattern is similar to interference pattern 150A of FIG. 5 that has only one lobe corresponding to interference order i=0.

Similarly, when both beams 132 and 134 are incident simultaneously, the part of the radiation of beam 132 reflected from grating layer 502 and the part of the radiation of beam 134 that passes, through grating layer 106 produce an interference pattern such as interference 250 of FIGS. 6a–8b. The combination of grating layers 106 and 502 of grating 500 produces grating with a pitch d that satisfies d<λ. Accordingly, the interference pattern is similar to interference pattern 150A of FIG. 5 that has only one lobe corresponding to interference order i=0.

Combined grating 500 is symmetric with respect to beams 132 and 134 and, unlike combined grating 100, it produces interference patterns such as 150 and 250 of FIGS. 6a–8b that are the same for any combination of on-and-off of beams 132 and 134.

In FIGS. 6a–8b, when using combined grating 100, only the energy of interference pattern 150 is used, for switching and modulating purposes, and the energy of interference pattern 250 is lost. The use of combined grating 500 allows using two interference patterns, such as interference patterns 150 and 250 in FIGS. 6a–8b, for the same or similar applications as shown in FIGS. 10–12 described below.

For clarity and without limitation, combined grating 500 is illustrated in a simple version that does not include transparent block 105. The two versions of grating 500 are analogous to the two versions of grating 100 in FIGS. 2a and 2b, without or with transparent block 105, respectively.

Figure 10A:
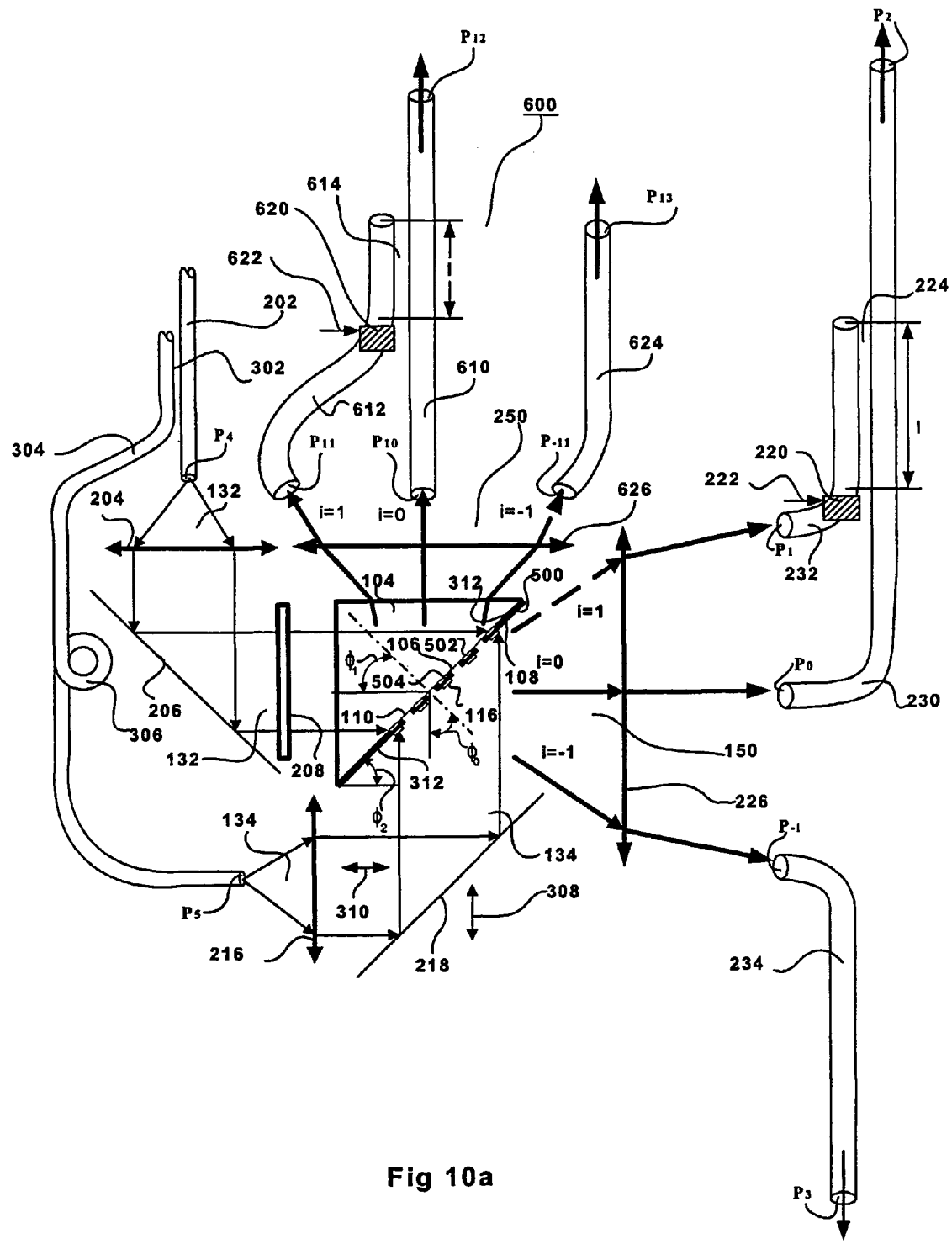
FIG. 10a shows another variation on an optical switching component providing greater energy transfer and/or ports according to certain embodiments of inventions disclosed.

FIG. 10a schematically illustrates an all optical modulating and switching system 600 that is similar to optical system 300 of FIG. 7b with the following differences. Combined grating 100 in system 300 of FIG. 7b is replaced in system 600 of FIG. 10a by the more efficient combined grating 500 illustrated by FIG. 9. Radiation guides 610, 612 and 624 collect the radiation of interference pattern 250, in system 600 of FIG. 10a. Unlike system 300 of FIG. 7b, in which the radiation of interference pattern 250 is lost, system 600 collects the radiation of interference pattern 250 to be used in a manner similar to the way that the radiation of interference pattern 150 is used. Except for these differences, the components of system 600, their arrangement, and their means of operation are similar to those of system 300 of FIG. 7b. Thus the explanation for the similar parts of systems 300 and 600 is not repeated.

As explained, grating 500 of FIG. 9 produces, with beams 132 and 134, interference patterns 150 and 250 that are the same and can be used for similar applications. For that reason, unlike system 300, in which interference pattern 250 is lost, in system 600 energy in interference pattern 250 is collected by optical fibers 610, 612, and 624. Fibers 610, 612, and 624 have corresponding ports $P_{10}$, $P_{11}$, and $P_{11}$ at their inputs to collect the beams related to interference orders i=0, 1, and –1, respectively. The radiation of interference pattern 250 propagating from grating 500 is received by coupling lens 626 that couples this radiation into ports $P_{10}$, $P_{11}$, and $P_{-11}$.

Optical fibers 610, 612, and 624, with their input ports $P_{10}$, $P_{11}$, and $P_{-11}$ and output ports $P_{12}$ and $P_{13}$, are used to collect the radiation of interference pattern 250. These ports are similar to optical fibers 230, 232, and 234 with their input ports $P_0$, $P_1$, and $P_{-1}$ and output ports $P_2$ and $P_3$ used to collect the radiation of interference pattern 150 of FIGS. 6b, 7b, and 8b.

Similarly, directional coupler 614 and phase-shifter 620 with its electrode 622 are similar to directional coupler 224 and phase-shifter 220 with its electrode 222, as illustrated in FIGS. 6b, 7b, and 8b. All the components of FIG. 7c are described above for the all-optical switching and modulating behavior of ports $P_2$ and $P_3$ including the behavior that depends upon the time delay Δt. Pulse width T also applies to ports $P_{12}$ and $P_{13}$.

The beams which have the interference orders i±1 in both interference patterns 150 and 250 are indicated by broken lines to illustrate that these lobes disappear when both beams 132 and 134 incident simultaneously.

Figure 10B:
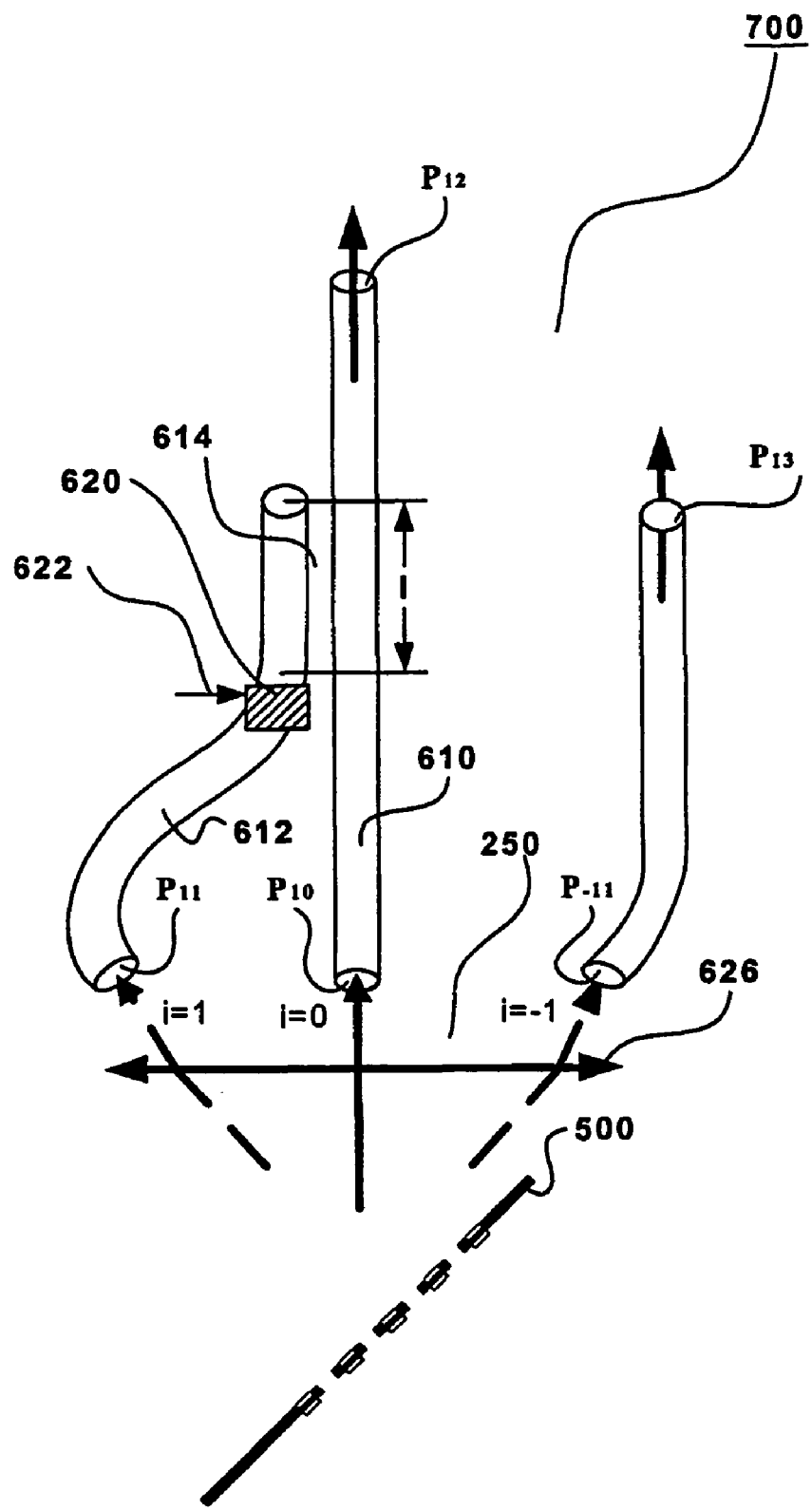
FIG. 10b is an illustration of a retrofit embodiment for a switch component according to certain embodiments of inventions disclosed.

FIG. 10b illustrates an upgrading unit 700 designed to collect the radiation energy of interference pattern 250 of systems 200 and 400 of FIGS. 6b and 8b, when their grating 100 is replaced by grating 500. As explained above for grating 500 of FIG. 9, this grating produces, with beams 132 and 134 interference patterns 150 and 250 that are the same and can be used for similar applications. In systems 200 and 400 of FIGS. 6b and 8b, respectively, the energy in interference pattern 250 was lost. However when these systems are integrated with unit 700, the energy in interference pattern 250 is not lost and is collected by optical fibers 610, 612, and 624 of unit 700. Fibers 610, 612, and 624 have corresponding ports $P_{10}$, $P_{11}$, and $P_{11}$ at their inputs to collect the beams corresponding to interference orders i=0, 1, and –1, respectively. The radiation of interference pattern 250 propagating from grating 500 is received by coupling lens 626, which couples this radiation into ports $P_{10}$, $P_{11}$, and $P_{-11}$.

Optical fibers 610, 612, and 624 of unit 700, with their input ports $P_{10}$, $P_{11}$, and $P_{-11}$ and output ports $P_{12}$ and $P_{13}$, are used to collect the radiation of interference pattern 250. These fibers are similar to optical fibers 230, 232, and 234 of systems 200 and 400, with their input ports $P_0$, $P_1$, and $P_{-1}$ and output ports $P_2$ and $P_3$. These fibers are used to collect the radiation of interference pattern 150.

Similarly, directional coupler 614 and phase-shifter 620 of unit 700, with its electrode 622, are similar to directional coupler 224 and phase-shifter 220 of systems 200 and 400, with their electrode 222, as illustrated in FIGS. 6b, 7b, and 8b.

Graphs 360 and 362 of FIG. 7c illustrate the all-optical switching and modulating behavior of ports $P_1$ and $P_2$ of systems 200 and 400, including how this behavior is dependent upon time delay Δt and pulse width T. The illustration of FIG. 7c represents also ports $P_{12}$ and $P_{13}$ of unit 700.

The lobes of interference orders i=±1 in interference pattern 250 are illustrated by broken lines to show that these beams disappear when beams 132 and 134 are simultaneously incident. The resulting lobes are coupled into ports $P_{11}$, and $P_{-11}$ by coupling lens 626.

FIG. 10a already illustrates the integration of unit 700 with system 300 of FIG. 7b to produce system 600. The way unit 700 improves the efficiency of optical system 600 is described above in the explanation of FIG. 10a. The improvement of systems 200 and 400 of FIGS. 6b and 8b, by integrating unit 700, is achieved in a similar manner as that illustrated in FIG. 10a and described above and thus is not repeated here.

Figure 11A:
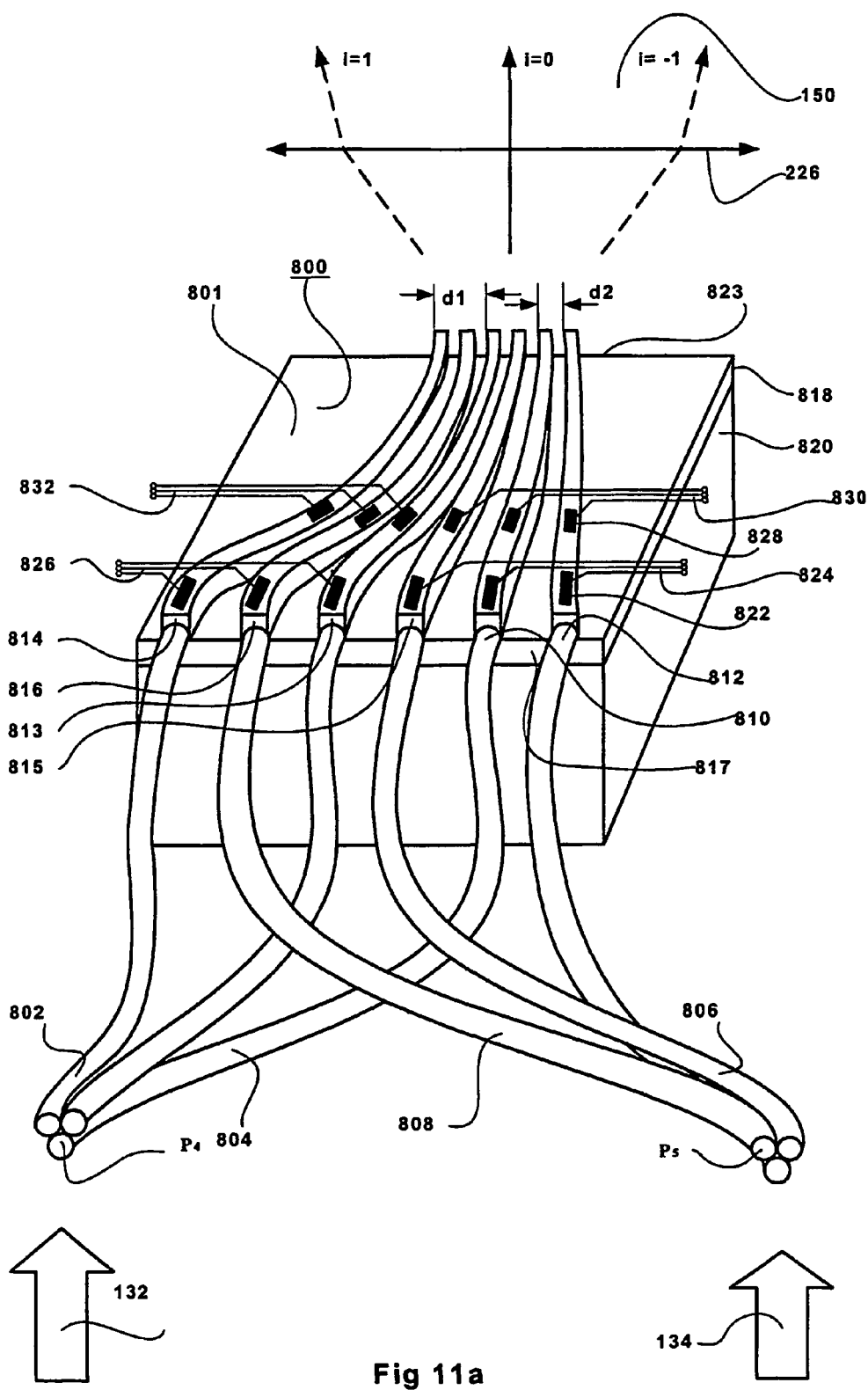
FIG. 11a shows an all-optical switching and modulating system using an interference optical waveguide device according to certain embodiments of inventions disclosed.
Figure 12:
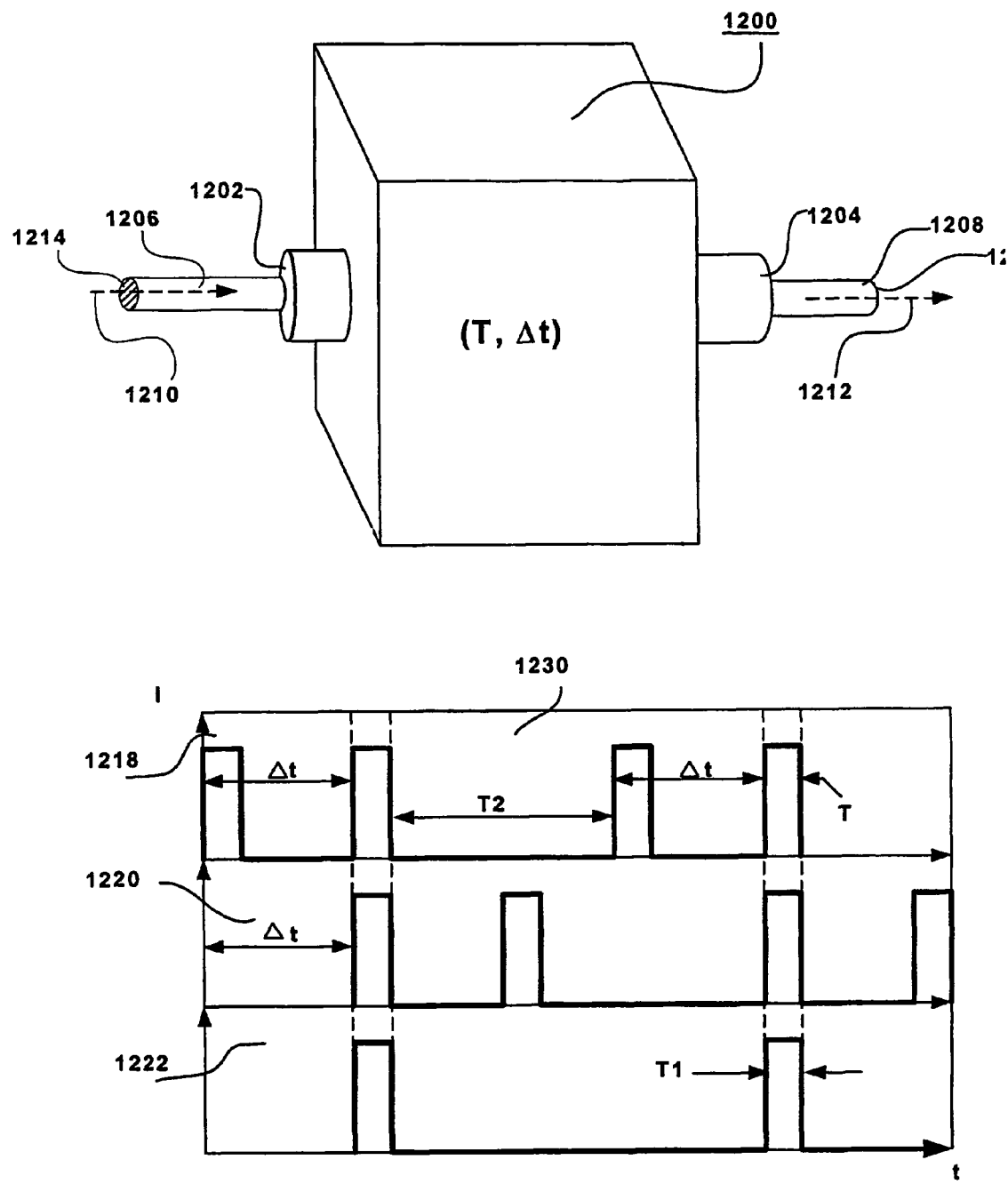
FIG. 12 shows all-optical switch that is self controlled using a predetermined code.

FIG. 11a schematically Illustrates an optical system 800 for an all-optical switching and modulating system, including interference device 801 made of groups of radiation guides 814 and 816. Information carrier beam 132 is optically coupled into ports $P_4$ at the inputs of radiation guides 802 of bundle 804. The other sides 810, at the outputs of optical fibers 802, are optically coupled to inputs 813 of waveguides 814. Waveguides 814 are one group out of two groups of waveguides 814 and 816 that form interference device 801.

Similarly, control beam 134 is optically coupled into ports $P_5$ at the inputs of radiation guides 806 of bundle 808. The other sides 812, at the outputs of optical fibers 806, are optically coupled to inputs 815 of waveguides 816. Waveguides 816 are one group out of two groups of waveguides that forms interference device 801.

Waveguides 814 and 816 are interleaved such that one waveguide 816 is located in each space between two waveguides 814 and vice-versa. The dimensions of optical fibers 802 and 806 are relatively large; thus the spaces between waveguides 814 and 816 fit the dimensions of fibers 802 and 806. The outputs of fibers 802 and 806 at their ends 810 and 812 are also relatively large. Thus inputs 813 and 815 of waveguides 814 and 816, respectively, are also designed to be large to allow efficient optical coupling between fibers 802 and 806 and inputs 813 and 815 of waveguides 814 and 816, respectively.

Waveguides 814 and 816 at output 823 of device 801 are preferably arranged in a very dense structure to assure that pitch d1 between two following waveguides 814 or 816 satisfies $\lambda < d1 < 2\lambda$. Also the pitch d2 between the two following waveguides 814 and 816 should satisfy $d2 < \lambda$.

Note that the configuration of waveguides 814 and 816 changes from large waveguides separated by large spaces, at input 817 of device 801, to small waveguides separated by small spaces at output 823 of device 801. This is achieved by bending waveguides 814 and 816 and changing their size by shaping them in a form of an adiabatic taper.

Device 801 can be made, for example, of silica, fused silica, diffused glass, lithium niobate, liquid crystals, and semiconductors such as silicon, GaAs, AlGaAs, InP, InGaAsP, CdTe and CdZnTe. Device 801 is made of substrate 820, which carries confinement layer 818 to guide the radiation. Layer 818 may have an index of refraction that is higher than the index of refraction of substrate 820. Growing epitaxial layers using techniques of Liquid Phase Epitaxy (LPE), Molecular Organic Chemical Vapor Deposition (MOCVD), and Molecular Beam Epitaxy (MBE) can produce layer 818. Diffusing dopants into substrate 820 can also produce layer 818. For example, diffusion of Ag ions into lithium-niobate substrate 820 can produce layer 818.

The fabrication of radiation waveguides 814 and 816 in layer 818 of device 801 may be accomplished using standard IC industry etching and photolithography techniques.

The radiation of information carrier beam 132 is coupled into ports $P_4$ of fibers 802 of bundle 804 and exits from fibers 802 at their ends 810. This radiation is then coupled into inputs 813 of waveguides 814 at input 817 of device 801. Waveguides 814 carry the radiation of beam 132 to the output of guides 814 at output 823 of device 801. To avoid any delay between the radiation from guides 814 at output 823 of device 801, the total length of all the optical paths between ports $P_4$ and the outputs of guides 814 at output 823 are adjusted to be the same. Alternatively, any differences resulting in phase mismatching may be corrected using adjustable phase correction devices as discussed above and below. Phase-matching between the beams from guides 814 at output 823 can be achieved by strong coupling between guides 814 to produce an effect similar to phase lock. To produce more positive phase match between the beams of guides 814, phase shifters 822 can be produced on top of guides 814 by thin film techniques. The electrodes 824 and 826 can control each of phase shifters 822 separately. Controlling phase shifters 822 is done by applying control voltages to their electrodes 824 and 826, which in turn changes the refractive index of guides 814 and thus causes a phase shift of the radiation that they guide.

Maintaining equal intensity of all the beams that exit from guides 814 at output 823 can be achieved by ensuring equal losses for all the optical paths between ports $P_4$ and the output of guides 814 at output 823. Alternatively, optical amplifiers 828 can be produced, on top of guides 814, by thin-film techniques. Amplifiers 828 are controlled separately through their electrodes 830 and 832 by applying control voltages. Thus the intensities of the beams in guides 814 at output 823 can be controlled to be the same, by adjusting the amplifications of amplifiers 828.

The radiation of control beam 134 is coupled into ports $P_5$ of fibers 806 to be emitted from guides 816 at output 823 of device 801. This is done analogously to the way in which the radiation of information carrier beam 132 is coupled into ports $P_4$ to be emitted from guides 814 at output 823 of device 801. In addition, the same control for the phases, the time delays, and the intensities described above for information carrier beam 132 propagating in guides 814 is applied to control beam 134 propagating in guides 816.

Accordingly when the radiation of information carrier beam 132 is coupled through ports $P_4$ of bundle 804 of fibers 802, it is divided and exits with the same intensity and phase. It does so from multiple guides 814 arranged in every other guide in the combined group of guides 814 and 816 at output 823 of device 801.

Similarly, when the radiation of control beam 134 is coupled through ports $P_5$ of bundle 808 of fibers 806, it is divided and exits. It does so with the same intensity and phase, from multiple guides 816 arranged in every other guide in the combined group of guides 814 and 816 at output 823 of device 801. The phases and the intensities of beams 132 and 134 at the outputs of guides 814 and 816 are equal.

As indicated above, waveguides 814 and 816 at output 823 of device 801 are arranged in a very dense structure to ensure that pitch T1 between two successive waveguides 814 or 816 satisfies $\lambda < d1 < 2 \times$. Also the spacing d2 between two following waveguides 814 and 816 should satisfy $d2 < \lambda$.

The group of waveguides 814 and 816 at output 823 of device 801 is actually a an array of radiation waveguides that act similarly to combined grating 100, illustrated and explained above. Thus device 801 acts as interference device similar to combined gratings 100 and 500. When only information carrier beam 132 or only control beam 134 is on, the combined group of guides at output 823 has a spacing T1 that satisfies $\lambda < d1 < 2\lambda$.

This means that when only information carrier beam 132 or only control beam 134 is on, device 801 produces interference pattern 150 similar to interference pattern 150B of FIG. 5. The latter is produced by grating 100, and has three lobes corresponding to interference orders i=0, 1, and −1. When beams 132 and 134 are simultaneously on, the combined group of waveguides at output 823 has pitch d2 that satisfies T2<λ. In this case interference pattern 150 that device 801 produces is similar to interference pattern 150A of FIG. 5, produced by grating 100, and having only one beam corresponding to interference order i=0.

Interference pattern 150 of FIG. 11a is collected by coupling lens 226 to couple the lobes of this pattern into the ports of an optical unit (not shown). This unit is similar to unit 700 of FIG. 10b but does not include grating 500 and coupling lens 626. The latter converts device 801 into all-optical switch and modulator.

Figure 11B:
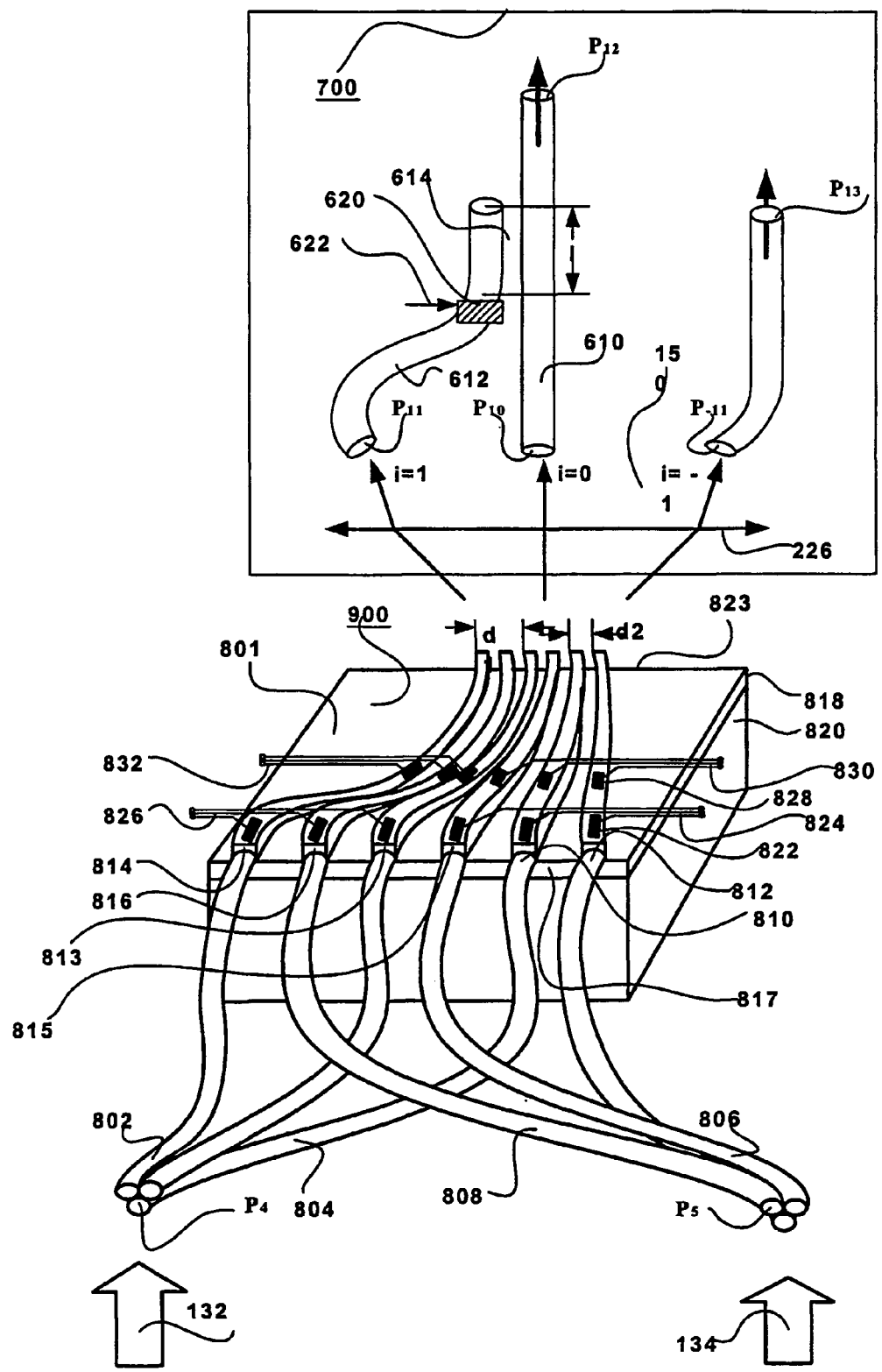
FIG. 11b illustrates an all-optical switching and modulating system using an interference device made of optical waveguides and output ports according to certain embodiments of inventions disclosed.

FIG. 11b illustrates an optical system 900 for all-optical switching and modulating. System 900 is a combination of systems 800 of FIG. 11a and 700 of FIG. 10b. System 700 does not contain grating 500 or coupling lens 626; the latter is replaced by coupling lens 226 of system 800. System 900 produces interference pattern 150 of the types 150A or 150B of FIG. 5 according to the on or off condition of beams 132 and 134, as illustrated in FIG. 11a and explained above. The operational principle of system 700 is illustrated in FIGS. 6b, 7b, 8b, 10a and 10b and is explained in the attending discussion. System 700 receives the radiation of interference pattern 150 and emits this radiation alternatively from ports $P_{12}$ and $P_{13}$. When only beam 132 or only beam 134 is on, then interference pattern 150 is of the type 150B, illustrated by FIG. 5, and only port $P_{13}$ emits the radiation of interference pattern 150. The latter is coupled to system 700 by lens 226 into ports $P_{10}$, $P_{11}$, and $P_{-11}$. The radiation intensity at port $P_{12}$ is zero.

Alternatively, when beams 132 and 134 are on simultaneously, then interference pattern 150 is of the type 150A, illustrated by FIG. 5. Only port $P_{12}$ emits the radiation of interference pattern 150; the latter is coupled to system 700 by lens 226 into ports $P_{10}$, $P_{11}$, and $P_{-11}$. Here the radiation intensity at port $P_{13}$ is zero.

The switching and modulating properties of system 900 are analogous to those in FIG. 7b. Accordingly, the switching and modulating behavior of system 900 is a function of the pulse width T of beams 132 and 134 and the delay time Δt between these beams. This is illustrated by FIG. 7c. Control beam 134 can be produced, as shown in FIG. 6b, by laser 210 that is controlled by control unit 214. When laser 210 is turned on it is impossible to predict the phase of the its beam 134. Accordingly, this configuration has the disadvantage of the difficulty of controlling the phase of beam 134 relative to beam 132. The configurations of FIGS. 11c and 11d solve this problem.

Figure 11C:
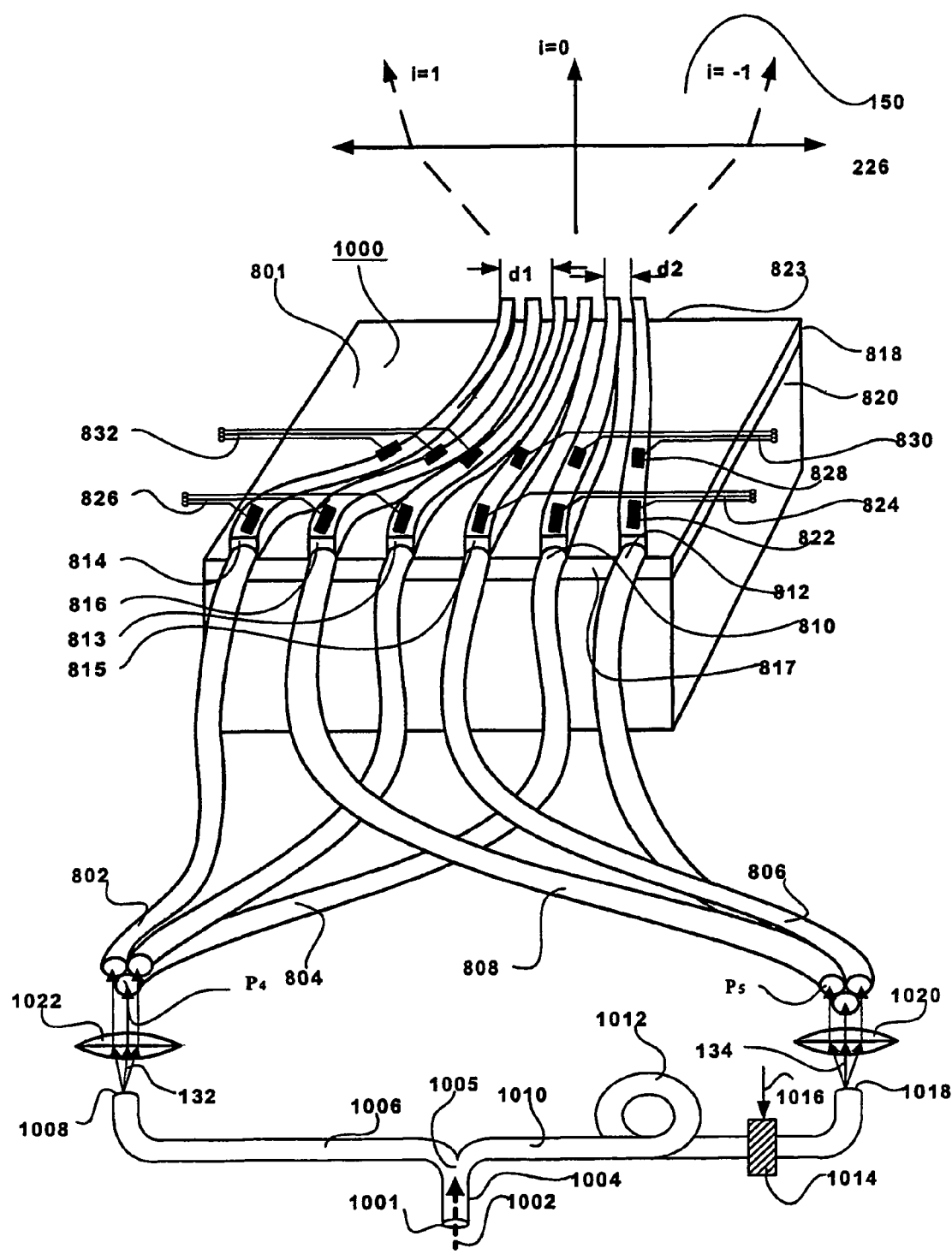
FIG. 11c is an illustration of an all-optical switching and modulating system with a self-control feature according to certain embodiments of inventions disclosed.

FIG. 11c schematically illustrates optical system 100,; an all-optical switching and modeling system that is self-controlled. System 1000 includes system 800 of FIG. 11a with an additional illustration showing how information carrier beam 132 and control beam 134 are produced. Information carrier beam 1002 is coupled into optical fiber 1004 through its input 1001 and propagates inside fiber 1004 toward Y-junction 1005. In Y-junction 1005, the radiation of beam 1002 is divided into information carrier beam 132 and control beam 134, which propagates inside optical fibers 1006 and 1010, respectively. Beam 132 exits from fiber 1006 at its output 1008. Beam 132 is collected and expanded, by coupling lens 1022. It is coupled into ports $P_4$ of fibers 802. Beam 134 propagates inside fiber 1010 through time-delayer 1012 and phase shifter 1014 and exits from fiber 1010 at its output 1018. Beam 134 is collected and expanded, by coupling lens 1020. It is then coupled into port $P_5$ of fibers 806.

Time delayer 1012 produces a time delay Δt between beam 132 and 134. Phase shifter 1014 changes the phase of beam 134 to match the phase of beam 132. The delay time Δt, which time delay 1012 produces, depends upon the extra length of its fiber loop. The voltage applied to control electrode 1016 of phase shifter 1014 controls the phase shift of beam 134.

The operational principle of shifter 1014 is similar to that of shifter 220 of FIG. 6b. The optical paths of beams 132 and 134 from ports $P_4$ and $P_5$, respectively, are similar to system 800 of FIG. 11a. Since beams 132 and 134 are both derived from a single beam 1002, phase shifter 1014 can maintain stable phase-matching between these beams.

Figure 11D:
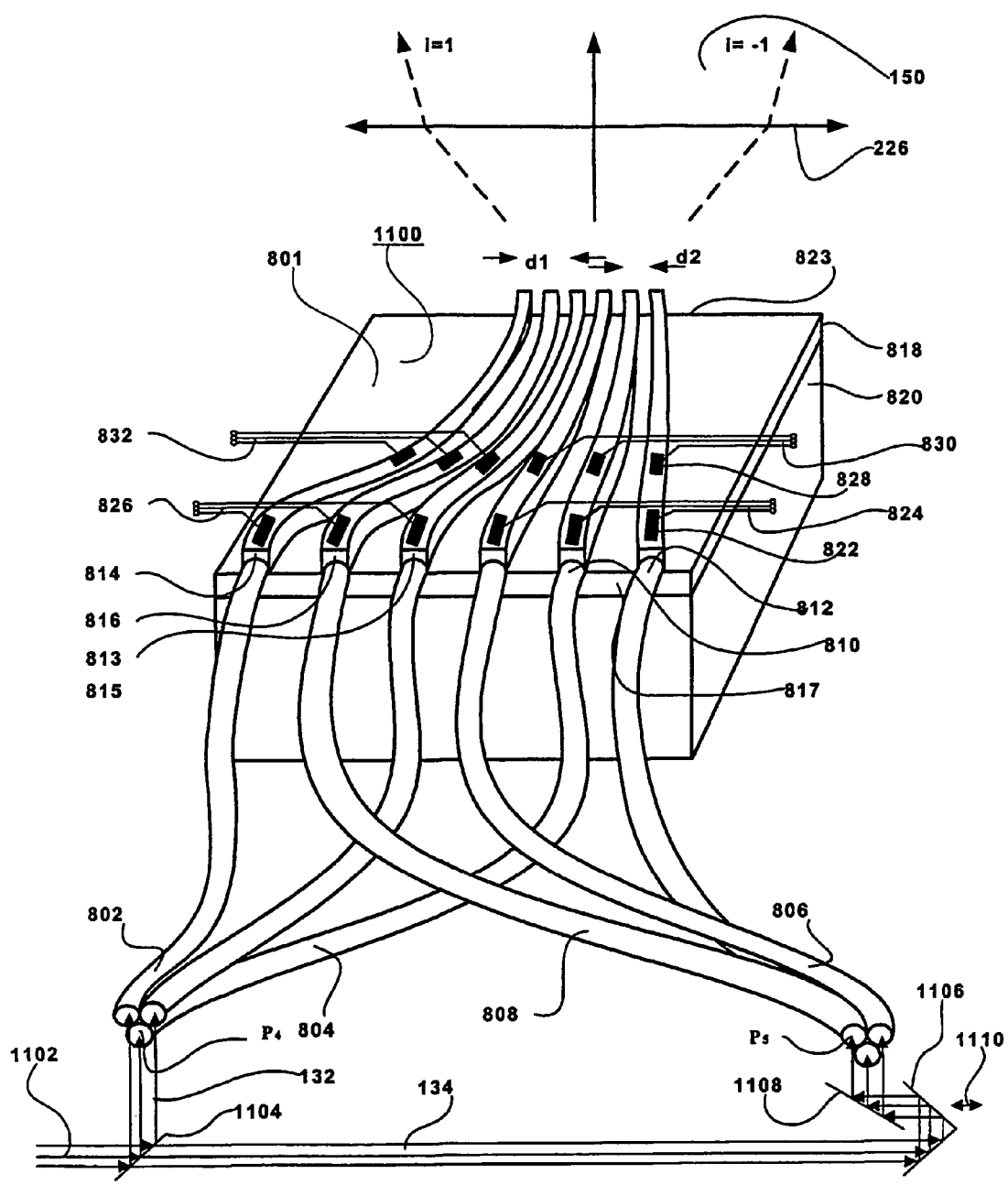
FIG. 11d illustrates a different design for an all-optical switching and modulating system with control symbology integrated in an information beam according to certain embodiments of inventions disclosed.

FIG. 11d schematically illustrates optical system 1100 for an all-optical switching and modeling system that is self-controlled. System 1100 includes system 800 of FIG. 11a with an additional illustration showing how information carrier beam 132 and control beam 134 are produced.

Beam splitter 1104 divides wide information carrier beam 1102 into information carrier beam 132 and control beam 134. Beam 132 is reflected by splitter 1104 and is directed toward bundle 804 of fibers 802 to be coupled into ports $P_4$ of fibers 802. Beam 134 propagates through splitter 1104 toward retro-reflector 1106. Retro-reflector 1106 receives beam 134, from beam splitter 1104, and reflects beam 134 in the opposite direction with a vertical displacement toward reflector 1108. Reflector 1108 receives beam 134, from retro-reflector 1106, and reflects beam 134 toward bundle 808 of fibers 806. It is then coupled into port $P_5$ of fibers 806.

Retro reflector 1106 is arranged to move along arrows 1110 to change the length of the optical path of control beam 134 between splitter 1104 and port $P_5$. Accordingly, the movement of retro-reflector 1106 along arrows 1110 is used to control both the phase and the time delay Δt between beams 132 and 134. While a gentle movement of reflector 1106 along arrows 1110 controls the phase-matching between beams 132 and 134, a large movement of reflector 1106 along arrows 1110 controls the delay time Δt between beams 132 and 134. The above movements of reflector 1106 along arrows 1110 maintain the orientation and the position in which beam 134 hits reflector 1108 and thus do not change the coupling of beam 134 into ports $P_5$.

The optical paths of beams 132 and 134 from ports $P_4$ and $P_5$, respectively, are similar to what is illustrated by system 800 of FIG. 11a and described with reference thereto. Since beams 132 and 134 are both derived from a single beam 1102, retro-reflector 1106 can maintain phase-matching between them that is stable.

FIG. 12 illustrates a modulator and switch 1200 representing an all-optical self-controlled switch that is activated by a predetermined logical code of digital pulses representing data in carrier beam 1210. Switch 1200 (alternatively referred to as modulator 1200) represents any of the optical switches illustrated and described before. For example, switch 1200 includes and represent system 300 of FIG. 7b when input 1202 of switch 1200 couples optical fibers 1206 with fibers 202 of system 300. Output 1204 of switch 1200 couples port $P_2$ of system 300 with fiber 1208. Switch 1200 may be characterized by the parameters T and Δt "(T, Δt)" in the drawing, where Δt is the time delay produced by time delayer 306 of FIG. 7b. The parameter T is the width of the pulses that switch 1200 receives at its input 1202 and T1 is the width of the pulses that switch 1200 produces at its output 1204.

Information carrier beam 1210 propagates in core 1214 of fibers 1206 and is coupled by input 1202 of switch 1200 to fibers 202 of system 300 of FIG. 7b. Beam 1210 is divided, by system 300, into two beams, information carrier beam 132 and control beam 134. Beams 132 and 134 inside switch 1200 are phase matched and beam 134 is delayed by Δt with respect to beam 132. Port $P_2$ of system 300 is coupled to fiber 1208 by output 1204 of switch 1200 to emit pulses from output 1216 of fiber 1208. Port $P_2$ of system 300 produces pulses only when the pulses of beams 132 and 134 exist together. The pulse width T received by switch 1200 is maintained at output 1216 of fiber 1216 to be equal to T1 only when there is a complete time overlap between the pulses of beams 132 and 134.

Graphs 1230 at the lower part of FIG. 12 show the pulse intensity I versus time t. The scale of the intensity I is arbitrary. Graph 1218 is related to the data stream of information carrier beam 1210 and beam 132 of system 300. Graphs 1220 and 1222 are related to the data stream of control beam 134 of system 300 and beam 1212 at output 1216, respectively.

The data stream of beam 1210, illustrated by graph 1218, includes two pairs of pulses. In each pair the pulses have a width T and are separated by a time $\Delta t$. The pairs of pulses in graph 1218 are separated by a guard interval T2. The intervals T2, $\Delta t$, and T satisfy the inequality, T2>$\Delta t$>T. The data stream of beam 132 of system 300 is similar to the data stream of beam 1210; thus graph 1218 illustrates the data stream of beam 132 as well.

Graph 1220 illustrates the data stream of beam 134 of system 300. This data stream 134 is delayed by an amount $\Delta t$ with respect to the data stream of beam 132 shown in graph 1218. Accordingly the first pulse in each pair of pulses of beam 134 has a time overlap with the second pulse in each pair of pulses of beam in the input stream 132.

Graph 1222 illustrates the data stream of beam 1212 at output 1216 of fiber 1208. The pulses of beam 1212 shown in graph 1222 are present only when the pulses of beams 132 and 134, shown in graphs 1218 and 1220, respectively, exist simultaneously.

Accordingly switch 1200 is a self-activated all-optical switch. Information carrier beam 1210 arranged to include information pulses, each of which is followed by activating pulse at a time space $\Delta t$. The information pulses, together with their respective (following) activating pulses defines a pair of pulses each of which may represent a symbol (e.g., a bit) and each of which is separated by time T2>$\Delta t$>T. Note that each symbol or pulse pair may, encode more than a single bit, for example by means of pulse amplitude modulation (PAM) or may be phase-encoded as well to provide phase-shift keying (PKM) or quadrature amplitude modulation (QAM) symbols.

Optical (T, $\Delta t$) emits, from output 1216, the information pulses alone without the activating (control) pulses. This emitting of the information pulses occurs only when the time delay $\Delta t$ of (T, $\Delta t$) (switch 1200) is equal to the time spacing between the information pulses and the activating pulses related to each pair of pairs of pulses in beam 1210.

Figure 13:
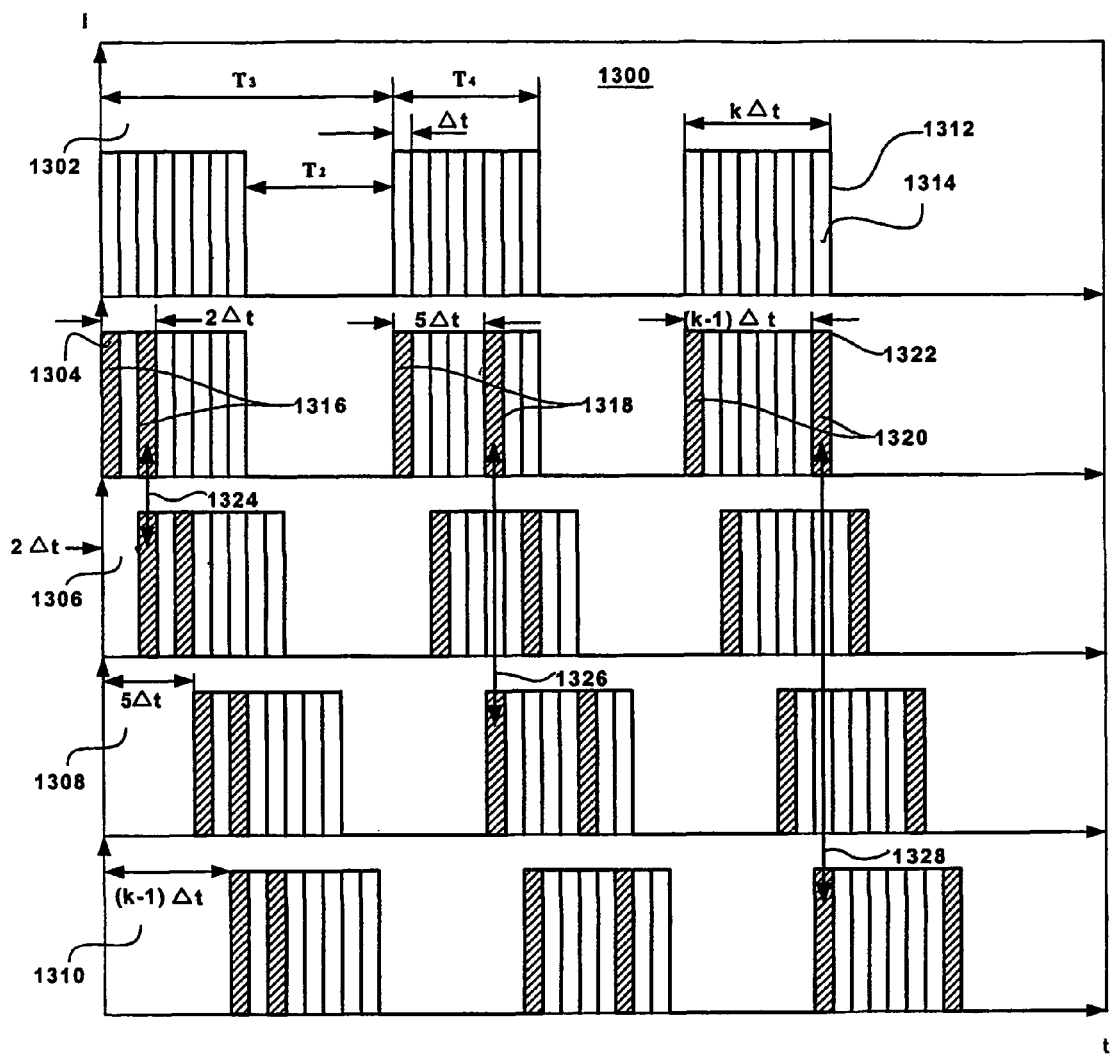
FIG. 13 illustrates a symbology usable with an all optical encoding/decoding system of embodiments of the inventions.

FIG. 13 illustrates a group of graph 1300 demonstrating the principle of all-optical self-triggered CDM according to the invention. Graphs 1302 to 1310 of group 1300 illustrate the intensity I of ONE and ZERO logical bits versus time t.

Graph 1302 shows time-envelope 1312 in which the logical data of different serial information channels can be placed. Time-envelope 1312 does not contain any logical data; it shows only time slots 1314 in which pulses are allowed. Time-envelope 1312 is divided into equal length intervals T3. Each interval T3 contains a guard interval T2 that is equal to or longer than T3/2. Guard interval T2 is a restricted time zone for any type of data and neither information nor control (activating or triggering) pulses are allowed during this period. A time slot T4=T3−T2 is an interval during which data may be encoded. Time period T4 is divided to K time pulse-slots 1314 having width T4/K=$\Delta t$. Each pulse-slot 1314 within envelope 1312 may contain a logical pulse having a width $\Delta t$.

As described with reference to FIG. 12, the code for activating optical switch 1200 of FIG. 13 includes a symbol representing data and an activating (controlling or triggering) pulse. These pulses are separated by a time interval corresponding to a data particular channel. Each of the information channels gets its identity by its specific code defined by the delay between the pulses making up the symbol. That is, the data for each different channel differs from the others by the unique time m$\Delta t$ between the pair of pulses representing specific code, where m is an integer channel number. This method is a form of CDM with each pulse spacing defining a unique channel. Alternatively, each unique pulse spacing may represent a different data symbol.

Each time slot T4, with its pulse-slots 1314, may be reserved, in TDM fashion, for a TD channel or each time slot may be used for a single channel. For each time slot T4 only two pulses, each pair corresponding to one symbol, is provided in each slot T4. Since guard interval T2 is forbidden for any type of pulses, interval T3 can contain only two pulses as well.

Envelope 1312 of graph 1302 may contain multiple codes of multiple information channels interleaved serially with the time in any desired order.

For example, graph 1304 illustrates serial data stream 1322 including pulse pairs 1316, 1318, and 1320 of three different TD channels. Pulse pairs 1316, 1318, and 1320 each include two pulses separated by times 2$\Delta t$, 5$\Delta t$, and (k−1) $\Delta t$, respectively.

To demultiplex serial data stream 1322 of graph 1304 from a single optical fiber into multiple parallel ports of optical fibers, each must contain only one information channel corresponding to this port. Data stream 1322 may be split into multiple ports. To each port is applied the signal 1322. For example, the signal 1322 may be applied to the inputs of all-optical switch 1200 of FIG. 12. Switches 1200 each characterized by a unique pair of parameters T and $\Delta t$.

Each of switches 1200 receives at its input 1202 the entire data stream including the codes of all the information channels. Each switch 1200 detects and emits, at its output, pulses only for data in the input data stream code corresponding to the code channel for which the switch is constructed. Thus, in this design, each of output ports 1204 of switches 1200 will emit only the information pulses of one information channel from the serial of channels of graph 1304.

Graph 1304, illustrates data stream 1322. All switches 1200 receive this data stream at their inputs 1202. Thus this graph also illustrates the data stream of beams 132 inside switches 1200, as described above in the explanation of FIG. 12.

Graph 1306 illustrates data stream 1322 of graph 1304 with a time delay of 2$\Delta t$. As explained above for switch 1200, this graph may illustrate the data stream of control beam 134, inside switch 1200, with the switch having a delay of 2$\Delta t$. Thus it is characterized by the vector (T, 2$\Delta t$). In this particular case, since the pulses 1316, 1318, and 1320 have a width T equal to $\Delta t$, the switches are characterized by: ($\Delta t$, 2$\Delta t$). Note that strictly-speaking, the descriptor (T, $\Delta t$) is not fully a characterization of the switch in that $\Delta t$ merely constrains the choices of T and T is chosen a priori for use with a given switch. The switch itself is characterized by its internal delay which is indicated fully by $\Delta t$.

Arrows 1324 show that only the first pulse of code 1316 in graph 1306 has a complete time overlap with the second pulse of code 1316 in graph 1304. Graphs 1304 and 1306 also illustrate the pulses of beams 132 and 134, respectively. This means that inside this specific switch 1200 there is also a similar time overlap between the pulses of beams 132 and 134. Thus, only the information pulse of code 1316 will appear at output 1204 of switch 1200. Output 1204 is characterized by (Δt, 2Δt). Codes 1318 and 1320 do not produce, in this switch, any time overlap between their pulses in corresponding beams 132 and 134. Thus none of their pulses appears in the output of switch 1200.

Accordingly, in general, switch 1200 has a delay 2Δt characterized by (Δt, 2Δt). Switch 1200 emits only the information pulse from the two-pulse code of the information channel. It does so only when this code includes two pulses that are separated by a time space 2Δt. The pulses of other codes, separated by a time space equal to the integral number of Δt that differs from 2Δt, will not be emitted by switch 1200 and will not appear at its output.

Similar to graph 1306, graph 1308 illustrates data stream 1322 of graph 1304 with a time delay of 5Δt. As explained above for switch 1200, this graph actually also illustrates the data stream of control beam 134, inside switch 1200 when this switch has a delay of 5Δt. Thus it is characterized by (T, 5Δt). In fact since the pulses also have a width T equal to Δt, the switch is characterized by (Δt, 5Δt).

Arrows 1326 show that only the first pulse of code 1318 in graph 1308 has a complete time overlap with the second pulse of code 1318 in graph 1304. Graphs 1304 and 1308 also illustrate the pulses of beams 132 and 134 inside switch 1200, characterized by (Δt, 5Δt), respectively. This means that in this switch there is also a similar time overlap between the pulses of beams 132 and 134. Thus, only the information pulse of code 1318 will appear at output 1204 of switch 1200, characterized by (Δt, 5Δt). Codes 1316 and 1320 do not produce any time overlap between their pulses in corresponding beams 132 and 134. Thus none of their pulses appear in the output of switch 1200 characterized by (Δt, 5Δt).

Accordingly, in general, switch 1200 has a delay 5Δt characterized by (Δt, 5Δt). It detects only the information pulse from the information channel whose code includes the two logical pulses that are separated by time 5Δt. The pulses of other codes that are separated by a time equal to integral number of Δt that differs from 5Δt will not be detected by switch 1200 and will not appear at its output.

Similar to graphs 1306 and 1308, graph 1310 illustrates data stream 1322 of graph 1304 with a time delay of (k−1)Δt. As explained above for switch 1200, characterized by (Δt, 2Δt) and (Δt, 5Δt), this graph actually also illustrates the data stream of control beam 134, inside switch 1200 when this switch has a delay (k−1)Δt. Thus it is characterized by (T, (k−1)Δt). In fact since the pulses also have a width T equal to Δt, the characterization takes the form (Δt, (k−1)Δt).

Arrows 1328 show that only the first pulse of code 1320 in graph 1310 has a complete time overlap with the second pulse of code 1320 in graph 1304. Graphs 1304 and 1310 also illustrate the pulses of beams 132 and 134 inside switch 1200, characterized by (Δt, (k−1)Δt), respectively. This means that in this switch there is also a similar time overlap between the pulses of beams 132 and 134. Thus, only the information pulse of code 1320 will appear at output 1204 of switch 1200, characterized by (Δt, (k−1)Δt). Codes 1316 and 1318 do not produce, in this switch any time overlap between their pulses in corresponding beams 132 and 134. Thus none of their pulses appear in output 1204 of switch 1200 related to (Δt, (k−1)Δt).

Accordingly, in general, switch 1200, has a delay (k−1)Δt characterized by (Δt, (k−1)Δt). It detects the information pulse only from the information channel whose code includes the two pulses that are separated by time (k−1)Δt. The pulses of other codes are separated by a time equal to an integral number Δt that differs from (k−1)Δt. They will not be detected by switch 1200, characterized by (Δt, (k−1)Δt), and will not appear at its output 1204.

Accordingly, each switch 1200, out of all switches 1200 that are fed in parallel by the split information of the coded serial channels, will detect only the information pulses from the code whose two pulses are separated by a time equal to the delay of the switch. Thus switches 1200 convert the serial coded channels propagating in a single optical fiber into parallel channels, each of which propagates in different parallel optical fibers.

While FIG. 13 illustrates only three channels represented by their codes 1316, 1318, and 1320, the serial channels can contains k−1 different channels (for any desired k). These k−1 channels can be divided, as explained above, from propagating in a single fiber to propagate in multiple parallel fibers, each of which contains only the information pulses from a different information channel.

Guard interval T2 is a forbidden time zone from which the logical pulses are restricted. Guard interval T2 is needed to avoid unwanted time overlap between the pulses of different codes that exist in information carrier beam 132 and control 134 inside switches 1200. In a situation when guard interval T2 does not exist, the time delay between beams 132 and 134 could cause time overlap between the pulses of different codes in beams 132 and 134. Such overlap could cause mixing and crosstalk between the divided different information channels propagating in parallel fibers, which should be isolated from each other.

Interval T3 contains only one pair of pulses and actually only one pulse of this pair represents an information pulse (or, put differently, each pulse pair represents only one symbol). Interval T3 is at least 2k times longer than the width Δt of the symbol. Accordingly, this method of multiplexing may seem at first to be inefficient in terms of information density. In practice, however, according to the invention and as illustrated by FIG. 7c and explained above in its description, the pulses can be produced with width T that is very narrow. Pulse width T can be produced, according to the invention, to be so narrow that interval T3=2k·T still will be much shorter than any pulse width produced by the modulators known today. Accordingly, a very dense serial stream of information channels can be used with the symbology method for what is here defined as Dense Time division Multiplexing\deMultiplexing (DTDM). The combination of the high density of information that can be achieved with the DTDM with the ultra high switching speed of the symbology makes the use of the DTDM very attractive for use in optical networks for transmitting a large volume of information at a high rate.

Figure 14:
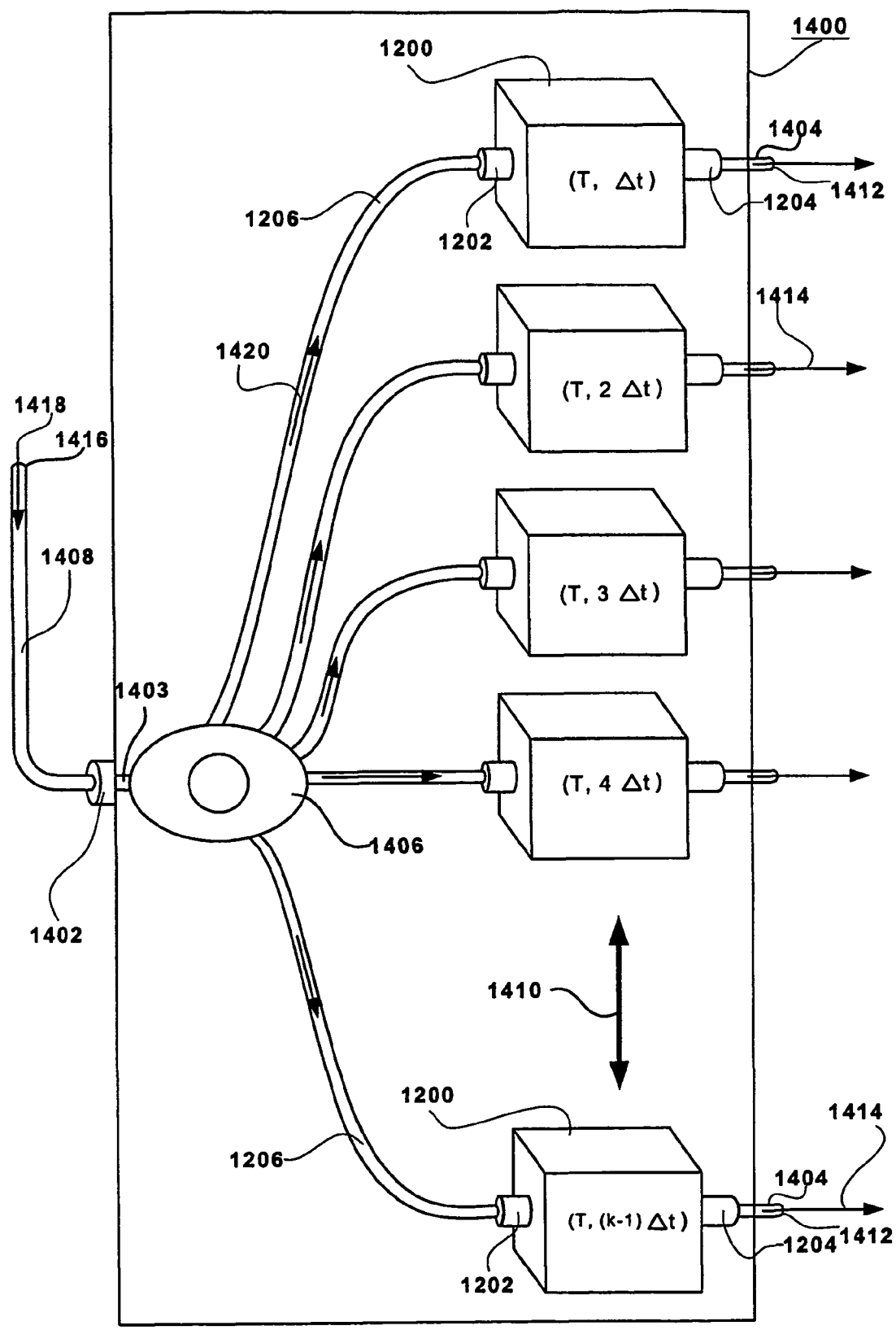
FIG. 14 illustrates a demultiplexer usable with optical an all optical encoding/decoding system of embodiments of the inventions.

The optical system that actually performs the principle of the symbology, illustrated by the graphs of FIG. 13, is illustrated by FIG. 14, discussed below.

FIG. 14 schematically illustrates a self-triggered Code Division Multiplexing (CDM) system 1400 that is used for DTDM (Dense Time Division Multiplexing). Demultiplexing optical system 1400 is the optical system that practically performs a CDM method based on the symbology illustrated in FIG. 13. System 1400 has a single input 1402 to which optical fiber 1408 is optically coupled. Information carrier beam 1418 enters fiber 1408 through its input 1416 and propagates along fiber 1408 to be coupled to system 1400 at input 1402. Input 1402 couples information carrier beam 1418 into fiber 1403. Beam 1418 propagates in fiber 1403 toward optical node (junction) 1406. Node 1406 can be a one-to-many coupler. It divides single information carrier beam 1418 into k−1 information carrier beams 1420 that propagate along optical fibers 1206. Each of beams 1420 contains all the information exists in carrier beam 1418. Each of fibers 1206 connects node 1406 to switch 1200, which is of the type illustrated in FIG. 12 and which has input 1202 and output 1204.

Switches 1200 are differ from each other only by their corresponding delay parameter and thus are indicated by their corresponding parameters. The delay parameters of the (k−1) switches 1200 have values that are integral number of $\Delta t$ and create a series having serial different $\Delta t$'s that starting with $\Delta t$ and end with $(k-1)\Delta t$. Arrows 1410 represents those of switches 1200 that are not shown in FIG. 14.

Information carrier beam 1418, propagating in a single fiber 1408, includes a serial data stream that includes k−1 different information channels interleaved between each other in any desired serial order. Beam 1418 has a time envelope 1312 (FIG. 13). Thus its pulses may occupy each of time slots 1314 in time period T4 of envelope 1312 of FIG. 13 in a configuration that time period T2 is devoid of any pulse. Similar to graph 1304 of FIG. 13, the codes of the different information channels are formed by their corresponding pairs of pulses. They are formed in a configuration where only one code is related to a specific information channel and exists during time period T4 of envelope 1312. Each code includes one information pulse and one control pulse for a single data symbol.

The time lag between the two pulses of each of code is related to a particular information channel. The time lag varies from one channel to another and has a specific value that corresponds uniquely to a respective information channel. The interval between the two pulses of the (k−1) different codes have values that are integral multiples of $\Delta t$ and define a series starting with $\Delta t$ and end with $(k-1)\Delta t$.

All the codes of the information channels that information carrier beam 1418 carries arrive at inputs 1202 of switches 1200 through fibers 1206 and by beams 1420 into which beam 1418 is divided. Beams 1420 carries all the codes of the information channels that beam 1418 carries. These codes are applied to switches 1200 via their respective inputs 1202.

Each of the switches 1200 detects and transmits to its output 1204 only when the code in the information channel corresponding to its internal delay. I.e., it only transmits pulses for the code corresponding to the particular switch 1200 in which the pulses in each code are separated by a time interval equal to the time delay of the switch 1200. Neither the information pulse nor the activating pulse of the codes of other channels not corresponding to as given switch 1200 produces a pulse at the its output 1204. Accordingly, the information pulses for each code are output only by a respective information channel output 1412.

The information pulse of each code is represented by one of the two pulses that define the code. Each of switches 1200 receives, at its input 1202, various codes of different information channels. From these various codes switch 1200 detects and transmits to its output 1204 only the information pulse of the code that is related to the specific information channel. In this case the time interval between the two pulses of the code is equal to the delay parameter of this specific switch 1200.

For example, (k−1) optical switches 1200 are indicated by their (T, $\Delta t$), (T, $2\Delta t$), (T, $3\Delta t$), (T, $4\Delta t$), and (T, (k−1) $\Delta t$). These switches will transmit to their outputs 1204 only the information pulses from the (k−1) codes that correspond to that are separated by time intervals equal to $\Delta t$, $2\Delta t$, $3\Delta t$, $4\times t$, and $(k-1)\Delta t$ respective thereto.

The information pulses of the different information channel are coupled by different outputs 1204 of switches 1200 into different fibers 1404 and are carried by different beams 1414 that are from respective outputs 1412 of system 1400.

Accordingly, optical system 1400 defines an all-optical Code division Multiplexing (CDM) system. System 1400 receives, in its single input 1402, a series of multiple coded information channels interleaved in any desired order. System 1400 emits, from its multiple outputs 1412, only the information pulses of the different coded information channels. These information pulses are fed into its input 1402, when each of the different information channels exits, by a demultiplexing process, from a different output 1412 without any crosstalk between the channels.

Figure 15A:
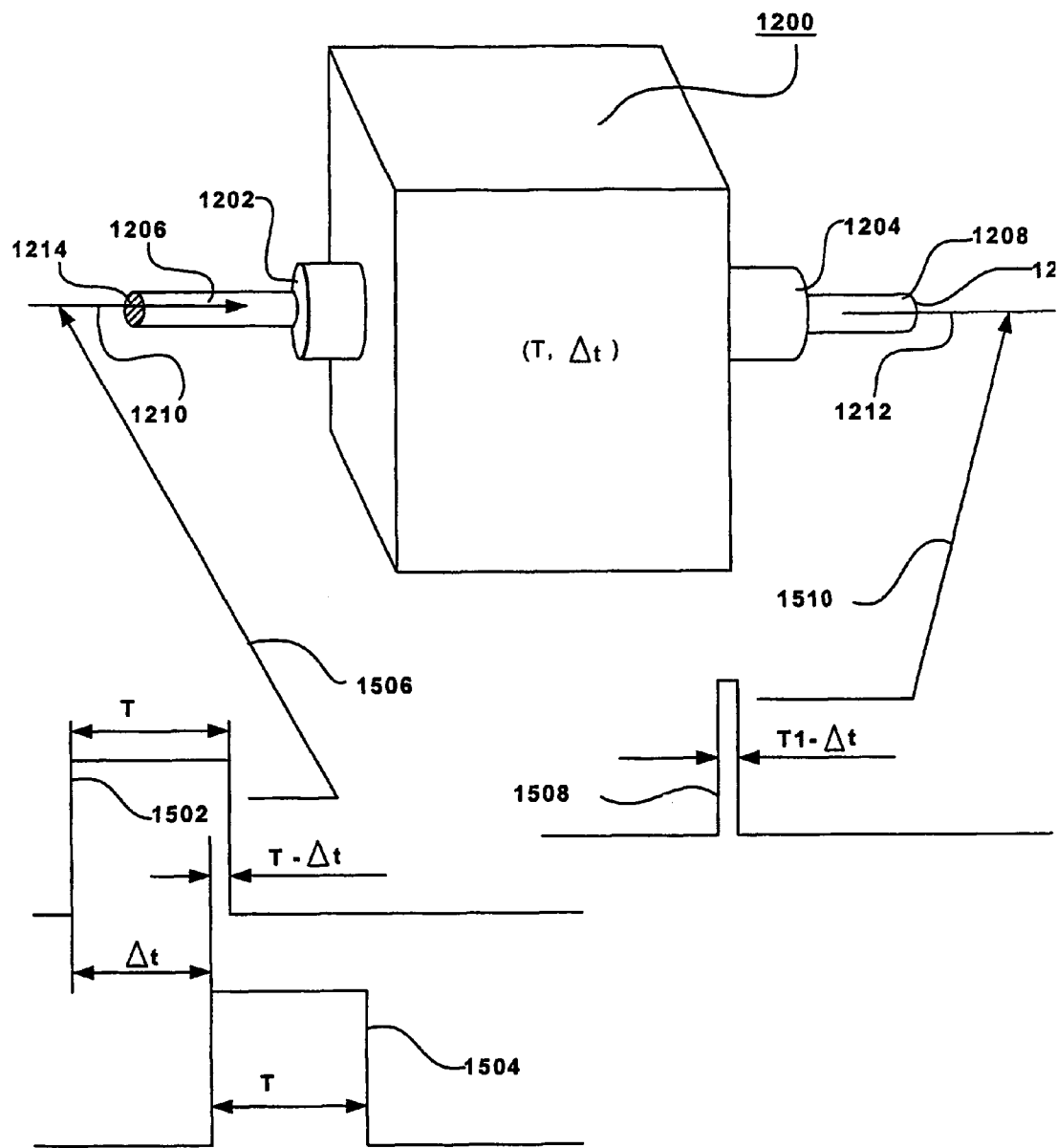
FIGS. 15a and 15b illustrate an ultra-fast all-optical modulator/switch and an all-optical multiplexing device made therefrom, respectively, according to embodiments of inventions disclosed.

FIG. 15a illustrates how modulator and switch 1200 of FIG. 12 is used to produce ultra narrow pulses 1508 of beam 1212 at output 1204.

Modulator 1200 receives in its input 1202, through optical fiber 1206, information carrier beam 1210 that is coupled to fiber 1206 into its core 1214. Arrow 1506 indicates that pulse 1502 is related to beam 1210 and has a width T. As explained above, beam 1210 is divided into carrier beam 132 and control beam 134 inside modulator 1200. Carrier beam 132 includes all the information of beam 1210 and thus pulse 1502 also represents beam 132. Control beam 134 is delayed by a time delay $\Delta t$, as illustrated by pulse 1504 that is time shifted by $\Delta t$, relative to pulse 1502 of beam 132, and has the same width T as pulse 1502.

The time overlap $T-\Delta t$ between pulses 1502 and 1504 of beams 132 and 134, respectively, produce narrow pulse 1508 at output 1204 of modulator 1200, that has a width $T-\Delta t$.

Pulse 1508 at output 1204 of modulator 1200 is coupled into optical fiber 1208 and is emitted, by beam 1212, from fiber 1208 through its output 1216, as is illustrated by arrow 1510.

The delay values $\Delta t$ of modulator 1200 can be adjusted as desired and thus $\Delta t$ can be chosen to produce pulse 1508 with an extremely narrow width $T-\Delta t$.

Accordingly modulator 1200 receives radiation pulses 1502 that can be produced in a conventional way by conventional radiation sources and modulators. These pulses are converted, by modulator 1200 into ultra narrow pulses 1508. These pulses are much narrower than the pulses produced by any known modulating technique.

Modulators, such as modulator 1200, can be placed in the optical path of parallel information channels to convert their pulses into much narrower pulses. Due to the narrow width of the new pulses in these parallel information channels, they can be interleaved to a serial data stream by standard DTM techniques. This stream will have a much higher information density, so as to produce DTDM. This serial pulse steam of the above mentioned DTDM should be demultiplexed by the fastest standard techniques known today.

In addition to the DTDM, narrow pulses, such as pulse 1508 produced by modulator 1200 or any other modulator according to the invention, can also be used to increase the information density of any other communication method, such as WDM or DWDM.

Figure 15B:
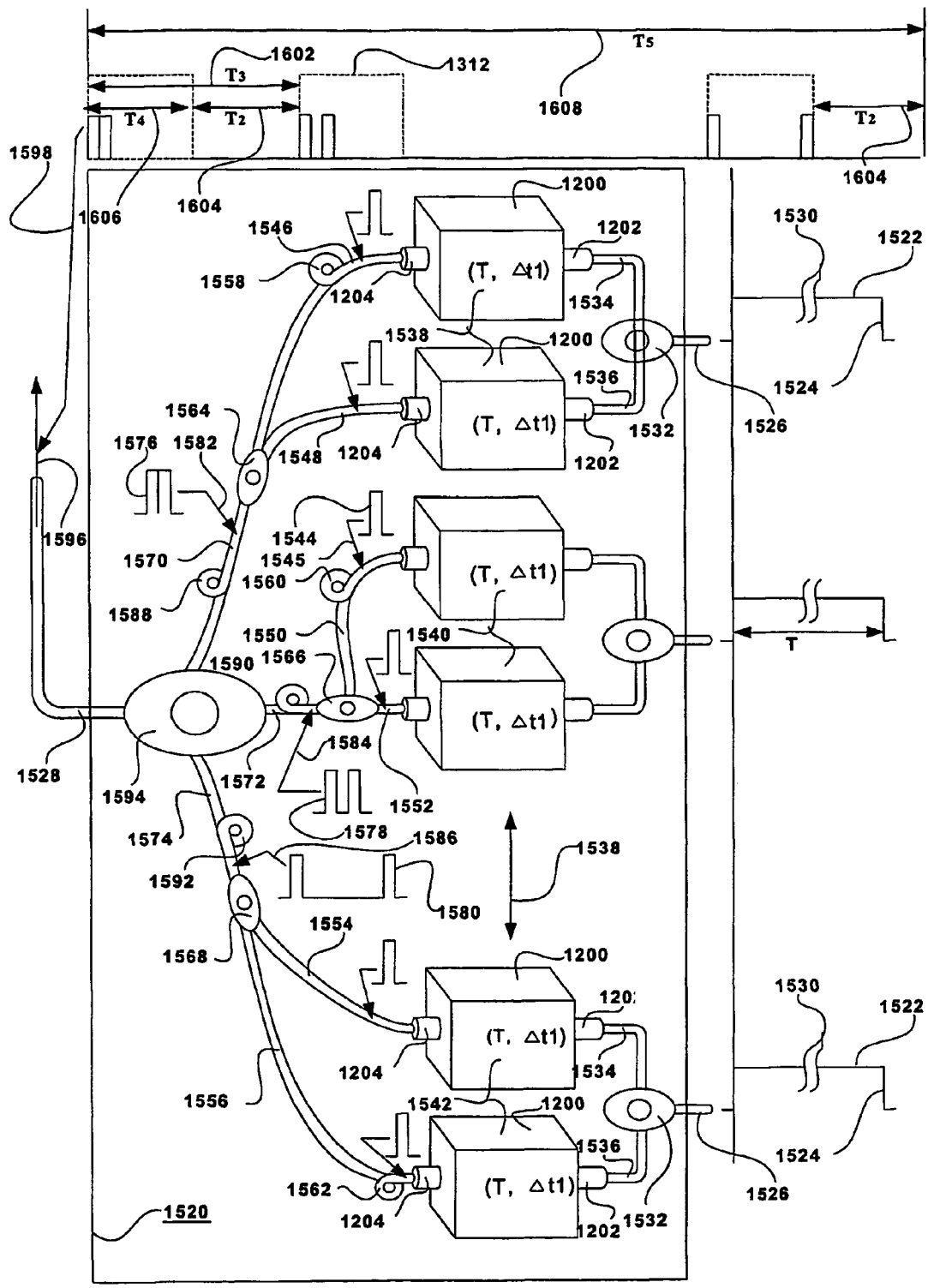

The all-optical CDM according to the invention should have special codes. These codes should be encoded, by multiplexing, into the serial interleaved data stream of the DTDM to allow the multiplexing by CDM technique of the invention. FIG. 15b, described below, illustrates an interleaving or multiplexing system according to the invention that is also capable of encoding the symbols needed for the demultiplexing by the CDM technique of the invention.

FIG. 15b illustrates a system 1520 for encoding, by multiplexing, the specific codes according to the invention, of multiple parallels channels 1522 that are interleaved into serial data stream for TDM, DTDM, CDM, WDM, and DWDM, Asynchronous Transfer Mode (ATM), Dense Asynchronous Transmitting Mode (DATM), or any other application of optical communication, including packet routing.

System 1520 has multiple inputs 1526 and a single output 1528. Parallel information channels 1522, represented by their information pulses 1524, are fed into inputs 1526 of system 1520. Pulses 1524 are the shortest pulses that can be achieved today. Pulses 1524 are cut by lines 1530 to indicate that, in spite of their narrow width, their length is still much longer than that illustrated.

Inputs 1526 of system 1520 are coupled into nodes 1532. Nodes 1532 that receive radiation pulses 1524 of channels 1522 divide this radiation equally into optical fiber 1534 and optical fibers 1536. The beams from fibers 1534 and 1536 are fed into inputs 1202 of modulators 1200.

Modulators 1200 produce very short pulses 1544 at their outputs 1204. Each of pulses 1544 is accompanied by arrow 1545 that indicates in which fibers pulses 1544 propagate. The width $\Delta t=T-\Delta t1$ of pulses 1544 depends upon width T of pulses 1524 and delay time $\Delta t1$ of modulators 1200 ((T, $\Delta t1$). Modulators 1200 are arranged in (K−1) pairs, starting with pair 1538 through pair 1540 to pair 1542. Broken arrows 1538 represent the pairs of modulators 1200 that are not shown in FIG. 15.

Pulses 1544 at outputs 1204 of modulator pair 1538 are coupled into optical fibers 1546 and 1548, respectively. Pulses 1544 at outputs 1204 of modulator pair 1540 are coupled into optical fibers 1550 and 1552, respectively. Similarly, pulses 1544 at outputs 1204 of modulator pair 1542 are coupled into optical fibers 1554 and 1556, respectively.

Delay fibers 1558, 1560, and 1562 in fibers 1546, 1550, and 1556 produce time delays corresponding to the specific codes of modulator pairs 1538, 1540, and 1542, respectively. For example, delay fibers 1558, 1560, and 1562 produces delays of $\Delta t$, $2\Delta t$, and $(K-1)\Delta t$, respectively. Index (K−1) represents the number of modulator pairs used when the (K−1) th pair is pair 1542.

Node 1564 receives pulses 1544, having width $\Delta t$, from fibers 1546 and 1548. Node 1564 combines these two pulses and emits them, through single fiber 1570, on the other side of node 1564. Pulses 1544 of fibers 1546 and 1548 have a width $\Delta t$ and are delayed by time interval $\Delta t$. Thus when combined into fiber 1570, they produce a specific code pair 1576 corresponding to modulator pair 1538, that includes two pulses that are shifted by $\Delta t$.

Node 1566 receives pulses 1544 from fibers 1550 and 1552. Node 1566 combines these two pulses and emits them, through single fiber 1572, on the other side of node 1566. Pulses 1544 of fibers 1550 and 1552 have width $\Delta t$ and are delayed by interval $2\Delta t$. Thus when they are combined into fiber 1572, they produce specific code pair 1578 corresponding to modulator pair 1540, that includes two pulses that are shifted by $2\Delta t$.

Similarly, node 1568 receives pulses 1544 from fibers 1554 and 1556. Node 1568 combines these two pulses and emits them through single fiber 1574, on the other side of node 1568. Pulses 1544 of fibers 1550 and 1552 have a width $\Delta t$ and are delayed by time interval $(K-1)\Delta t$. Thus when are combined into fiber 1574, they produce a specific code pair 1580, corresponding to modulator pair 1542, that includes two pulses that are shifted by $(K-1)\Delta t$.

Specific codes 1576, 1578, and 1580 of modulator pairs 1538, 1540, and 1542 are accompanied by arrows 1582, 1584, and 1586 that indicate fibers 1570, 1572, and 1574 in which they propagate, respectively.

Fibers 1570, 1572, and 1574 include delay fibers 1588, 1590 and 1592, respectively. Delay fibers 1588 to 1592 represent a series of (K−1) delay fibers corresponding to (K−1) modulator pairs 1538 to 1542. The time delays that delay fibers 1588 to 1592 produce are an integral number of time periods T3, shown in FIG. 13. These delays create a mathematical series having a serial difference T3 that starts with a delay T3 and ends with a delay (K−1)T3 for first and last delays 1588 and 1592, respectively.

Fibers 1570, 1572, and 1574 are connected to node 1594, which has only a single output 1528 that is also the output of system 1520. The (K−1) specific codes 1576 to 1580 of the (K−1) information channels 1522 that are coupled to (K−1) inputs 1526 of system 1520 propagate in (k−1) fibers 1570 to 1574. These codes enter node 1594 with time differences T3 between them. Node 1594 combines (K−1) codes 1576 to 1580 into a serial data stream that consists of codes 1576 to 1580 that are interleaved in every time period T3. Beam 1596 that exits from output 1528 of system 1520 carries the serial data stream produced by node 1594 that interleaves (k−1) codes 1576–1580 in serial of codes spaced by a time shift T3. Nodes 1564–1568 can be two-to-one couplers and node 1594 can be a many-to-one coupler Arrow 1598 indicates that the series of pulses that beam 1596 carries is represented by the pulses confined in time-envelope 1312, similar to time envelope 1312, illustrated in FIG. 13. Time envelope 1312 includes time cells 1602 having width T3 and defined as code cells 1602. Each code cell 1602 includes restricted time zones 1604 and occupied time zone 1606. The occupied time zone is a time period that can be used to transmit the codes pulses. The widths of restricted time zone 1604 and occupation time zone 1606 are T2 and T4, respectively. Width T2 is greater or equal to T3/2.

Any of occupation zones 1606 contains only one code out of (k−1) codes 1576–1580. Since occupation zones 1606 may include any of (k−1) codes 1576–1580, their size T4 must be great enough to allow them to contain even the longest code that has a width $\Delta t(K-1)\Delta t=K\Delta t$. Accordingly, the time length of time zone 1606 is T4=K$\Delta t$.

Codes 1576–1580 are interleaved in (k−1) code cells 1602, where each code cell 1602 contains only one specific code related to its specific information channel 1522. Codes 1576–1580 are arranged in a series of (k−1) cells. These cells are arranged in a multiplexing or interleaving order that starts with code 1578 and ends with code 1580. Specific codes 1576–1580 are used in all-optical demultiplexing system 1400, illustrated in FIG. 14.

System 1400 receives cells 1602 and includes switches 1200 that produce a time shift between their inside beams, carrier beam 132 and control beam 134. The maximum time shift between beams 132 and 134, inside switches 1200 of system 1400, is illustrated by FIG. 14. It can reach a value of (K−1)Δt. To avoid any mixing and crosstalk between the codes in cells 1602, any time overlap between the different pulses of different codes 1576–1580 in cells 1602 of beams 132 and 134 should be avoided. Such over lap can be avoided if the separation time T2 between code cells 1602 is grater than the maximum shift (K−1)Δt between beams 132 and 134 inside switches 1200 of system 1400. Accordingly T2 is equal to or longer than (k−1)Δt. Since T3 =T2+T4, it is equal to KΔt+(K−1)Δt=(2K−1)Δt and thus T2 is approximately longer than or equal to T3/2.

The total length 1608 of all (k−1) code cells 1602 is T5=(K−1)T3=(K−1) (2K−1)Δt. When T2 is equal to T4=2kΔt, then T5=(K−1)(2k)Δt. The time length T5 is the time that system 1520 of FIG. 15b is busy in producing code cells 1602. Thus system 1520 is free to get the next period of pulses, from information channels 1522 in its inputs 1526, only after time period T5.

Accordingly, system 1520 operates at a frequency rate of 1/T5. The width of pulses 1524 in information channels 1522 is much larger than the width of the pulses in codes 1576–1580. Thus there is a significant time saving using the system of 1520 with respect to standard TDM system.

Compression Factor Of DTDM With Respect To Standard TDM-FIG. 15b

Compression factor C is defined as the ratio between the average bit rate exists in DTDM as, illustrated by FIG. 15b, and conventional TDM, as used today.

According to the invention and as illustrated in FIG. 15b, each code cell 1602, in the DTDM method, carries two pulses, but, assuming one bit per symbol for purposes of discussion, only, only one information bit. Accordingly, for a time period T5, that includes (k−1) codes cells 1602, the number of interleaved information pulses transmitted is (K−1). Thus the average bit rate R1 in the DTDM is:

$$R1=(k-1)/T5=(k-1)/[(k-1)\ (2K)\Delta t]=1/2K\Delta t$$

In a standard TDM the interleaved pulses, such as the pulses of information channels 1522, have width of T. Thus for transmitting (K−1) pulses, the time needed is (K−1)T. Accordingly, the average bit rate R2 is:

$$R2=(k-1)/(K-1)T=1/T$$

Compression factor C equal to:

$$C=R1/R2=T/2K\Delta t$$

For example, the width Δt of the pulses in codes 1576–1580 can easily produced to be 1000 times shorter than the width T of standard pulses, as produced and used in present TDMS. Assuming that K the number of information channels interleaved in both methods DTDM and TDM is 50 then:

$$C=1000\Delta t/2\cdot 50\cdot \Delta t=10$$

This means that, by using the DTDM method, the bit rate can easily be increased by a factor of 10.

Achieving compression factor C=10, by the DTDM method with the additional capability of ultra fast all-optical demultiplexing makes the DTDM a very attractive method.

When using DTDM with very short pulses, according to the invention, and interleaving them, by the standard TDM method without encoding codes (as done when using CDM), the compression factor C can be much higher. The need to encode the interleave pulses to be used, in all-optical self-triggering CDM, reduces compression factor C significantly.

For example, when producing, according to the invention, pulses that are 1000 times shorter than available today, by other techniques, and interleaving them by a standard TDM technique, without CDM, then compression factor C is 1000. On the other hand, such a high pulse rate cannot be demultiplexed using known techniques; demultiplexing by the CDM technique of the invention is required.

The all-optical switching capabilities of system 1400 of FIG. 14 are per single code corresponding to a single information pulse. When the DTDM method is used to interleave packets of information, the code cells of the same packets are arranged in arrows, one after the other. All of the cells of the same packet have the same specific code and thus all will be routed to the same port. Accordingly, all-optical demultiplexing system 1400 is also capable of routing packets. System 1400 can serves as one junction for routing packets. For routing packets through more than one junction, the specific codes should include more information to define the routing path through multiple junctions. Such codes will be discussed in the following section.

Figure 15C:
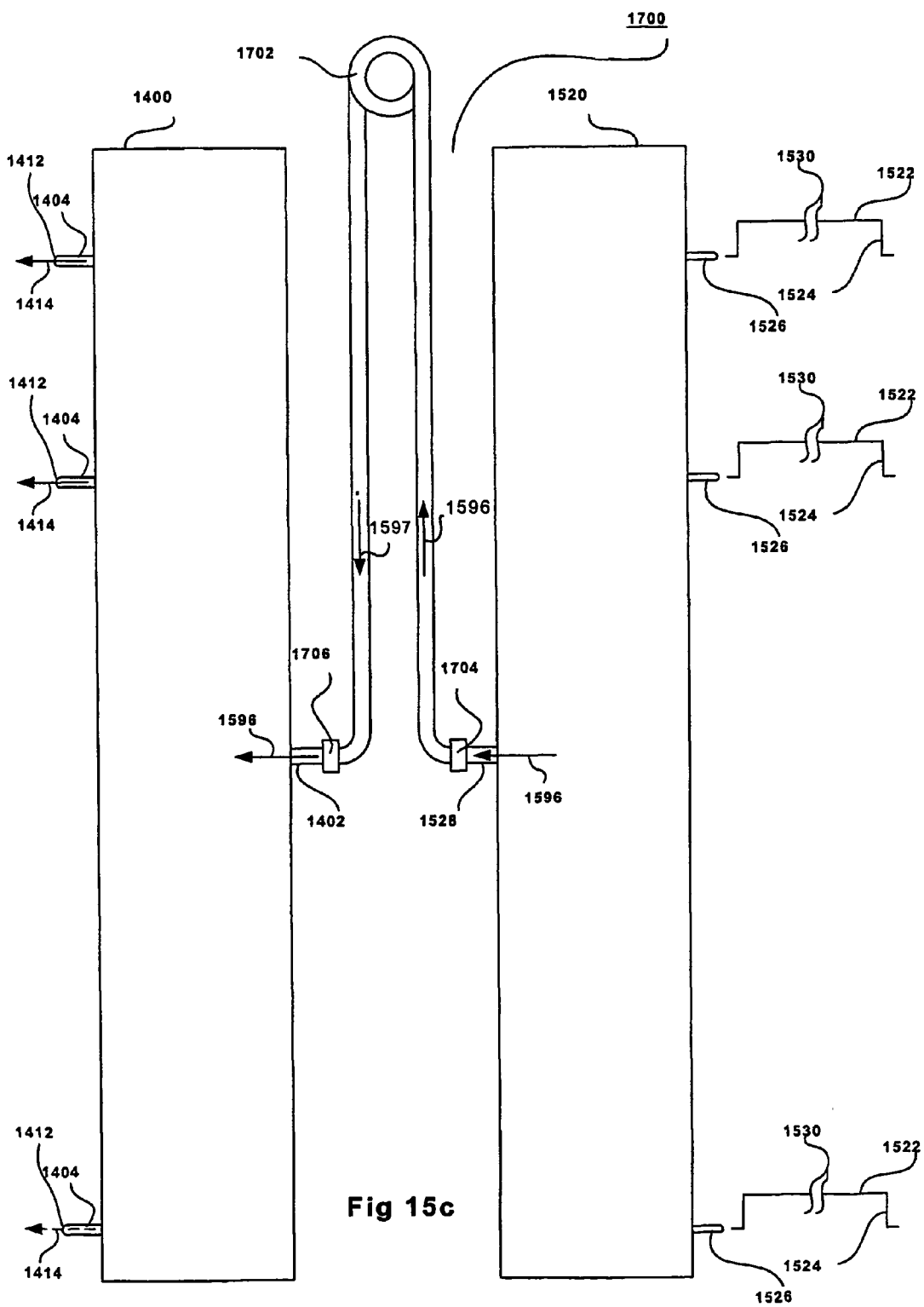
FIG. 15c shows an all-optical network system including an all optical system for multiplexing and demultiplexing connected by a long-haul fiber optic channel according to embodiments of inventions disclosed.

FIG. 15c schematically illustrates all-optical system 1700 representing an all-optical communication network. System 1700 includes system 1520 of FIG. 15b, that serves as an encoding or multiplexing system, and system 1400 of FIG. 14, described above, that serves as a demultiplexing system.

Systems 1520 and 1400 are connected by single long-haul fiber 1702 that transmits a serial data stream of radiation pulses. A long haul is a long information carrier designed to carry multiple information channels for transmitting large information volume, at high rate, between junctions of the communication network. System 1520 has multiple parallel inputs 1526 through which it receives pulses 1524 of multiple parallel information channels 1522. Pulses 1524 are cut by lines 1530 to indicate that pulses 1524 are longer than as illustrated. System 1520 produces specific codes corresponding to respective channels 1522; each code consist of a pair of pulses.

As illustrated in FIG. 15b, these specific codes are all-optically interleaved, by multiplexing system 1520, in any desired predetermined order to form series of code pairs 1596 that exit from system 1520 through its output 1528. Data stream 1596 is coupled, by connector 1704, to a single long-haul fiber (backbone) 1702 through which it propagates toward connector 1706. Connector 1706 couples data stream 1596 into input 1402 of demultiplexing system 1400.

As illustrated in FIG. 14, system 1400 receives the series of the interleaved specific codes of channels 1522, produced by multiplexing system 1520, and all-optically demultiplexes only the information pulses of these codes into and from its parallel outputs 1404. The information pulses of the specific codes related to different information channels 1522 are carried by beams 1414 and exit from different subsidiary outputs 1412 related to main outputs 1404 of system 1400.

Figure 16A:
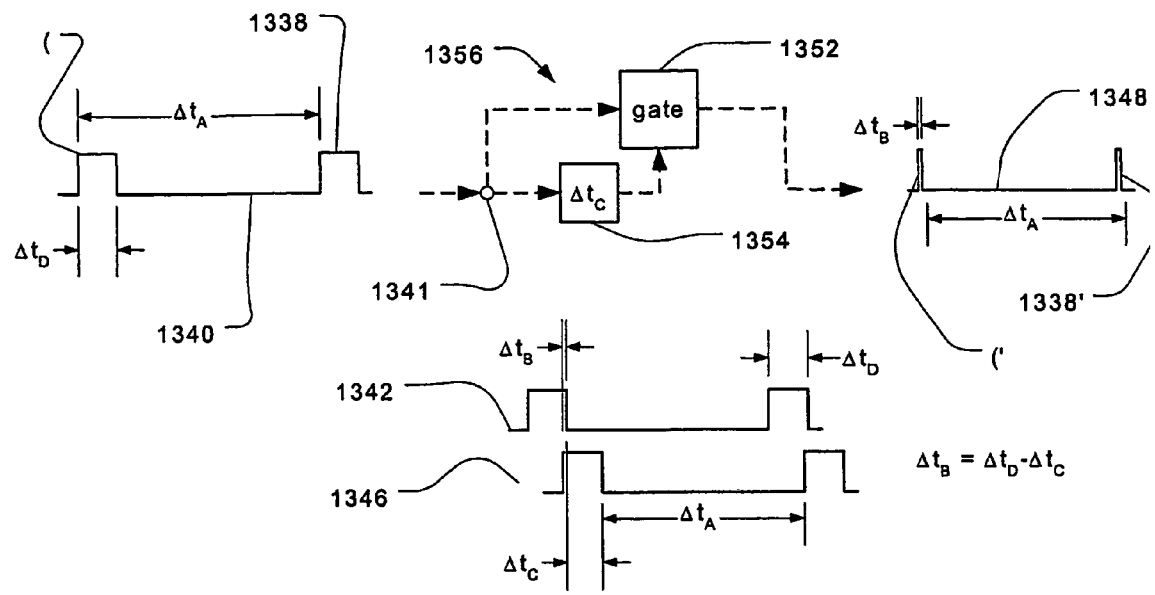
FIG. 16A illustrates a mechanism for taking long pulses typically generated by current technology and chopping them to make very narrow pulses using mechanisms in accord with embodiments of the inventions disclosed.

Referring now to FIG. 16A, the mechanism for taking a (temporally) broad pulse 1337 or 1338, such as used in current optical systems, is processed to make the pulses much narrower. The resulting pulses may be interleaved with appropriate delay circuits discussed below to create a high bandwidth signal. Presently, the process for encoding a broad-pulse signal of the prior art to encode it with routing data for one or more layers of routing (e.g., layers of the system 1400) is described. The system discussed now with reference to FIG. 16A is an alternative to that discussed with reference to FIG. 15b and is shown in the present context simply to illustrate another means by which the pulse-pair encoding may be achieved.

An input data stream 1340 is applied to an optical splitter 1341 which may be a directional coupler or Y-junction, to send energy in equal intensity to a gate 1352 such as described with reference to FIG. 12 (there shown at 1200).

It is assumed that the circuiting indicated by broken lines in the diagram leading from the splitter 1341 to the gate, have appropriate delays such that the delay between the portion of the pulse arriving at one input of the gate 1352 is delayed by precisely $\Delta t_c$, a result that is schematically represented as a delay device (e.g., a delay line) at 1354. By applying each broad pulse 1337 and 1338 to both inputs of the coincidence gate 1352 with a time delay $\Delta t_c$, only the portion overlapping in time is transmitted to the output. As a result, the output signal 1348 that emerges has a width $\Delta t_B$ equal to the difference between the delay $\Delta t_C$ and original pulse width $\Delta t_D$. The spacing $\Delta t_A$ between the successive output symbols 1337' and 1338' remains the same as in the original signal.

Figure 16B:
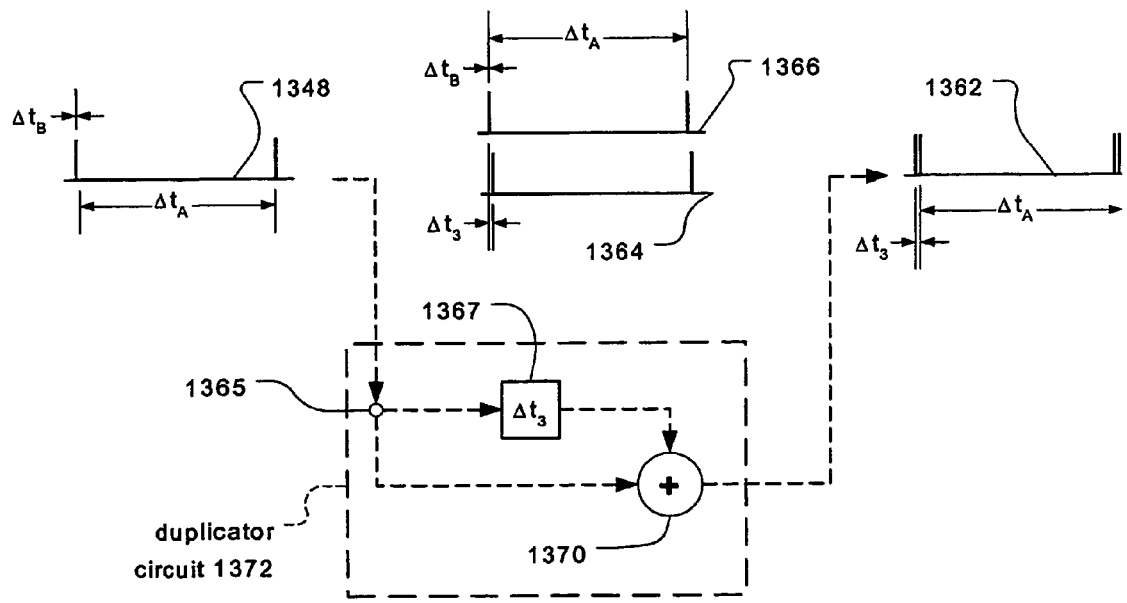
FIG. 16B illustrates a mechanism for encoding a sequence of two successive pulse-symbols to provide a first layer of routing information so that they can be routed by a switch in accord with embodiments of the inventions disclosed.

Each of many signals such as signal 1348 can then be applied to an optical summing device, such as a Y-junction or other device (see below for discussion of Y-junctions, directional couplers, etc.) to create a high density time-multiplexed signal. Alternatively, an optical amplifier can be used to amplify the signals either in their original form 1338 or at a later stage after chopping and interleaving. While FIG. 16A shows a method of narrowing the pulses width, demultiplexing is a problem. This is addressed by encoding the signal in the manner discussed with respect to FIG. 13. Encoding system 1520 illustrated by FIG. 15b demonstrates an encoding process. Another means by which this encoding may be accomplished is to route the pulses through multiple layers, which is discussed with reference to FIGS. 16B to 16D.

The output signal 1348 from the previous figure may be applied to a duplicator circuit 1372. The latter is simply an optical splitter 1365 and a delay device 1367 configured to split the signal 1348 and sum a delayed copy 1366 of the signal with a non-delayed copy 1364. Here the delay is indicated as having a magnitude of $\Delta t_3$. The output signal 1362 retains the original symbol spacing. As should be clear from the foregoing discussion and particularly that attending FIG. 14, when "routed" by a receiving coincidence gate, the control/information pulse disappears. To allow the pulse-pair to contain routing information for multiple layers, the pulse-pair must contain enough information to route the pulses through the next layers in spite of the loss of pulses in the routing process through the previous layers. In this situation the pulse-pair contains multiple pulse-pairs and the original signal 1348 is reproduced in a corresponding channel by a repeating a process similar to that performed by duplicator 1372.

Note that the distance between adjacent pulses $\Delta t_A$ is illustrated as being very large in this example. As discussed above, the allowed range of spacings between pulses, which corresponds to the number of degrees of freedom of the code, should preferably not violate the minimum guard band rule, unless some other means is employed to filter out unwanted interference, a matter not discussed in the present disclosure. In the present example, the spacing $\Delta t_A$ is illustrated as relatively large in anticipation of adding multiple layers of encoding, which is discussed next.

Figure 16C:
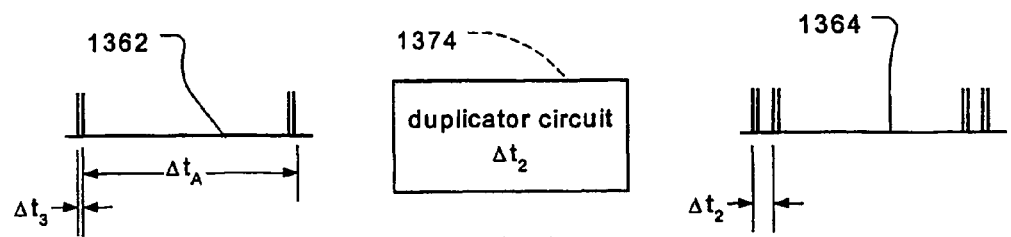
FIG. 16C illustrates a mechanism for encoding a sequence of two successive pulse-symbols to provide a second layer of routing information so that they can be routed by a switch in accord with embodiments of the inventions disclosed.
Figure 16D:
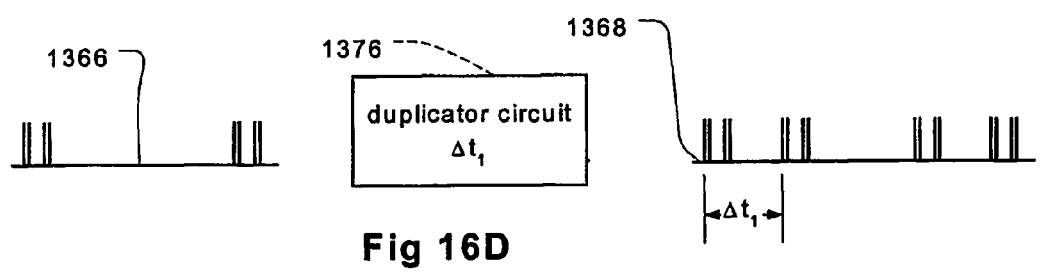
FIG. 16D illustrates a mechanism for encoding a sequence of two successive pulse-symbols to provide a third layer of routing information so that they can be routed by a switch in accord with embodiments of the inventions disclosed.

Referring now to FIG. 16C, the pulse-pair symbology may be applied to multiple router layers of coincidence gate-based switches such as system 1400 of FIG. 14. To accomplish this, the pulse pair encoding the destination for a symbol is treated as a single pulse and reproduced, as were the pulses of the original data stream 1348 in the description attending FIG. 16B. The signal 1362 is applies to another duplicator circuit 1374 with another time delay $\Delta t_2$. This time delay $\Delta t_2$ corresponds to the delay of a level of coincidence gate switch system (e.g. 1400) that would precede the switch layer configured to route based on the time delay $\Delta t_3$. That is, $\Delta t_3$ Is the interval that specifies a coincidence gate switch in the final layer of routing systems 1400 and $\Delta t_2$ is the interval that specifies a coincidence gate switch in the penultimate layer of routing systems 1400. An upper layer of routing encoding may be added as illustrated in FIG. 16D. Here, each set of pulses making up each symbol in signal 1366 is reproduced at an appropriate interval spacing by another duplicator circuit 1376 configured with a delay of $\Delta t_1$. The encoding represented by the interval $\Delta t_3$ would be the last to be processed and routed by the last layer (highest layer) of routing switch systems (e.g., 1400) that includes multiple routing layers.

Figure 16E:
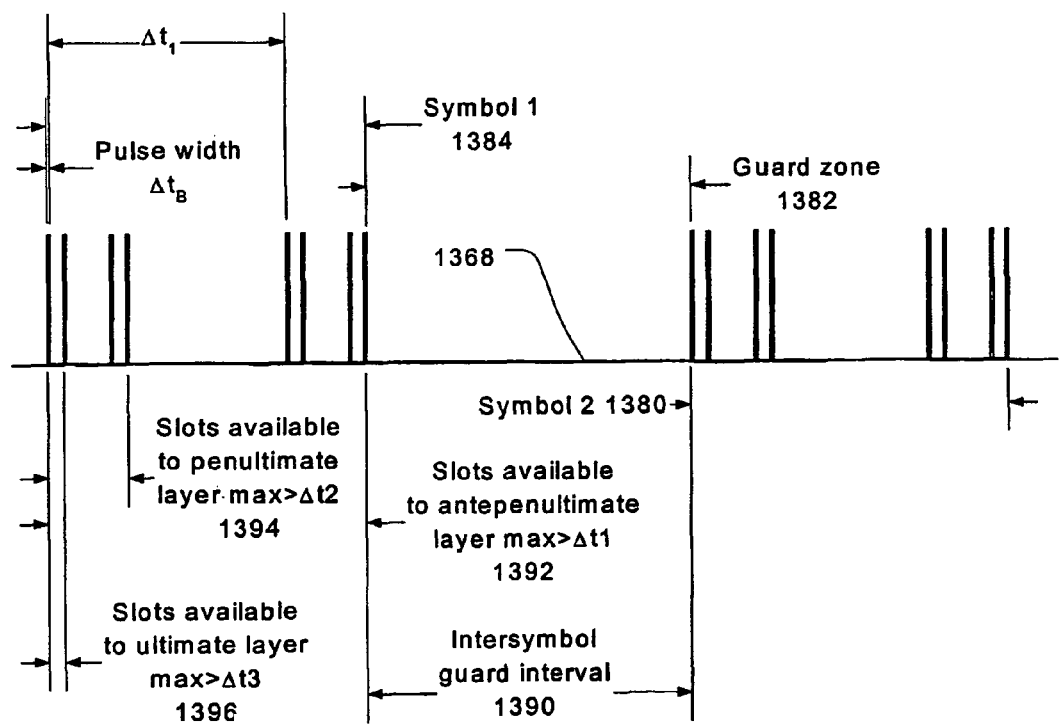
FIG. 16E is an annotated diagram illustrating an encoding scheme for multilayer switching according to embodiments of inventions disclosed.

Referring now to FIG. 16E, signal 1368 is annotated with certain details to help clarify the above discussion. Each set of four pulses in the interval 1384 represents a single symbol from the original source signal 1340 encoded by the duplicator circuits 1372, 1374, and 1376. Each of the time intervals $\Delta t_1$, $\Delta t_2$, and $\Delta t_3$, selects a unique coincidence gate switch (e.g. 1200 in a system including multilayer systems of FIG. 14) in a given layer of switch systems (e.g., 1400 in FIG. 14). Each output of a switch, such as CDM system 1400, in a first layer, corresponds to a unique value of $\Delta t_1$. Each output of a switch in a second layer, corresponds to a unique value of $\Delta t_2$. Each output of a switch in a third layer, corresponds to a unique value of and $\Delta t_3$.

The time slots available for encoding the highest layer codes range over an interval 1396. The slots are spaced at least a pulse width apart (and are at least a pulse-width wide). The series of adjacent slots must be defined such that they occupy a time range that is no wider than interval 1396. A corollary is that $\Delta t_3$ should never be outside this time range 1396.

The time slots available for encoding the penultimate layer codes range over an interval 1394. The slots are spaced apart by at least the interval 1396. The slot widths are at least at least the interval 1396. The series of adjacent slots must be defined such that they occupy a time range that is no wider than interval 1394. A corollary is that $\Delta t_2$ should never be outside the time range 1394.

The time slots available for encoding the antepenultimate or initial layer codes range over an interval 1392. The slots are spaced apart by at least the interval 1394. The slot widths are at least at least the interval 1396. The series of adjacent slots must be defined such that they occupy a time range that is no wider than interval 1392. A corollary is that $\Delta t_1$ should never be outside the time range 1394.

A guard interval 1390 must maintain a distance between adjacent initial switch layer slot ranges that is at least as great as interval 1392 to prevent intersymbol interference. The guard zone requirement only exists at the highest layer of encoding. This is because the time delays that correspond to the lower layers is always a fraction of those at higher layers, the presence of the highest level guard interval 1390 guarantees that no overlap will occur between successive symbols in the lower layers.

Figure 16F:
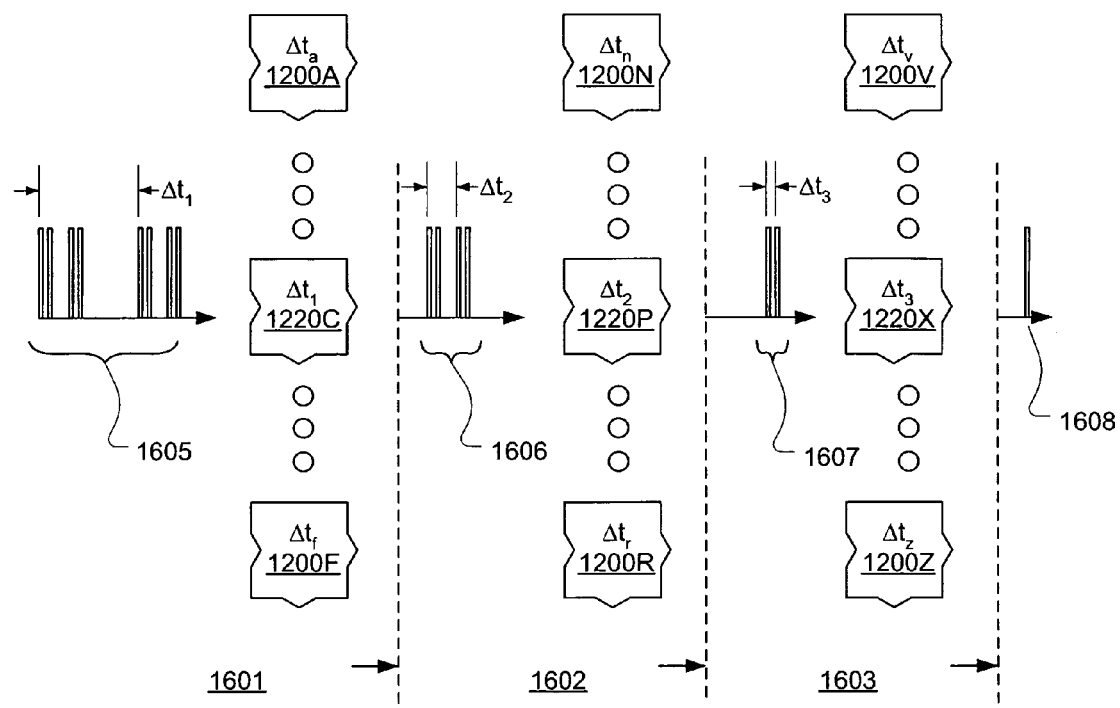
FIG. 16F illustrates the effect of each switch layer on symbology for routing a data pulse.

Refer now to FIG. 16F, which illustrates further how the multilayer signal is processed through multiple layers. The original signal (e.g. 1368 from FIG. 16D) here shown at 1605, is applied to a first layer 1601 of switches 1200A–1200F each with a respective time delay $\Delta t_a$–$\Delta t_f$. Switch 1220C, which is within the range of switches 1200A–1200F (a range which has an arbitrary number of switches within the confines of the encoding range), outputs signal 1606 because it is configured for the matching time interval $\Delta t_1$. The signal 1606, may be thought of as containing the structure of one half of the signal 1605 and results due to the coincidence effect described for coincidence gates above. The other switches in the layer 1601 output no signal, because their time delays have non-matching values.

Signal 1606 is applied to the second layer of switches 1200N–1200R, each with a respective time delay $\Delta t_n$–$\Delta t_r$. Switch 1220P, which is within the range of switches 1200N–1200R (a range which also has an arbitrary number of switches within the confines of the encoding range), outputs signal 1607 because it is configured for the matching time interval $\Delta t_2$. The signal 1607, may be thought of as containing the structure of one half of the signal 1606 and results due to the coincidence effect described for coincidence gates above. The other switches in the layer 1602 output no signal, because their time delays have non-matching values.

Signal 1607 is applied to the third layer of switches 1200V–1200Z, each with a respective time delay $\Delta t_v$–$\Delta t_z$. Switch 1220X, which is within the range of switches 1200V–1200Z (a range which also has an arbitrary number of switches within the confines of the encoding range), outputs signal 1608, because it is configured for the matching time interval $\Delta t_1$. The signal 1608, may be thought of as containing the structure of one half of the signal 1607 (or a single pulse) and results due to the coincidence effect described for coincidence gates above. The other switches in the layer 1603 output no signal, because their time delays have non-matching values.

Note that in FIG. 16F, the shapes of the pulse patterns are not necessarily to scale.

FIG. 17 illustrates how WDM may be combined with the symbology method of the present invention in a communications system. Multiple instances of the interleaving/multiplexing system described with reference to FIG. 15b may be provided, for example as indicated at 1610. Each of the multiplexed channels may be assigned a frequency channel and multiplexed in a WDM process 1620 for transmission on a long haul channel 1615. Corresponding demultiplexing provided by a WDM demux engine 1625 is provided at a receiving end, the respective frequency channels of which may be applied to respective optical demultiplexers 1626 and 1627, such as those illustrated in FIG. 14. Note that two layers of demultiplexers are shown. These may employ the mechanism for multiple-layer encoding described with respect to FIGS. 16A–16D.

There are several conclusions and ramifications regarding the details of the above embodiments that may be summarized here before discussing some other types of interference devices that may be configured to provide coincidence gate-type functionality similar to that discussed above. One of ordinary skill will observe that among the embodiments and inventions discussed, at least the following are provided:

1. All-optical modulators for generating ultra narrow pulses to produce DTDM.
2. Ultra fast all-optical switches.
3. All-optical modulators and switches that are radiation controlled or are self-triggered.
4. All-optical encoding symbology that may be used for data interleaving or multiplexing with very narrow pulses that may be radiation controlled or self-triggered.
5. All-optical decoding or demultiplexing systems that may be radiation controlled or self-triggered.
6. Extremely fast all-optical systems for multiplexing and demultiplexing and which may be used for DTDM.
7. Extremely fast all-optical systems for multiplexing and demultiplexing codes for CDM, self-routing, self-triggering, ATM, and data routing.
8. A method for modulating logical symbols that are self-routing without separate control data or packet headers.
9. Novel devices that may be used for selectively directing optical energy in cylinders within and outside the communications field.

Figure 18:
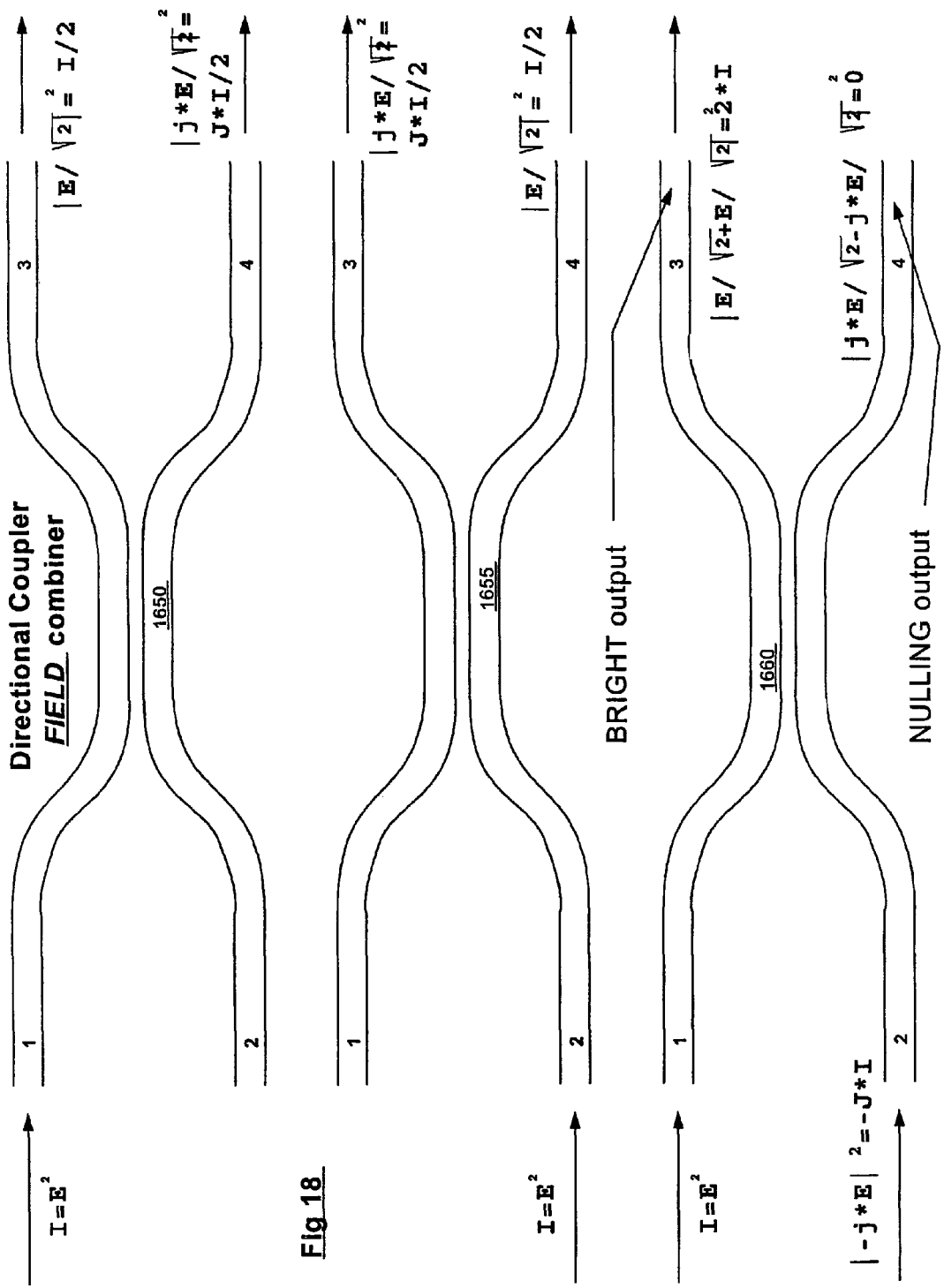
FIG. 18 shows some principles involved with directional couplers used for a coincidence devices according to embodiments of inventions disclosed.

The foregoing embodiments are by no means the only means by which the inventions discussed above may be implemented. Referring now to FIG. 18, as will be discussed in some detail below, directional couplers, as illustrated for example at 1650, are interference devices of a sort in the radiation applied to them interferes to produce various results at their outputs. For example, respective light signals applied to the ports indicated at 1 and 2 may interfere in a way that is determined by the structure of the directional coupler 1650. The interaction of these signals dictated by the structure of the coupler, the phase and electric field amplitude of the light incident on the ports 1 and 2 (as well as other factors) determines the electric field amplitude and phase of the light emitted from ports 3 and 4.

As will be appreciated by persons of skill in the relevant fields, it is possible to create a directional coupler in which light incident on port 1 will result in radiation signals being emitted from ports 3 and 4 which are equal in electric field amplitude with a $\pi/2$ phase difference. More specifically, where the signal incident on port 1 has an electric field amplitude of E, the signal emitted from port 3 would have an electric field amplitude of $E/\sqrt{2}$ and in a certain phase relative to the input signal. The signal emitted from port 4 has the same field amplitude, but its phase is $\pi/2$ radians ahead of that of the signal emitted from port 3. The intensity of the signals is given by squaring the electric field amplitude so the port 1 signal has intensity $I=E^2$, and port 3 and 4 signals have intensity $I/2=E^2/2$ or half that of the signal applied to the input port 1.

For convenience, the following notation convention will be adopted. The intensity of light will be specified and where relevant, the phase indicated by multiplication by a symbol J to indicate a $\pi/2$ phase difference, by $-1$ to indicate a $\pi$ phase difference, and by $-J$ to indicate a $-\pi/2$ phase difference. Thus, $-J*I/2$ means a signal whose intensity is $I/2$ and whose phase is $-\pi/2$ ahead (or $\pi/2$ behind) of a reference signal.

A quick review of the signals incident on waveguides 1655, 1660 shows that when a signal is applied at port 2, the mirror-image obtains at the output ports 3 and 4. That is, the signal at port 3 is $J*I/2$ and that at port 4 is $I/2$. The more interesting situation occurs when light of equal intensity is incident on ports 1 and 2, but different in phase by $-\pi/2$. That is, the signal incident on port 1 is I and that on port 2 is $-J*I$. The output at port 4 is zero. All of the energy incident on ports 1 and 2 arrives at port 3. In this case, although shown, the phase relationship between the energy at port 3 and that at port 4 is irrelevant since no light is emitted from port 4.

Figure 19:
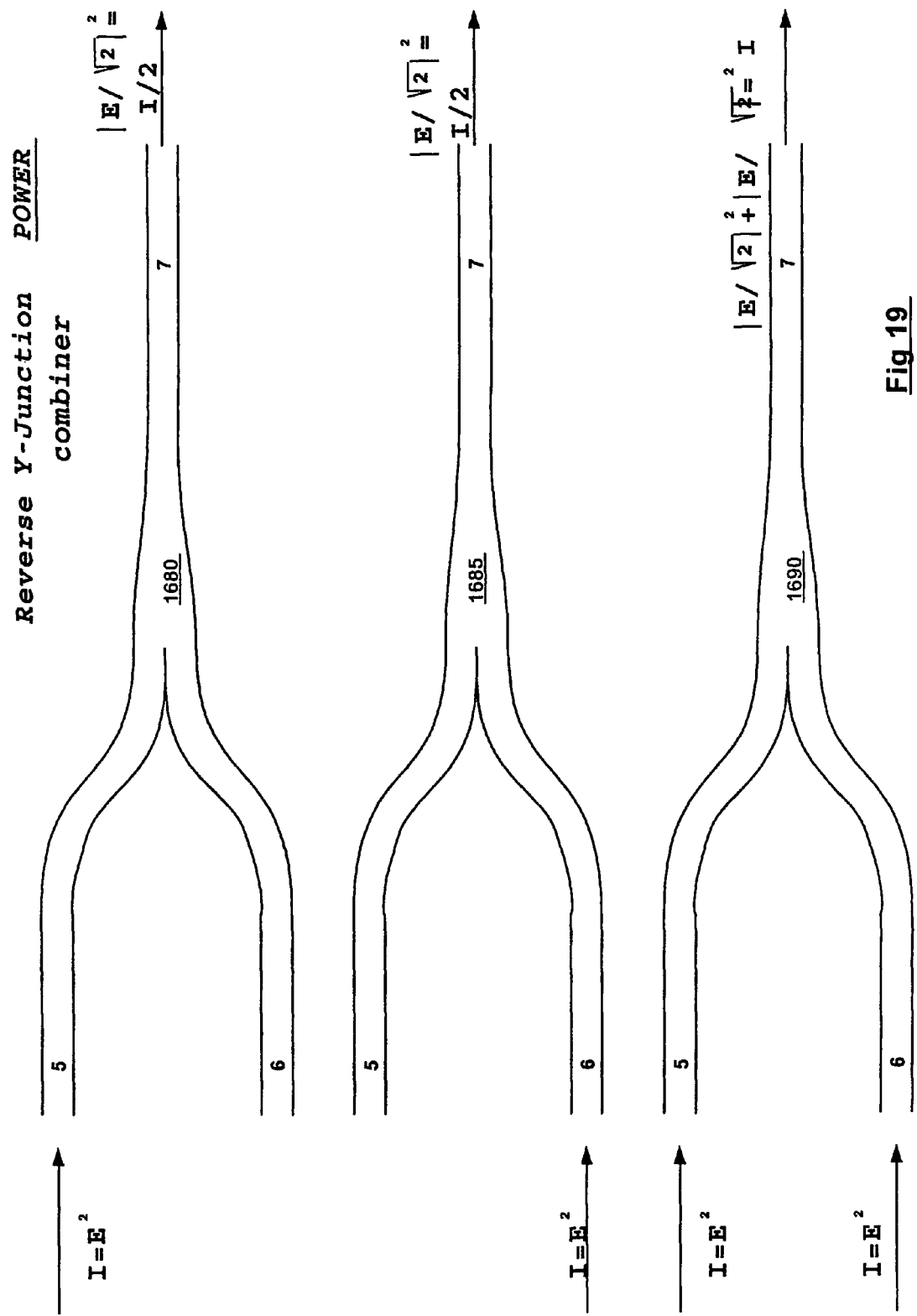
FIG. 19 shows some principles involved with Y-couplers used for a coincidence devices according to embodiments of inventions disclosed.

Referring now to FIG. 19, the effects of reverse Y-junctions on input energy is discussed. When a light signal is applied to port 5 or 6 of Y-junctions 1680 and 1685, respectively, the output intensity at port 7 is half that of the applied at the input. When light is incident on both input ports 5 and 6, of Y-junction 1690, simultaneously and in the same phase, the output energy output at port 7 is half the total applied at ports 5 and 6. In terms of the phase effects, where input signals interfere so that input signals of opposite phase cancel each other and signals in phase add, with a 50% attenuation in intensity.

Referring to FIG. 20, coincidence devices 1700 and 1705 are each formed from a pair of Y-junctions 1715 and 1730 and Y-junctions 1720 and 1760 and a single directional coupler 1710 and 1725. Each device 1700 and 1705 has a phase shifter 1740 and 1745 at a corresponding output port 7 of each device 1700 and 1705. As may be determined by inspection, an identical signal at ports 1 and 5 of intensity I results in a signal at port 7 of I/2 and signals of equal intensity at ports 3 and 4, with the signal at port 4 being shifted forward in phase by $\pi/2$ relative to the others. A $-\pi/2$ phase shift is applied to the port 7 signal resulting in a signal of $-J*I/2$, which is of the same magnitude as the port 4 signal but opposite in phase. This is applied at port 9 of Y-junction 1730. The port 4 signal is applied to port 8 of the same y-junction resulting in an output of zero at port 10.

Figure 21:
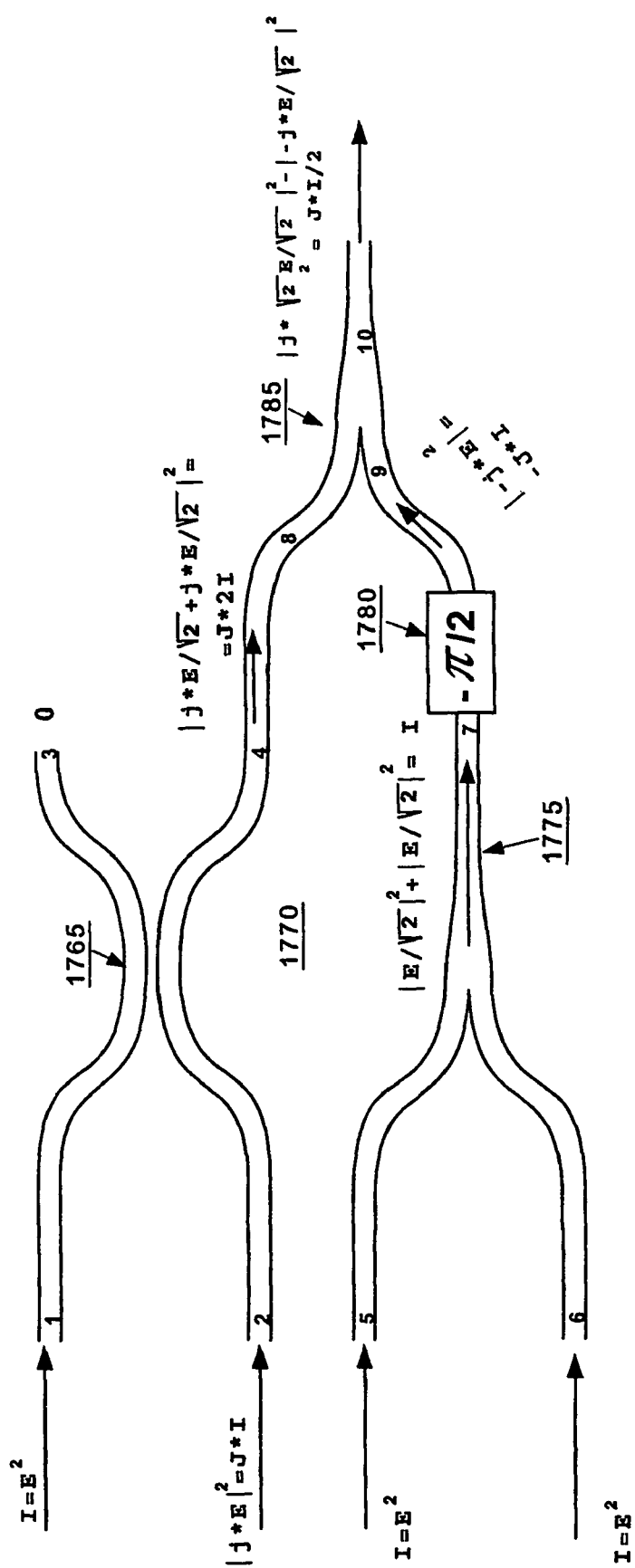

The coincidence device 1705 experiences a similar cancellation effect when signals of $J*I$ and I are applied at ports 2 and 6, as may be confirmed by inspection and with the aid of the symbols in FIG. 20. Thus, when these inputs are applied at the ports 2 and 6, a zero output is obtained at the output port 10. Referring now to FIG. 21, when the signals of FIG. 20 are applied to all the input ports 1, 2, 5, and 6, simultaneously, a very different result obtains, with the result being an output of intensity and phase $J*I/2$.

FIG. 21 shows that port 4 carries a signal of high intensity, with, namely an intensity of $2*I$ with a phase of $\pi/2$ as it enters port 8 of Y-junction 1785. The intensity at port 9 of Y-junction 1785, after the phase shifter 1780, is I with a phase that is opposite to that of the signal in port 8. The Y-junction 1785 combines the powers in ports 8 and 9 according to their intensities and phases to produce an output signal at port 10 with an intensity of I/2. At the same time, under the above conditions, nulling port 3 has zero output signal and all the energy from port 3 is transferred to port 4. It can be seen that the ratio between the intensities of port 4 in FIG. 21 and FIG. 20 is 4 (2I/(I/2)=4).

Note that the notation in the drawings does not follow strict convention. For example, the result obtained at port 10 is shown as a mixture of intensity, which a scalar, and phase, which is a vector. The Y-junction 1785 may be configured, as is known in the art, so that its output is half the sum of the intensities of its inputs with phase cancellation given by the interference of their waveforms. This means that where the inputs are opposite in phase, as is the case for inputs at ports 8 and 9, the output signal intensity is the difference of the inputs signal intensities attenuated by 50%. Where the input signals are in phase, the output is the sum of the intensities of the input signals attenuated by 50%.

Note that the coincidence devices 1710, 1705, and 1770 may be manufactured on a single substrate as waveguides. The phase shifters 1740, 1745, and 1780 may be provided by simply heating a portion of the waveguide material to change the refractive index. This could be done with an ohmic heater or the like. Another way of forming the phase shifters is to apply a voltage that creates a depletion region, a device known as a Schottky contact. If the devices are made from optical fibers, a pressure could be applied, for example, by means of a piezo-electric device, to change the index of refraction.

Note also that it should be obvious that some phase change will occur as energy propagates along the waveguides in the forgoing devices. And this has been ignored in the discussion. So, for example, the phase of the signal output at port 4 will not be identical to the phase as the same signal is applied to port 8. Similarly, the phase difference between the signal at port 7 will not be precisely $-\pi/2$ radians different from that at port 9. Thus, the discussion has discussed the performance of the devices in a somewhat schematic way, but in a real device a designer would have to account for propagation delays and the effect these have on phase to insure that the desired results provide a coincidence effect such as that shown. In practice, this issue is a design detail that may be ignored for purposes of discussion of the inventions and various embodiments thereof.

Note that the light applied to one pair of ports (either 1,5 or 2,6), may regarded as a single signal input. The signal applied at the port 1,5 input is different, but equal in power to that applied to the port 2,6 input. The latter is an ordered pair with a predefined phase difference that is always the same. When a signal is applied to one input without simultaneous application of a signal at the other, the output signal (port 10) is zero. When respective signals are applied at both inputs, the output is equal to one fourth the power at either input or an eighth of the total power applied to the inputs.

Because the port 2,6 input has a predefined phase difference from the phases of the other input signals, and because of the behavior of the coincidence device 1700, 1705, and 1770 noted above, it is possible to construct coincidence gate with behaviors that are similar to that of embodiments shown in FIG. 6b (an externally-triggered gate), for example and 1200 of FIG. 12 (a self-triggered gate).

Figure 22:
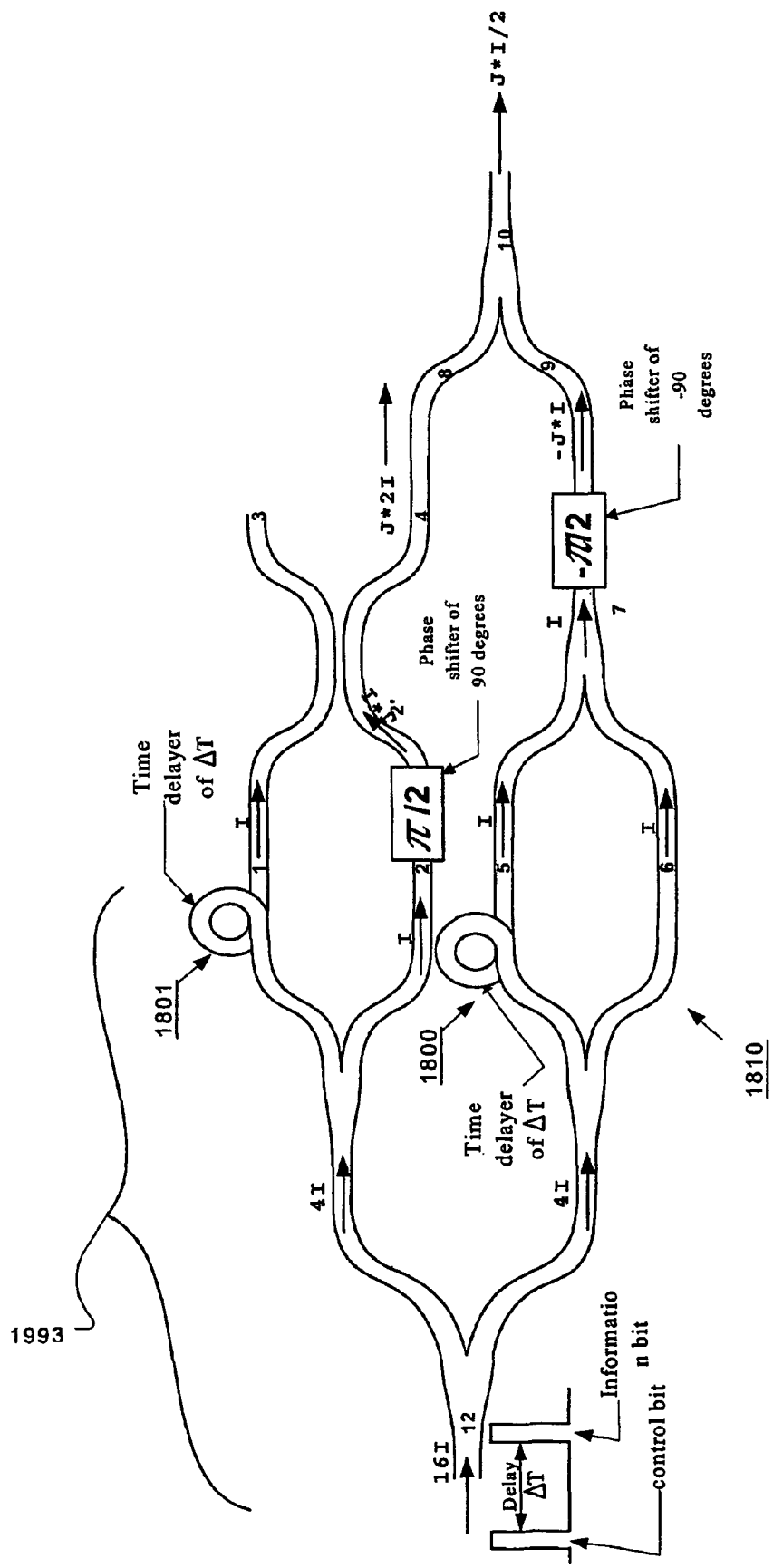
FIGS. 22, 23, and 24 illustrate the basic operation of a coincidence gate device in first and second noncoincidence states and a coincidence state, respectively according to embodiments of inventions disclosed.
Figure 23:
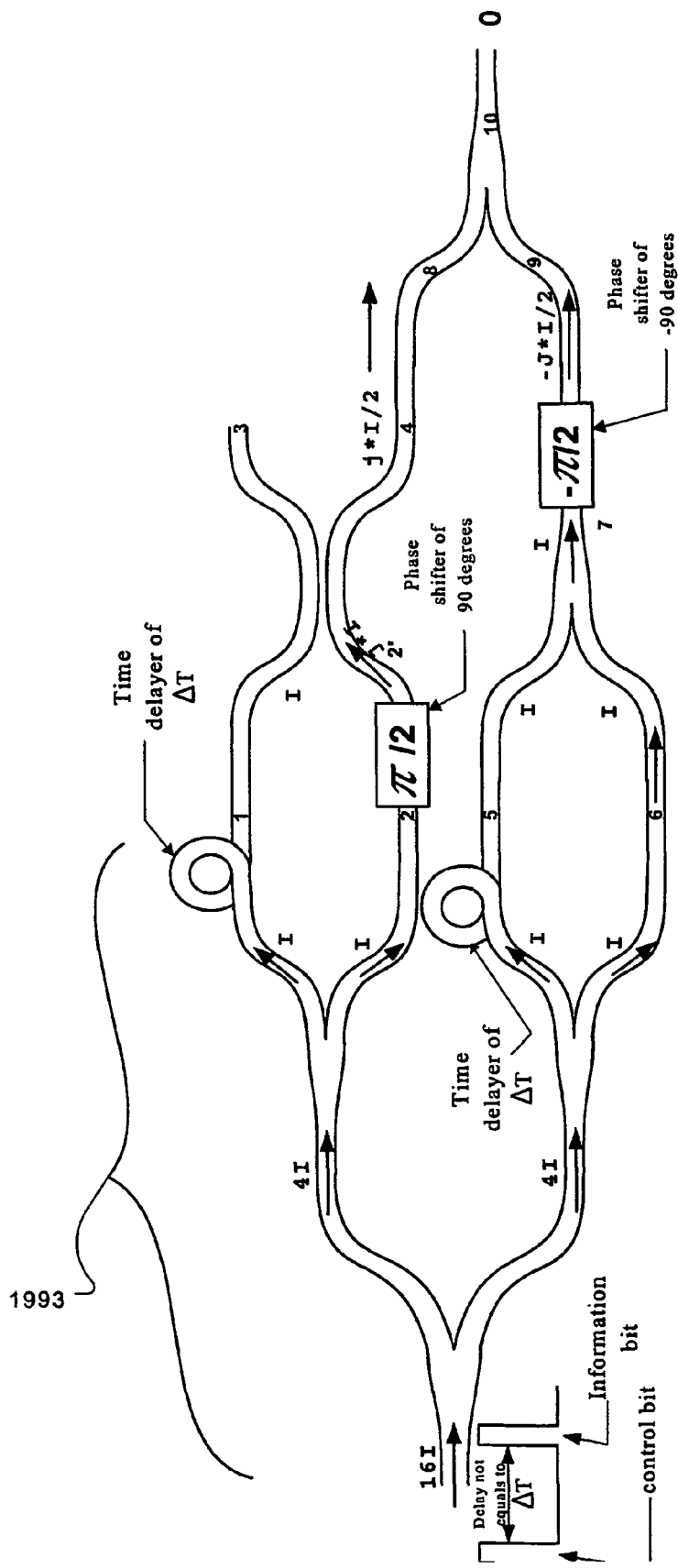
Figure 24:
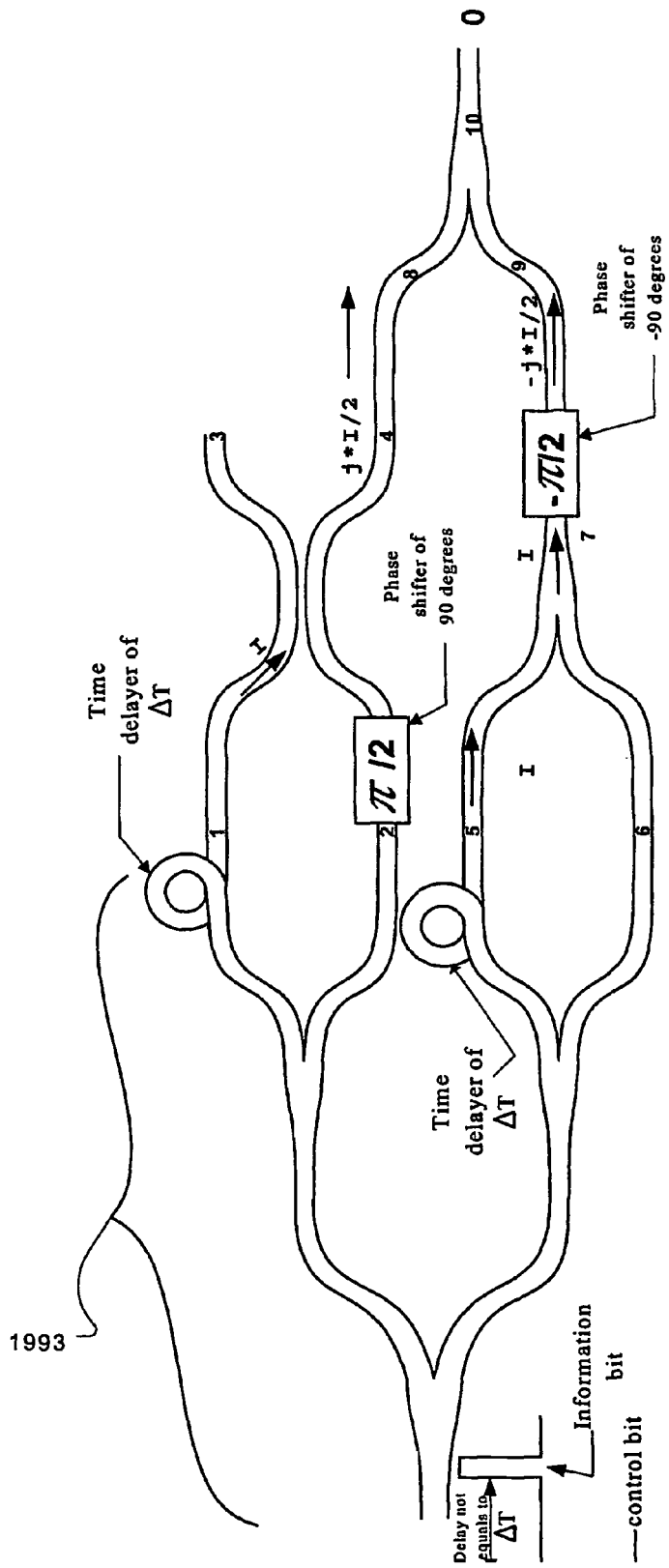

Referring now to FIG. 22, a self-triggered coincidence gate shown in a coincidence state where an input signal applied at input port 12 has a pair of pulses separated by a time interval that matches delay lines 1800 and 1801. The structure shown in FIG. 22, may be confirmed by inspection, to apply input signals to ports 1, 2, 5, and 6, that are identical in terms of relative magnitude and phase to the signals corresponding to the coincidence state illustrated in FIG. 21. If the time interval $\Delta t$ of the input signal applied at port 12 fails to match that of the delay lines 1800 and 1801, it may be confirmed by inspection that the result will be successive states of the system that coincide with those illustrated in FIG. 20. The two possible noncoincidence states obtain when the $\Delta t$ of the input signal is different from that of the delay lines 1800 and 1801. In such cases, each pulse travels though the gate 1810 without a corresponding pulse interfering with it in relevant portions of the circuit as may be seen by inspection. That is, as illustrated in FIG. 23 when the first pulse passes through, passes through, a signal of intensity I passes through port 6 and one of $J*I$ through port 2' (which corresponds to port 2 in FIG. 20) with no corresponding pulse in ports 1 and 5. The result is the situation of the lower half of FIG. 20 where the output is zero. As illustrated in FIG. 24, when the second pulse passes through, a signal of intensity I passes through ports 1 and 5 with no corresponding pulse in ports 2 and 6. The result is the situation of the upper half of FIG. 20 and the output is zero.

Note that although delay lines 1800 and 1801 (as well as delay lines and other devices illustrated in embodiments discussed below) are illustrated as elongated channels (E.g., in the present figure they are suggested to be rolls of optical fiber, for example), various techniques may be used to produce the required delay. For example, materials in which light propagates more slowly (e.g., higher index of refraction achieved by doping) may be added so that the path need not be unduly elongated. Even some kind of energy conversion process like optical-electrical-optical could be used if delays are permitted to be relatively long. Such a device would act as a store-and-forward buffer but with current energy conversion technology, it would be usable for only very long delays. However, there some applications would permit this.

Figure 25:
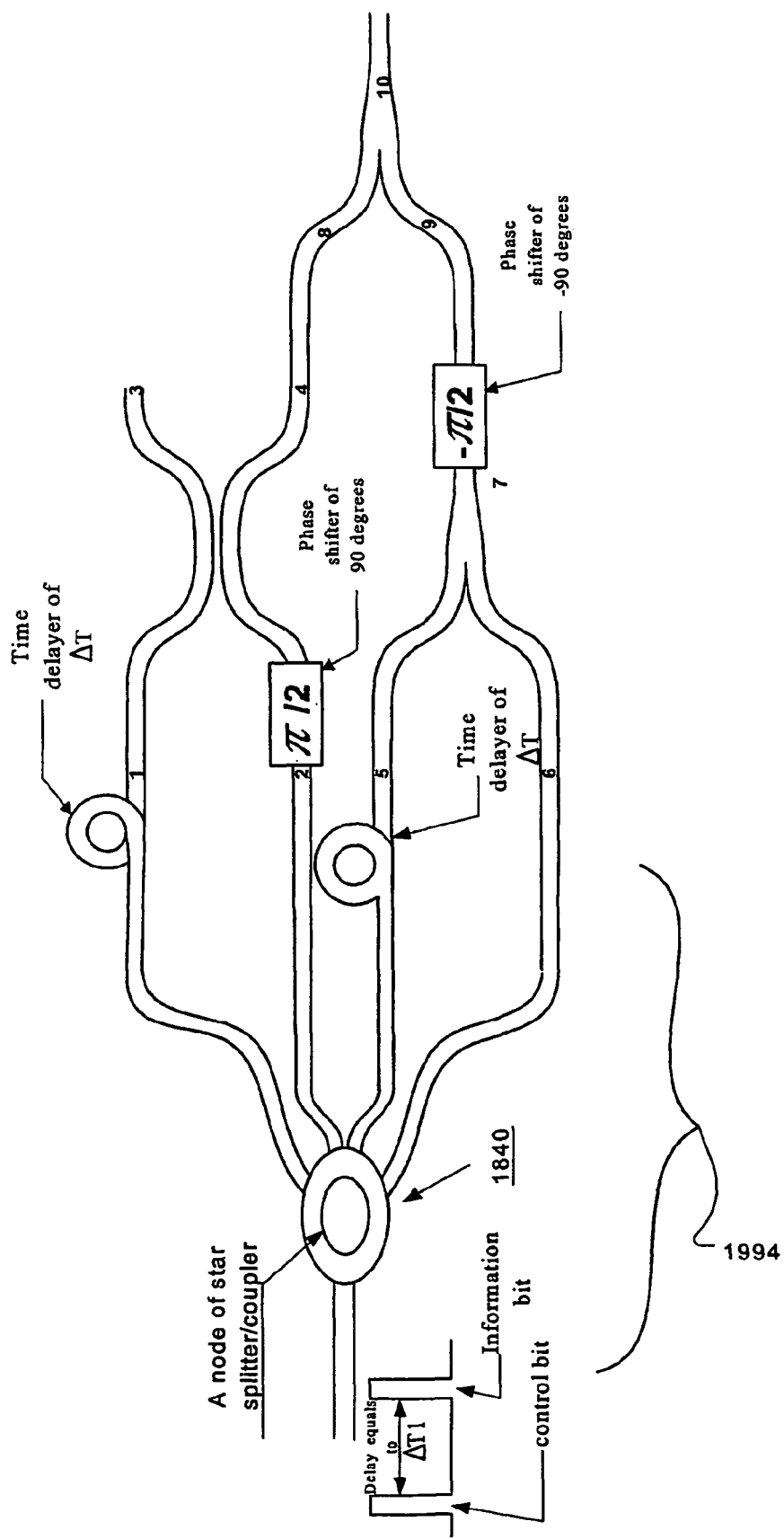
FIG. 25 illustrates a coincidence gate device that is a variation of the embodiments of FIGS. 22–24 employing a star coupler instead of multiple Y-junctions for discussing alternative design concepts.

Referring to FIG. 25, a design essentially the same as that of FIGS. 22–24 may be based on the use of a star-splitter 1840 rather than three Y-junctions as in the embodiments of FIGS. 22–24. The lengths of the radiation guides arms of star-splitter 1840 are preferably designed to assure that the all the radiations enters the ports 1, 2, 5, and 6 with the same phase (or equivalently such that the phase at which the enter the points is appropriately compensated further on such that the ultimate result of a coincidence-gate function is obtained). It should be clear from the illustration that such an embodiment would behave in a manner that is equivalent to the embodiments of FIGS. 22–14.

Thus, it is clear that the behavior of the coincidence gate 1810 is essentially the same as that of gate 1200. However, the total energy loss of the gate 1810 may be substantially higher than that of gate 1200. We assumed in the above discussion that the gate 1200 is based on the embodiments of FIGS. 1–11d, although the discussion of gate 1200 and the modulation techniques discussed in connection with FIGS. 12–17 apply equally to embodiments such as gate 1810 and other embodiments to be discussed below.

Figure 26:
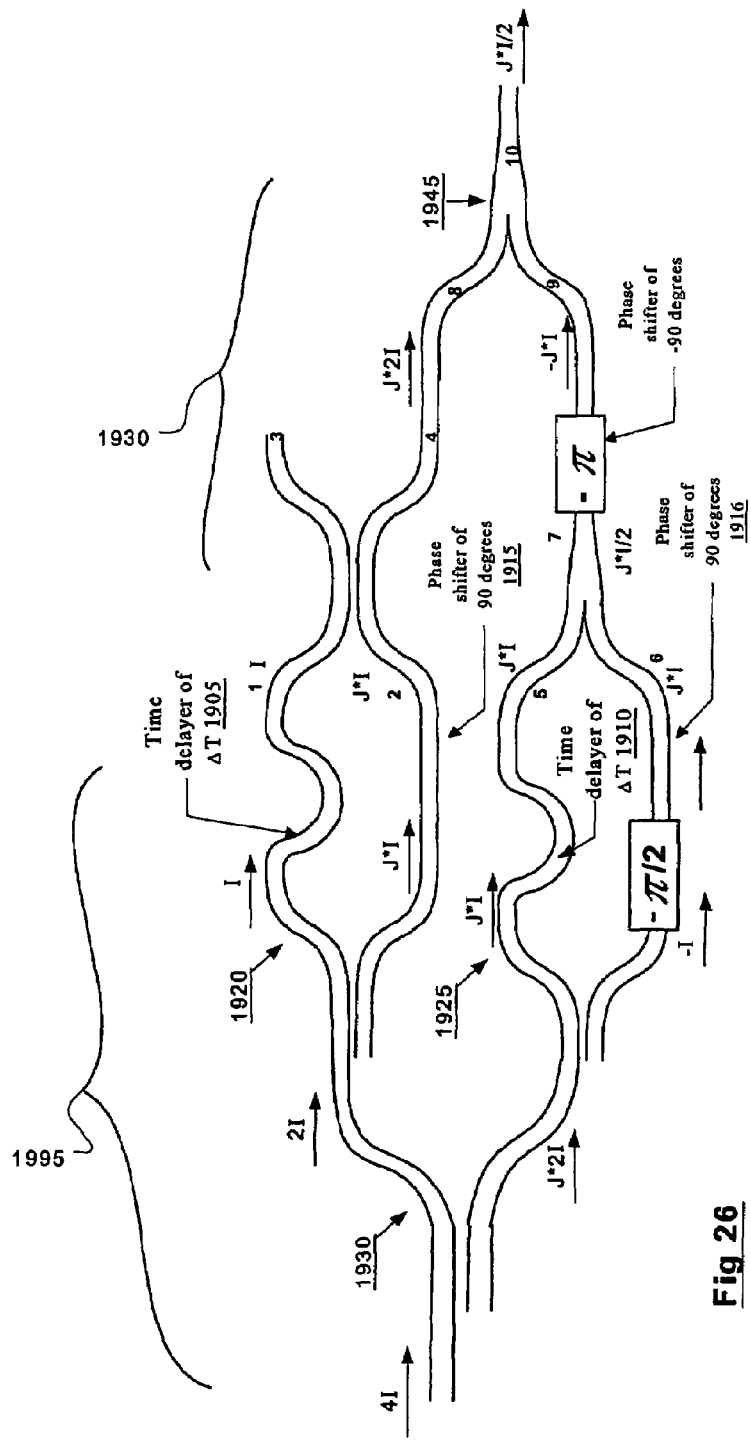
FIG. 26 illustrates a coincidence gate device that is a variation of the embodiments of FIGS. 22–24 compatible with waveguide implementation for discussing alternative design concepts and for illustrating an alternative way of splitting the signals at the input end of a self-triggering-type coincidence gate.

Referring now to FIG. 26, another self-triggering coincidence gate-type device illustrates some concepts that may be used for making devices based on waveguide technologies and also some more general concepts. For example, a gate could be fabricated using lithography techniques using such an approach. For example time delays may be provided in appropriate locations with an alternative to the fiber optical delay lines suggested by the images of delay devices 1800 and 1800 and 1801 of FIG. 22. Instead, a delay line, preferably of high-refractive index material, in the form of an elongated waveguide achieved by, for example, serpentine path portions 1905 and 1910 of the circuit, may be provided as indicated. These portions may be of a material with a higher index of refraction than the material used in other parts of the device so that the lengths of the serpentine paths portions 1905 and 1910 may be minimized for convenience. However, this is not necessary.

Another feature of the disclosed embodiment is that instead of using Y-junctions, star splitter, or a star coupler, a series of 50%/50% directional couplers 1920, 1925, and 1930 (known also as 3dB couplers) are used in a manner similar to that of the embodiments of FIGS. 22–24. In this case, however, the directional couplers inherently introduce a relative phase difference of $\pi/2$ radians in the outputs which must be accommodated in the design. In the schematic illustration, the signal at port 2 differs in phase from that at port 1 (when simultaneous signals place the device in the coincidence state) without the need for an additional phase shifter.

Recall that these are only schematic illustrations and in practice, the structure of the design (including path lengths and materials) may inherently provide the phase shifting. For example, the serpentine delay portion 1905 or other types of delay devices such as delay lines 18001 and 1801 (shown in FIG. 22), introduces multiple phase rotations and if designed to do so, can insure that the correct relative phase angles are provided at the various interference portions of the devices to obtain the desired result.

Note also that there is another phase rotation introduced by directional coupler 1930 and yet another by directional coupler 1925. The end result is that to achieve the desired interference effect in the coincidence device portion 1930 (i.e., the relative phase angles at the input ports 1, 2, 5, and 6), a phase rotation of $-\pi/2$ radians is applied in the lower branch 1916 of directional coupler 1925. The result is that the inputs at ports 1, 2, 5, and 6 produce the constructive interference effect at port 4 so that all the energy applied at ports 1 and 2 emanates at port 4, but the phase angles emitted at port 7 needs to be rotated by $-\pi$ before being applied to the Y-junction 1945 in order to produce the coincidence-type output at port 10. Note that only the coincidence state is shown in connection with the embodiment of FIG. 26, however it may be confirmed by inspection that the structure produces the correct behavior under noncoincidence conditions.

Note that the use of directional couplers instead of Y-junctions results in a lower energy loss through the entire system. That is, one may be see that the energy loss through the embodiment of FIGS. 22–24 is a factor of 32, while the energy loss through the embodiment of FIG. 26 is only by a factor of 8. The losses in the device of FIG. 26 may be compensated for by an optical amplifier 1950 at input port 1965.

Figure 27:
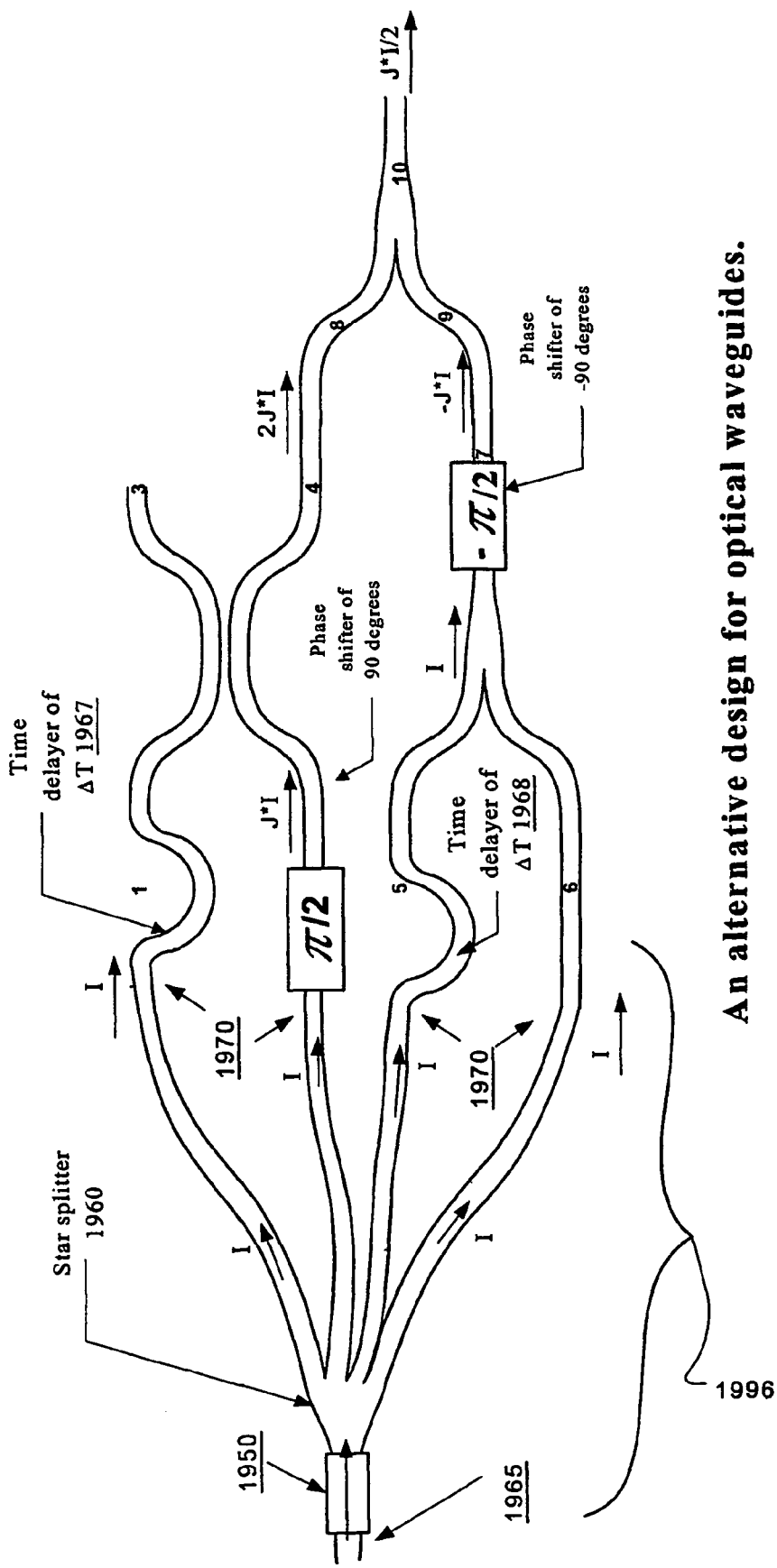
FIG. 27 illustrates a coincidence gate device that is a variation of the embodiments of FIGS. 22–24 compatible with waveguide implementation and using a start splitter instead of directional couplers for discussing alternative design concepts.

Referring now to FIG. 27, another alternative mechanism for creating a coincidence gate device is illustrated here. A star splitter 1960 is configured to output an input optical signal applied at input port 1965 to each of four ports 1970 with equal intensity and phase. The traveling time from the input port 1965 of star splitter 1960 to each port of the pair of ports 1 and 5 (of ports 1970) is assumed in this example to be the same. Similarly, The traveling time from the input of star splitter 1960 to each port of the pair of ports 2 and 6 (of ports 1970) is also assumed to be the same. The energy loss with the star splitter 1960 is less than with the cascade of Y-junctions of the previous embodiment with the input energy being equally divided among the outputs. As known by those of skill in the relevant arts, such a structure may be created via current design techniques. In the embodiment of FIG. 27, serpentine portions are used for delay as in the embodiment of FIG. 26. In all other respects, the embodiment of FIG. 27 is essentially as the embodiment of FIG. 25.

Note that although in the embodiment of FIG. 27, the time delay of all the branches of the star splitter 1960 was assumed to be the same, in practice this, of course, need not be true as long as the coincidence effects required are obtained. For example, the delays of time delayers 1967 and 1968 may be incorporated totally or in part in corresponding branches of the star splitter 1960.

It should be clear from the above that there are a wide variety of ways of generating the coincidence-gate functionality from directional couplers and/or Y-junctions in various combinations.

Referring now to FIG. 28, another way to form a coincidence gate type functionality is by the use of certain features of beam splitters. Illustrated in FIG. 28 are dielectric beam splitters which have the following properties. An incident beam 2010 incident in a first direction on a dielectric beam splitter 2025 is divided into a reflected beam 2015 and a transmitted beam 2020, each with an intensity that is half that of the input beam. The phase angle of the reflected beam 2015 is $\pi/2$ greater than that of the transmitted beam 2020. The same situation obtains when an incident beam 2030 is incident from another direction on the dielectric beam splitter 2025. That is the incident beam 2030 is divided into a reflected beam 2035 and a transmitted beam 2040, each with an intensity that is half that of the incident beam 2030 with the phase angle of the reflected beam 2035 being $\pi/2$ greater than that of the transmitted beam 2040.

When incident beams 2010 and 2030 are coincident from their respective directions on the dielectric beam splitter 2025, with the indicated phase relationships, they interfere constructively. The result is a coincidence effect at the output beam 2045 from the reflection direction of incident beam 2010 and the transmitted direction of incident beam 2030. That is, in the reflection direction of incident beam 2010 and the transmitted direction of incident beam 2030, the combined energy output is four times that when either of the incident beams 2010 and 2030 is incident by itself.

The coincidence effect can be used to generate zero and non-zero outputs in noncoincident and coincident states, respectively by providing optical circuits that provide a magnitude slicing function as provided in previous embodiments discussed above. A number of examples are discussed below with regard to FIGS. 34–42. First, a few more examples of coincidence devices are discussed.

Referring now to FIG. 29, metallic beam splitters have the following properties. An incident beam 2050 incident in a first direction on a metallic beam splitter 2025 is divided into a reflected beam 2055 and a transmitted beam 2060, each with an intensity that is a quarter that of the input beam. The phase angle of the reflected beam 2055 is $\pi$ greater than that of the transmitted beam 2060. The same situation obtains when an incident beam 2070 is incident from another direction on the metallic beam splitter 2065. That is the incident beam 2070 is divided into a reflected beam 2075 and a transmitted beam 2080, each with an intensity that is a quarter that of the incident beam 2070 with the phase angle of the reflected beam 2075 being $\pi$ greater than that of the transmitted beam 2080.

When incident beams 2050 and 2070 are coincident from their respective directions on the metallic beam splitter, with the indicated phase relationships, they interfere constructively and no loss occurs in the metal film (not shown separately). The result is a coincidence effect at the output beam 2085 from the reflection direction of incident beam 2050 and the transmitted direction of incident beam 2070. That is, in the reflection direction of incident beam 2050 and the transmitted direction of incident beam 2070, the combined energy output is four times that when either of the incident beams 2050 and 2070 is incident by itself.

The embodiment of FIG. 29 is another example of how a beam splitter can be used to make a coincidence device. The behavior plays a role in the various devices described above and below. This is the case also with the early embodiments using the transmitting and reflecting gratings as described above with reference to FIGS. 2–11. That is, referring now to FIG. 30, the zero lobe may be regarded as an output which is indicated as an output 2110 at port 2. As discussed above, the output 2110 energy incident at port 2 is a fourth that of the incident beam when either of the input beams at ports 1 or 5 is incident on a grating 2100 alone. When both are coincident on the grating 2100 simultaneously, the energy in the zero order lobe, indicated as an output 2115 at port 2, is only half that of the total energy incident. Thus, the energy at the output 2 in the coincidence state is four times that in the noncoincidence state.

Referring now to FIG. 31 and recalling the discussion of FIG. 19, it may be confirmed immediately that the Y-junction exhibits a coincidence behavior, albeit less markedly in terms of intensity. That is, in either noncoincidence state, the output is half that of the coincidence state. The energy loss in all states is about 50%. No further explanation of FIG. 19 is given since the concepts were discussed with reference to FIG. 19.

Figure 32:
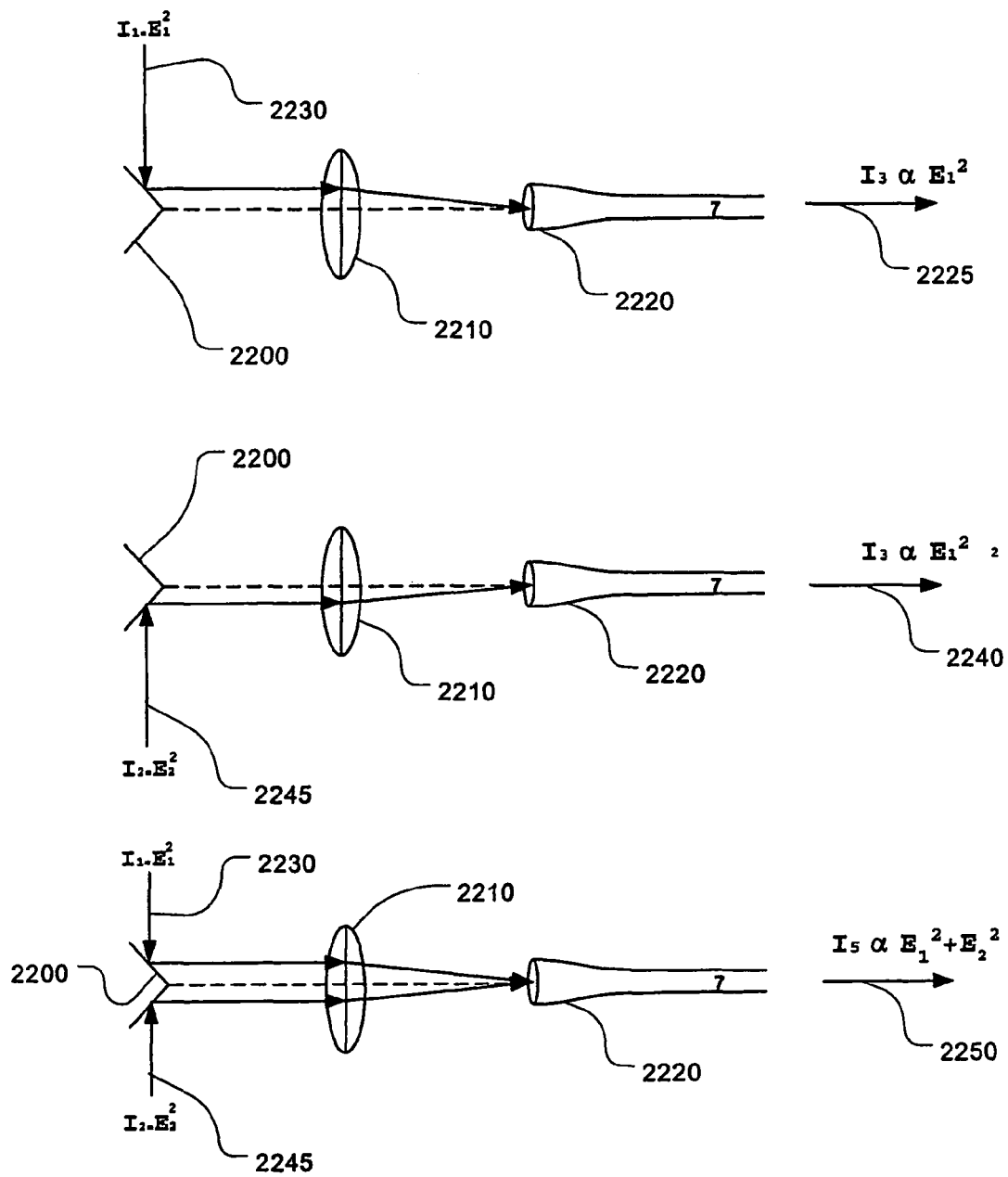

The same "power combiner" behavior as exhibited by the Y-junction of FIGS. 19 and 31 is exhibited by another device shown in FIG. 32. A pair of mirrors 220 directs either of two incident beams 2230 and 2245 toward an optical fiber receiver 2220 via a lens 2210. An output beam 2225/2240 is proportional to the energy incident on the mirror 2200. In the two noncoincident states, the output is the same intensity as the input multiplied by a constant of proportionality. When both beams are coincident, the output is the combined incident power multiplied by the same constant of proportionality. As in the previous embodiment, the ratio of output during the coincidence state to that during the noncoincidence state is a factor of two.

Figure 33:
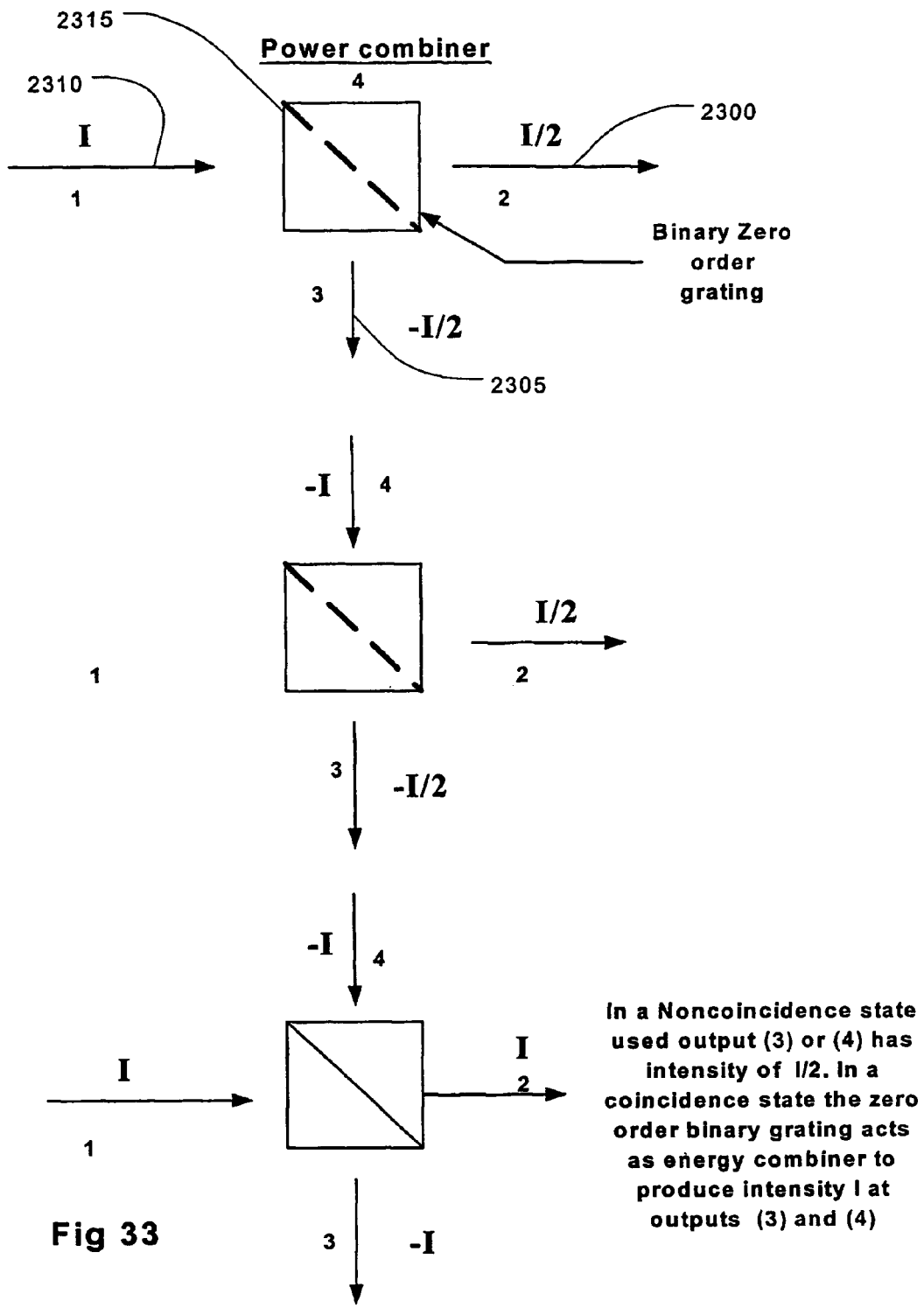
FIG. 33 illustrates energy routing in a grating with a pitch that is much greater than the wavelength of a light signal and which functions in a manner that is similar to a beam splitter as used in certain embodiments of inventions disclosed.

Another kind of power combiner that may be used to produce the same effect is a reflecting/transmitting grating with very high pitch relative to the wavelength of light incident thereon. No diffraction, and therefore no interference fringes, are produced because the wavelength of light is substantially greater than the grating spacing. However, inspection of FIG. 33 highlights the similar behavior to that of a metallic beam splitter with the phase rotation of an incident beam 2310 occurring for a reflected beam 2305 and no phase rotation occurring for a transmitted beam 2300. However, the attenuation of the metallic beam splitter in noncoincidence states is not present in transmitting/reflecting grating 2315, and thus it functions more as a "power combiner" and not as a coincidence device as does metallic beam splitter does. In other respects, the behavior of such a grating is substantially identical to that of a metallic beam splitter for purposes of the coincidence behavior and a discussion of the details is therefore not provided again.

Figure 34:
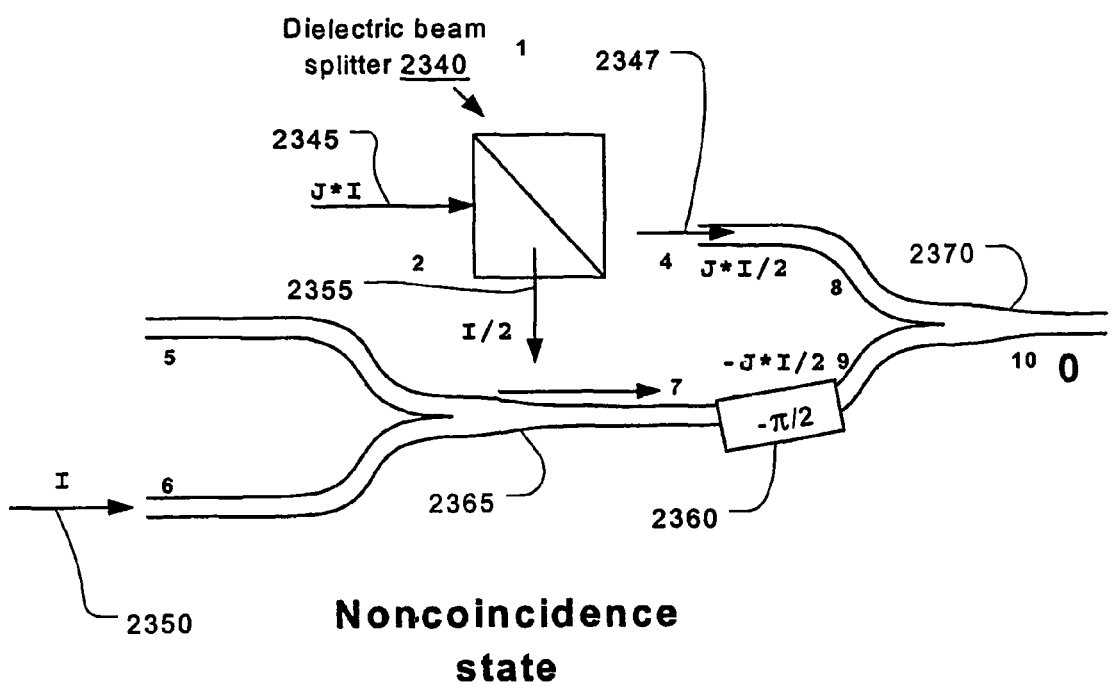
FIGS. 34, 35, and 36 illustrate an embodiment of a coincidence devices consistent with certain embodiments of inventions disclosed and employing a beam splitter and Y-junction for discussing certain concepts of these embodiments.

Referring now to FIG. 34, a coincidence gate that produces zero output in noncoincidence states and a nonzero output in the coincidence state has a two part first input signal provided by either the control or data signal (again, using the illustrative terminology of "control" and "data" employed for purposes of discussing the embodiments) indicated 2345 and 2350. For example, the signals that arrive simultaneously to ports 1 and 6 are provided by either the control or data signal and similarly, the signals that arrive simultaneously to ports 2 and 5 are provided by either the data or control signal, respectively. These have non-identical phases which may be derived by any suitable means such as a phase shifter or by suitable delay relationships in input circuitry (not shown here, but exemplified in other embodiments discussed above and below as should be clear in the detailed description of the embodiments). The first part 2345 of the input signal is partly reflected by the beam splitter 2340 and partly transmitted resulting in beams 2355 and 2347. Although shown, the relative phases of these signals has no relevance, but the phase of signal 2347 must be opposite one produced by the other part 2350 of the input signal via the circuit including Y-junction 2365 and phase shifter 2360. That is, the result of the combination of the signals at ports 8 and 9 by a final Y-junction 2370 should be zero.

Figure 35:
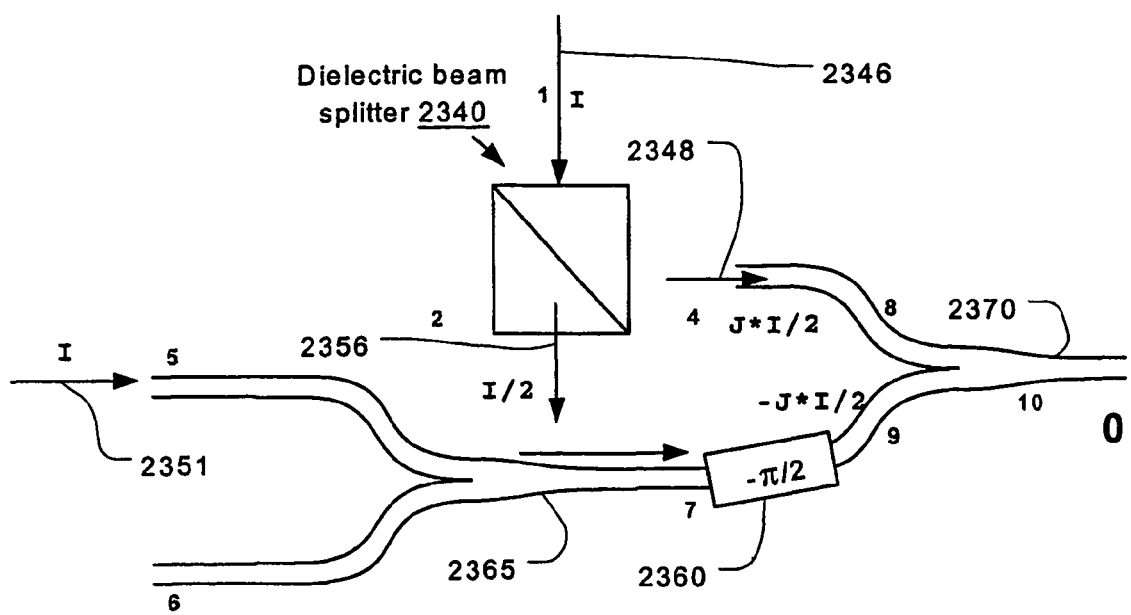

Referring now to FIG. 35, an the alternative noncoincidence state, the embodiment of FIG. 34 receives the other of the data or control signals in two parts 2351 and 2346. These two parts may have identical phases which may be derived by any suitable means such as a phase shifter or by suitable delay relationships in input circuitry (not shown here, but exemplified in other embodiments discussed above and below as should be clear in the detailed description of the embodiments).

Note that the phase relationships between the two parts (here and in FIG. 34) is arbitrary so long as suitable design is provided in other parts of the circuit such that the correct interference interaction occurs. But the relative phases of input signal 2346 and 2351 is important to insure that the beam splitter's output to port 4 in the coincidence state is much greater in magnitude than that produced by the power combiner 2365 as discussed with regard to FIG. 36, below, which shows the coincidence state.

Returning to the discussion of the noncoincidence state of FIG. 35, the first part 2346 of the input signal is partly reflected by the beam splitter 2340 and partly transmitted resulting in beams 2356 and 2348. Again, the structure must insure that the phase of signal 2348 is opposite that produced by the other part 2351 of the input signal via the circuit including Y-junction 2365 and phase shifter 2360. That is, the result of the combination of the signals at ports 8 and 9 by a final Y-junction 2370 should be zero.

Figure 36:
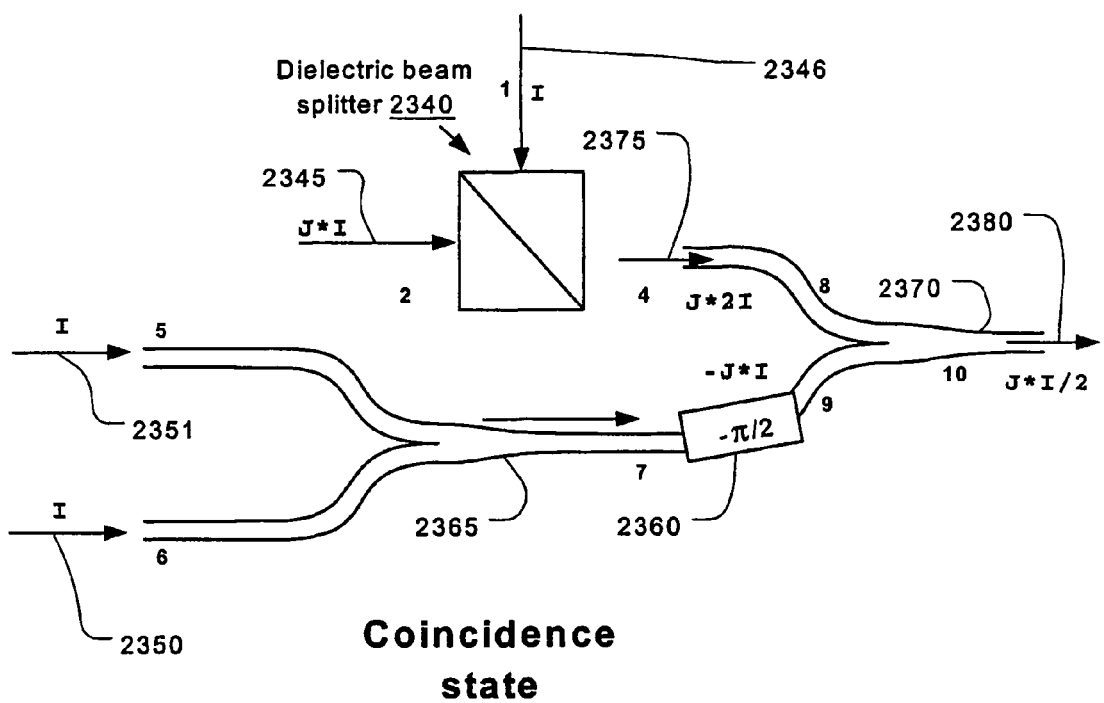

Referring now to FIG. 36, when respective parts 2345 and 2346 of both the data and control signals are incident on the beam splitter 2340, all the energy of the two signals emerges at port 4 as a signal 2375. The phase of this signal 2375 is the same as that in each of the noncoincidence states, but it is four times the magnitude, that is, 2I. The Y-junction combines the other parts 2350 and 2351 of the data and control signals, but the resulting intensity is only twice that in the noncoincidence states of FIGS. 34 and 35. Thus, when combined with the signal in the Y-junction 2370, a non-zero output 2380 at port 10 is obtained.

In terms of the relative intensity, the behaviors of the device of FIGS. 34–36 is essentially the same as that described with respect to FIGS. 20 and 21. To apply signals to the various inputs of the device of FIGS. 34–36, the same input circuitry 1993, 1994, 1995, and 1996 (shown in FIGS. 22–27) as added to corresponding parts (i.e., applied at ports 1, 2, 5, and 6) to the device of FIGS. 20 and 21 may be used. That is, the input circuit portions 1993, 1994, 1995, and 1996 may be used as well as variations thereof discussed above and the wide variety others that may be envisioned based on the principles presented herein.

Note that although the above embodiment of FIGS. 34–36 included a dielectric beam splitter 2340, it is clear that other types of devices may be used to achieve the same effect. For example, a metallic beam splitter could be substituted, with appropriate circuiting to provide the required phase relationships as illustrated by FIG. 29.

Figure 37:
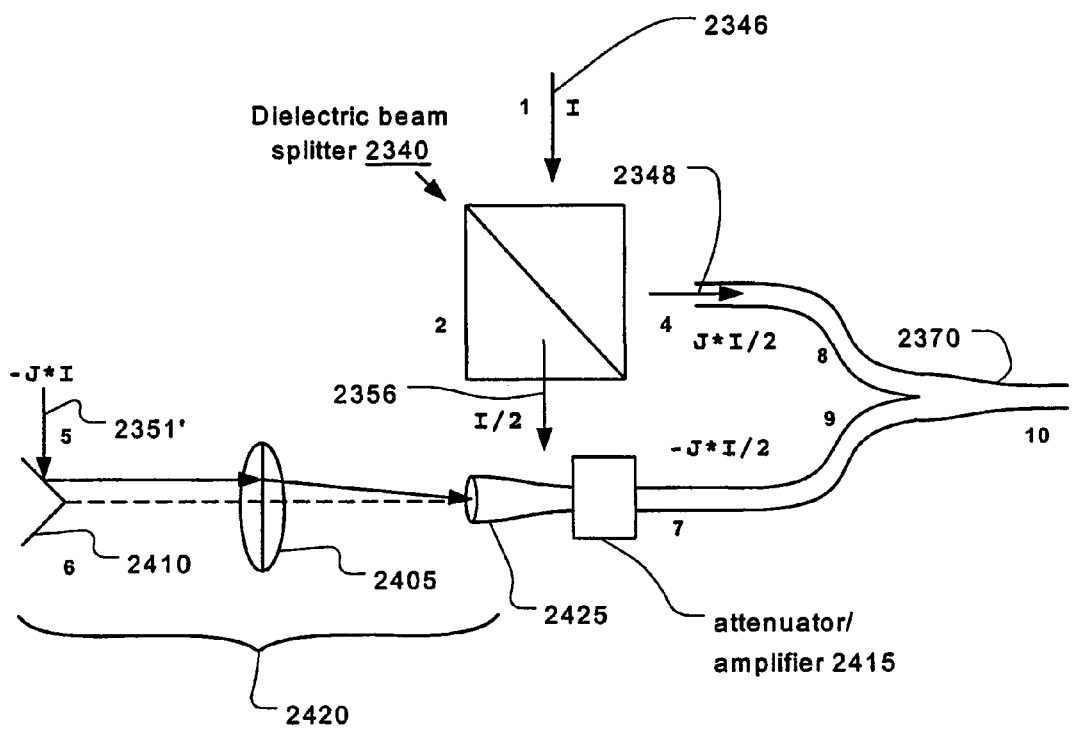
FIGS. 37, 38, and 39 illustrate an embodiment of a coincidence devices consistent with certain embodiments of inventions disclosed and employing a beam splitter and a different kind of Y-junction for discussing certain concepts of these embodiments.

Referring now to FIG. 37, the present embodiment is similar to that of FIGS. 34–36 except that a different power combiner 2420 of the type discussed relative to FIG. 32 is used and the input signal portions applied to it indicated (schematically) to have an input phase that is π ahead of that provided in the embodiments of FIGS. 34–36. That is, a portion 2351' of one of the data and control signals has an initial phase of π. Again, as should be clear, the input phases are arbitrary so long as the circuitry design provides appropriate interaction within components where the signals interfere.

The power combiner 2420 includes a mirror pair 2410, a lens 2405, and a receiving port 2425 of an optic fiber. The signal 2351' is attenuated by the insertion process, but is proportional to the initial signal and is shown at port 7 with an intensity of I/2 and a phase that is π ahead (or behind) that at port 4, as symbolized by the multiplier –J. The port 4 signal is as in the previous embodiments. An attenuator/amplifier 2415 is included to indicate that the circuitry needs to ensure the output of the Y-junction 2370 is zero.

Figure 38:
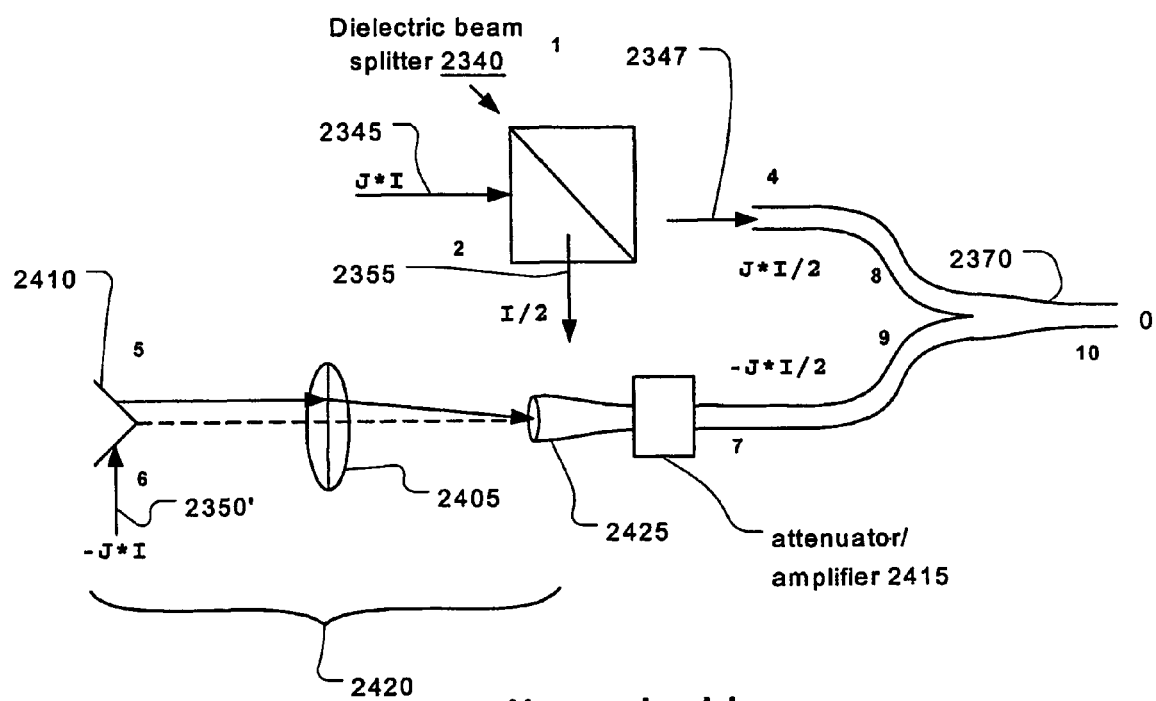

Referring now to FIG. 38, the complementary one of control and data signals is applied in respective portions 2345 and 2350' to the ports 2 and 6, respectively with the same result as in FIG. 37 with a zero output at port 10 of the Y-junction 2370.

Figure 39:
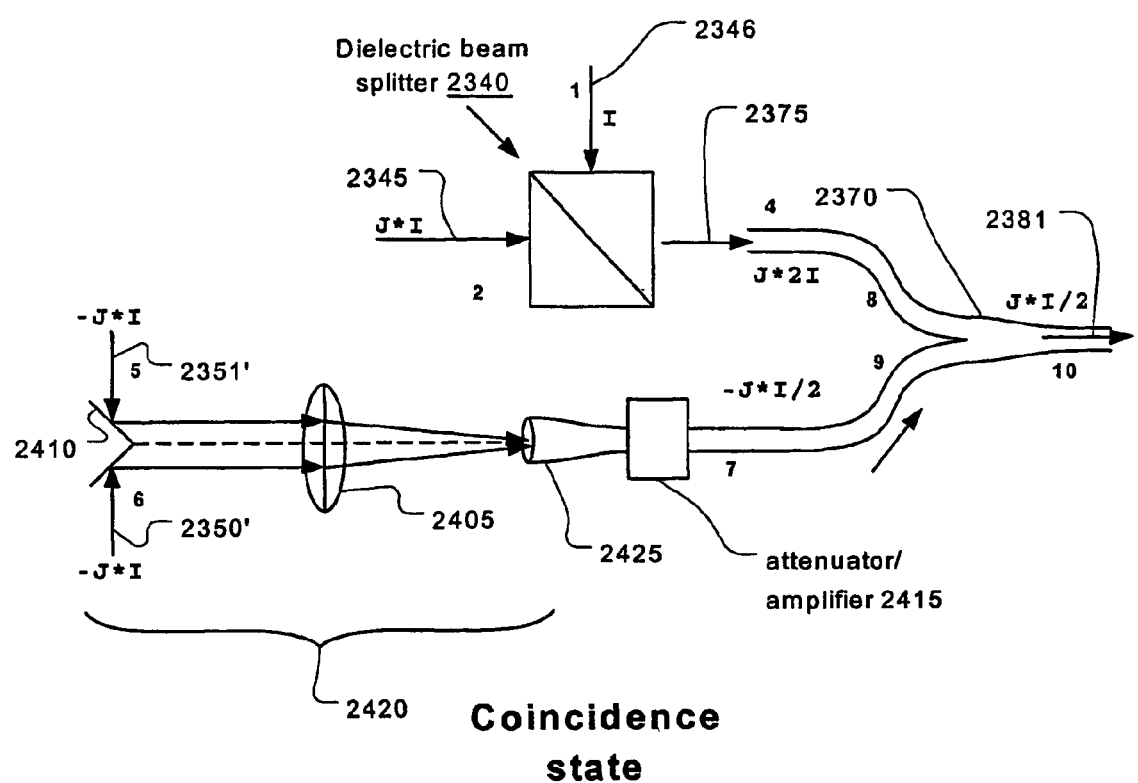

Referring now to FIG. 39, as in the coincidence state illustrated in FIG. 36 and the attending discussion, when respective parts 2345, 2346 of both the data and control signals are incident on the beam splitter 2340, all the energy of the two signals emerges at port 4 as the signal 2375. Here again, the phase of this signal 2375 is the same as that in each of the noncoincidence states, but it is four times the magnitude, that is, 2I. The Y-junction combines the other parts 2350' and 2351' of the data and control signals, but, as with the embodiment of FIGS. 34–36, the resulting intensity is only twice that in the noncoincidence states of FIGS. 37 and 38. Thus, when combined with the signal in the Y-junction 2370, a non-zero output 2381 at port 10 is obtained. Again, as before and although it hardly bears repeating, the phase of the final output 2381 is arbitrary and will depend on the precise details of the design and may even depend on the environmental conditions.

Figure 40:
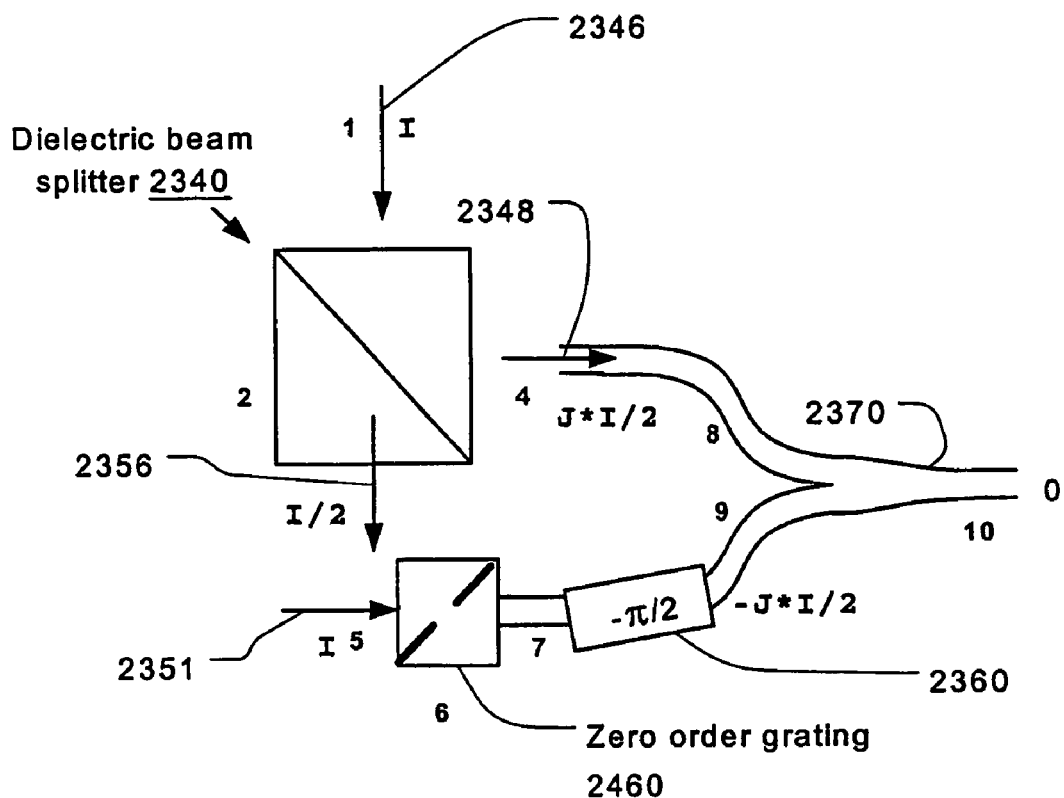
FIGS. 40, 41, and 42 illustrate embodiments based on beam splitter and beam-splitter-like coincidence devices for purposes of discussing various embodiments of inventions disclosed.

Referring now to FIG. 40, yet another kind of energy combiner may be used with the circuit portions of the embodiment of FIGS. 34–36 common to that of FIGS. 37–39. The combiner in this embodiment is a zero order grating 2460 as discussed above with regard to FIG. 33. Here, as in FIG. 35, the first and second portions 2351 and 2346 either of the data signal or the control signal are applied simultaneously to the power-combiner zero order grating 2460 at the equivalent port 5 and to the beam splitter 2340 at port 1. The results are identical to those shown in FIG. 35 and discussed with respect thereto. That is, the emerging signal applied at port 7 is phase-shifted to oppose the signal applied at port 8 with the result that the port 8 and 9 signals interfere in the Y-junction 2370 and output essentially no signal at port 10. The common features are not discussed again, since they should be clear from the discussion of FIGS. 34–39.

Figure 41:
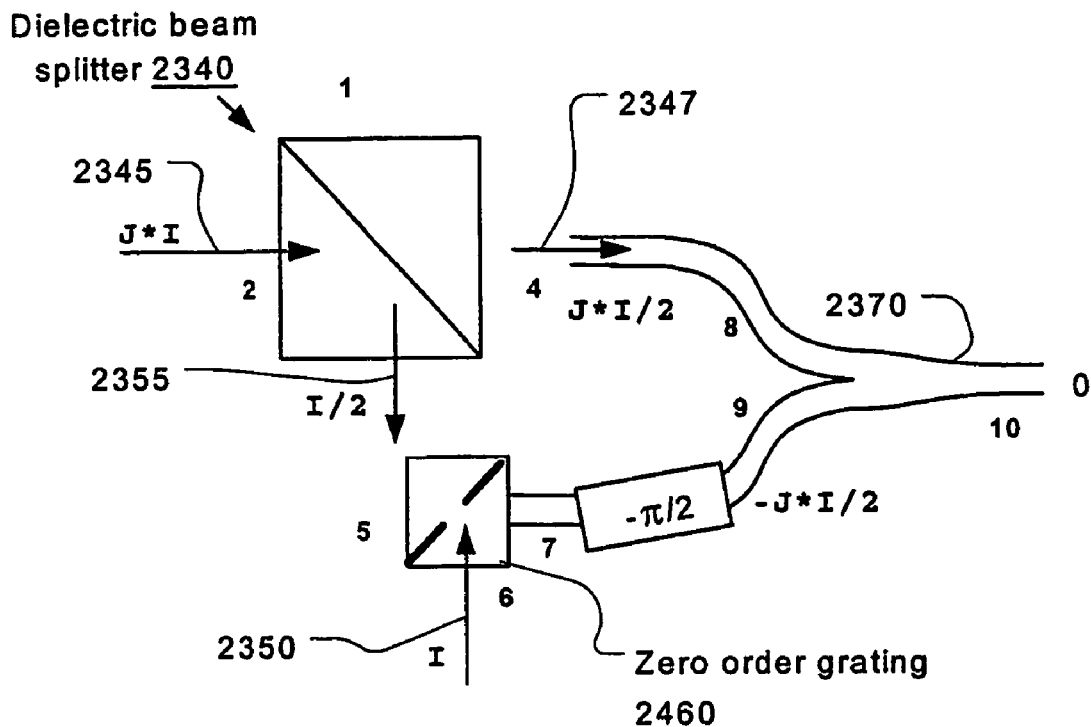
Figure 42:
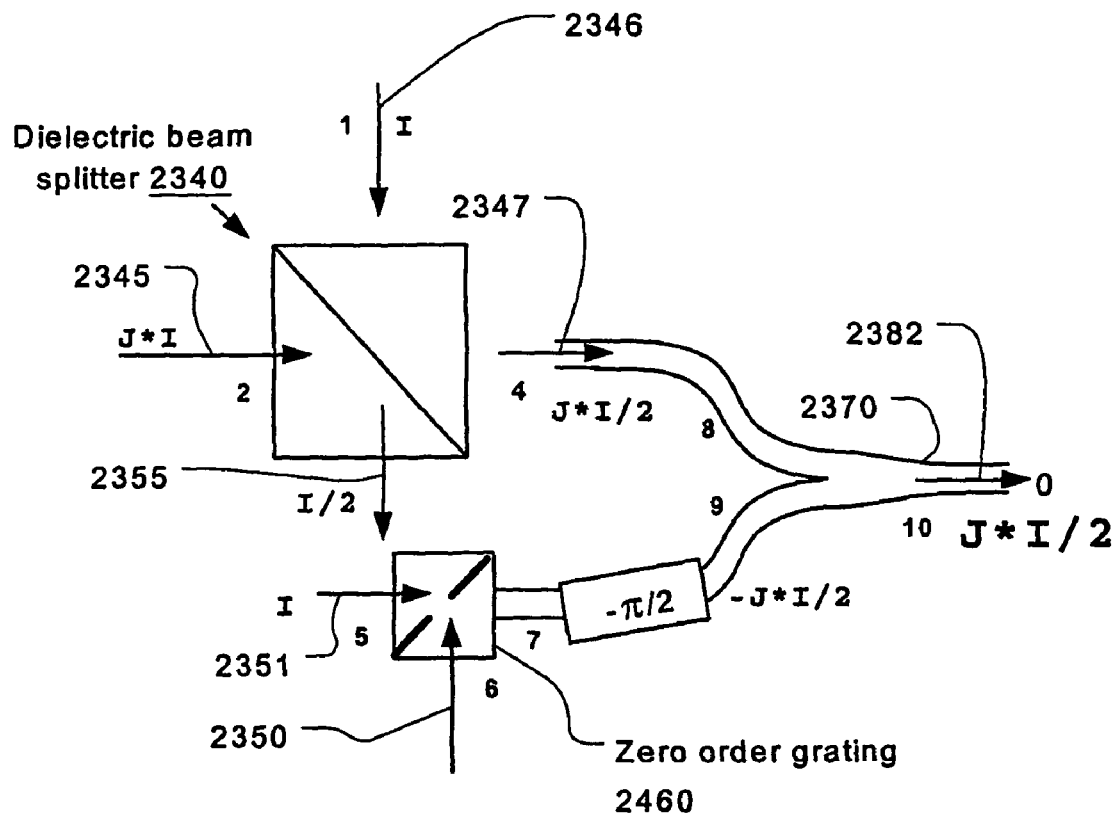

Referring now to FIG. 41, the complementary signals either from the data signal or from the control signal are applied simultaneously at ports 2 and 6 with a similar result that is essentially as described with respect to FIG. 34. Finally, referring to FIG. 42, in a coincidence state, a non-zero output 2382 is obtained for reasons that should be clear from the previous discussion of previous embodiments. In the embodiment of FIGS. 40–42, the zero order grating 2460 acts as an energy combiner just as the Y-junction 2365 and the power combiner 2420. The common elements of FIGS. 40–42 need not be described again since they function essentially as described in previous embodiments to produce a similar result. As with the embodiment of FIGS. 34–36 to apply signals to the various inputs of the device of FIGS. 37–39 and that of FIGS. 40–42, the same input circuitry 1993, 1994, 1995, and 1996 (shown in FIGS. 22–27) as added to corresponding parts (i.e., applied at ports 1, 2, 5, and 6) to the device of FIGS. 20 and 21 may be used. That is, the input circuit portions 1993, 1994, 1995, and 1996 may be used as well as variations thereof discussed above and the wide variety others that may be envisioned based on the principles presented herein.

Principles of some of the foregoing embodiments may be extended to other embodiments easily in view of the following abstraction. In many of the foregoing embodiments, each of two signals is combined, in a first process, to produce a first output of a first power level and in a second process to produce a second output of a second power level. The first and second processes are such that the same signals individually are combined in the first and second processes to produce, respectively, a third output at third power level and a fourth output at the same third power level. The third and fourth outputs are caused to interfere in a third process such that they cancel. The first and second outputs are also caused, by the same third process to cancel, but the third process of cancellation is such that, because the first output is at a higher power level than the second, residual energy remains after the cancellation process. Thus, when both signals are processed to produce first and second outputs, a non-zero output is obtained. When either signal is processed alone, no output is obtained.

Figure 43:
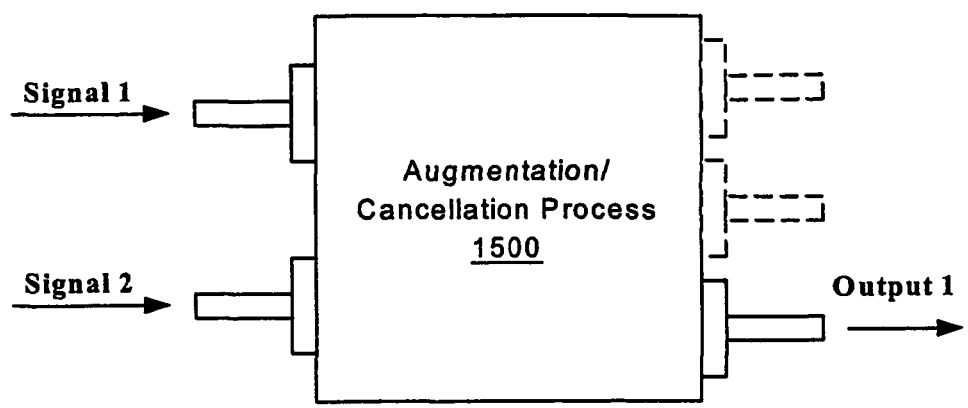
FIG. 43 illustrates a conceptual description of a coincidence device for abstracting certain concepts involved in various embodiments of coincidence devices of inventions disclosed in which the interference involves a first ratio of routed energy in the coincidence and noncoincidence states.

Referring to FIG. 43, to illustrate the above abstraction, the first process is represented here as a black box labeled "augmentation/cancellation process 1500." The latter has one or more outputs. The augmentation/cancellation process 1500 is such that the one or more outputs have a combined power that is a higher proportion of the total input power when both signals 1 and 2 are incident than when either signal 1 or 2 is incident alone. Examples of these are the directional coupler, dielectric or metallic beam splitter, and aspects of the transmission/reflecting grating and spatial interference device 800.

Figure 44:
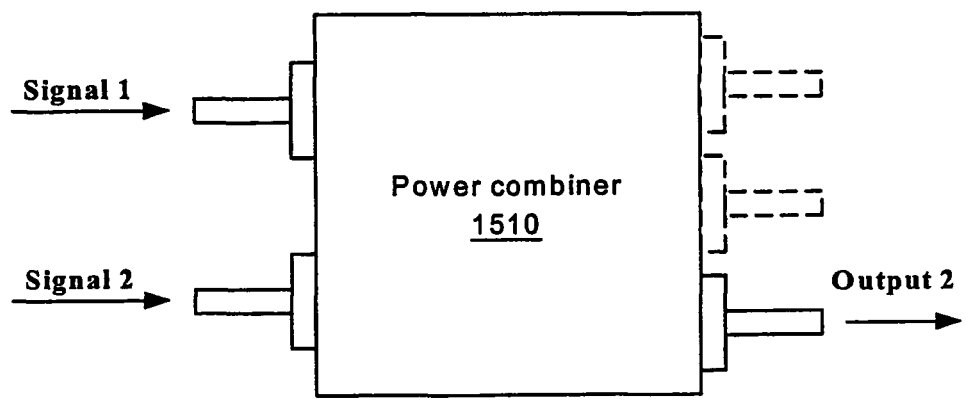
FIG. 44 illustrates a conceptual description of a coincidence device for abstracting certain concepts involved in various embodiments of coincidence devices of inventions disclosed in which the interference involves a second ratio of routed energy in the coincidence and noncoincidence states.
Figure 45:
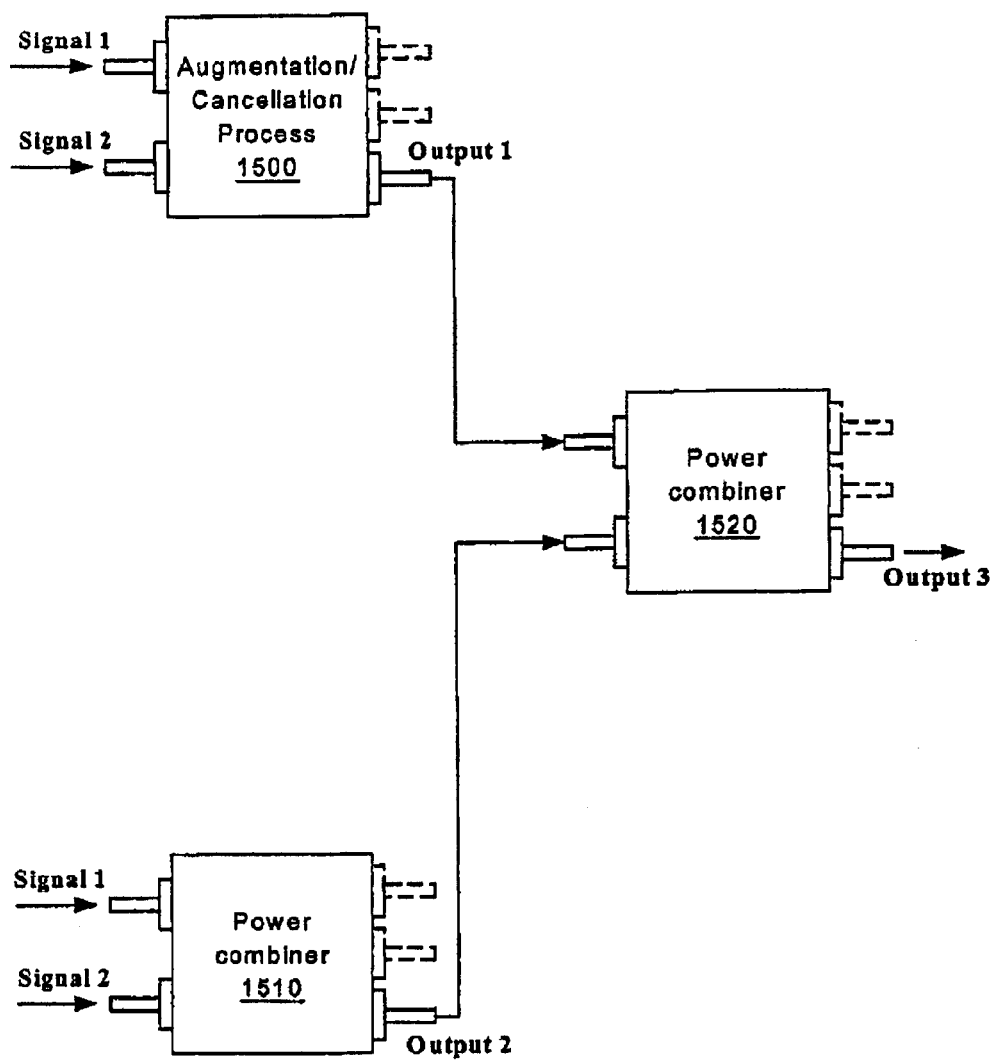
FIG. 45 illustrates a conceptual description of a coincidence device for abstracting certain concepts involved in various embodiments of coincidence gates of inventions disclosed.

Referring to FIG. 44, the second process is represented here as a black box labeled "power combiner 1510." The latter has one or more outputs. The power combiner process 1510 is such that the one or more outputs have a combined power that is proportional to the total input power when both signals 1 and 2 are incident as well as when either signal 1 or 2 is incident alone. Examples of these are the reverse Y-junction, the zero order grating, and the power combiner of FIG. 32. Referring now to FIG. 45, a power combiner, which may be identical to the power combiner 1510, combines outputs 1 and 2 such that the output 3 is proportional to the combined power of the inputs if the two outputs interfere constructively and which is zero if the two signals have the same intensity and interfere destructively. As a result of the nonlinearity of the signal levels at output 1 of the augmentation/cancellation process 1500 as a function of the signal arrangement in inputs 1 and 2, the power level of output 3 can, by judicious design of the processes 1500 and 1510 and/or processing of the outputs 1 and 2, be made to result in a zero output 3 when input signals 1 and 2 are incident alone and produce at output 1 a signal to be equal to output 2 but of a character that when combined in power combiner 1520 they cancel (e.g., have an opposite phase). A nonzero output 3 results when input signals 1 and 2 are incident simultaneously and produce an output 1 that is greater than output 2 (coincident state).

While the above description contains many details, these should not be considered as limitations on the scope of the invention, but as examples of the presently preferred embodiments thereof. Many other ramifications and variations are possible within the teachings to the invention.

For example the all-optical switches, modulators, encoding and decoding systems, interleaving and multiplexing systems, and demultiplexing systems have been described for use in communication networks. However they can be used in other optical systems as well, such as systems used for optical computing. They also can be used as optical components, devices, and systems in Ethernet systems. Although the invention been described using the examples of DTDM and self-triggered CDM it can be used for producing very narrow pulses to perform standard techniques, such as TDM, ATM and packets routing.

Although the some systems have been described as modulators they also can be operated as switches. While some all-optical encoding and multiplexing systems have been described using sub-units operating as modulators, the situation can be reversed, i.e., the operation of these same sub-units can be change to serve as switches in decoding and demultiplexing systems. Though some switches and modulators have been described with one output they can include multiple outputs. While the modulators and the switches have been described as containing gratings or phase arrays, they can also include another interference devices that are capable of changing their pitch according to the illumination conditions. Although the gratings and the phase arrays have been described as having one ore three interference orders, they are not limited to these numbers of interference orders. While some of the switches and the modulators are illustrated without optical amplifiers they can be integrated with optical amplifiers, such as a Europium Doped Optical Fiber Amplifier (EDOFA).

Thus the scope of the invention should be determined by the appended claims and their legal equivalents, and not by the examples given.

It will be evident to those skilled in the art that the invention is not limited to the details of the foregoing illustrative embodiments, and that the present invention may be embodied in other specific forms without departing from the spirit or essential attributes thereof. The present embodiments are therefore to be considered in all respects as illustrative and not restrictive, the scope of the invention being indicated by the appended claims rather than by the foregoing description, and all changes which come within the meaning and range of equivalency of the claims are therefore intended to be embraced therein.

The invention claimed is:

1. An optical dual grating device comprising:
   a transmittive grating formed of segments of non-transparent material deposited on a flat planar surface of a transparent substrate, said transmittive grating having a first grating pitch and adapted to selectively transmit a first incident radiation beam to produce a transmitted beam corresponding to a first interference pattern; and
   a reflective grating formed of segments of a reflective material deposited upon the non-transparent segments of said transmittive grating, said reflective grating having said first grating pitch and adapted to selectively reflect a second incident radiation beam to produce a reflected beam corresponding to a second interference pattern;
   wherein said transmittive and reflective gratings are arranged such that said transmitted and reflected beams, when produced simultaneously, interfere to produce a combined interference pattern corresponding to a combined grating having a second grating pitch equal to about half of said first grating pitch, wherein the combined interference pattern is of an order lower than the orders of said first and second interference patterns.

2. The optical dual grating device of claim 1 further comprising a first transparent block, wherein said transparent substrate is formed on the first transparent block.

3. The optical dual grating device of claim 2 further comprising a second transparent block bonded at said transparent substrate to the first transparent block.

4. The optical dual grating device of claim 3 wherein:
   the second transparent block is bonded to the first transparent block with index-matching glue;
   the second transparent block has the same index of refraction as the first transparent block; and
   the refractive index on both sides of said transparent substrate is the same.

5. The optical dual grating device of claim 1, comprising an optical subtracting device having a plurality of inputs for receiving radiation beams corresponding to at least one of said first, second, and combined interference patterns, wherein the radiation beams are coupled to said inputs of the optical subtracting device.

6. The optical dual grating device of claim 5, wherein said subtracting device is an optical coupler.

7. The optical dual grating device of claim 5, wherein said subtracting device includes an optical phase controller.

8. The optical dual grating device of claim 7, wherein said optical phase controller is a variable optical phase controller.

9. The optical dual grating device of claim 1, wherein said first and second incident radiation beams, when applied simultaneously, are aligned toward said dual grating device along different orientations.

10. The optical dual grating device of claim 1, wherein said transmitted and reflected beams are co-aligned.

11. The optical dual grating device of claim 1 wherein an optical path of one of said first and second incident radiation beams includes an optical fiber.

12. The optical dual grating device of claim 1 wherein an optical path of one of said first and second incident radiation beams includes an optical attenuator.

13. The optical dual grating device of claim 1 wherein an optical path of one of said first and second incident radiation beams includes an optical delayer.

14. The optical dual grating device of claim 1 wherein an optical path of one of said first and second incident radiation beams includes an optical length controller.

15. The optical dual grating device of claim 1 wherein an optical path of one of said first and second incident radiation beams includes an optical phase controller.

16. The optical dual grating device of claim 15 wherein said optical phase controller is a variable optical phase controller.

* * * * *